United States Patent
Shimonura et al.

[11] Patent Number: 6,141,151
[45] Date of Patent: Oct. 31, 2000

[54] PROJECTION-DISPLAY APPARATUS

[75] Inventors: Hideaki Shimonura, Kawasaki; Yuji Manabe, Kamakura; Tetsuo Hattori, Yokohama; Masaaki Kusano, Kawasaki; Atsushi Sekine, Kasukabe, all of Japan

[73] Assignee: Nikon Corporation, Tokyo, Japan

[21] Appl. No.: 09/363,230

[22] Filed: Jul. 21, 1999

Related U.S. Application Data

[63] Continuation of application No. 08/988,704, Dec. 11, 1997, Pat. No. 5,959,778, which is a continuation-in-part of application No. 08/792,541, Jan. 31, 1997, abandoned.

[51] Int. Cl.[7] .................................................... G02B 27/10
[52] U.S. Cl. ......................... 359/618; 359/629; 359/638; 359/589; 349/8; 348/333; 348/757
[58] Field of Search ..................... 359/618, 629, 359/638, 637, 639, 640, 589, 583, 722, 723; 349/8, 181; 348/333, 757, 766

[56] References Cited

U.S. PATENT DOCUMENTS 5,959,778  9/1999  Shimonura et al. .................... 359/618

*Primary Examiner*—Loha Ben
*Attorney, Agent, or Firm*—Klarquist Sparkman Campbell Leigh & Whinston, LLP

[57] ABSTRACT

Apparatus are disclosed that provide a high-luminance projected image with no color shading or uneven contrast. Light from a light source undergoes color separation by passing through a color-separation optical system (e.g., a cross-dichroic mirror or cross-dichroic prism). The light from the light source can also be split into first and second polarized lights by passage through, e.g., a first polarized-light beam-splitter (PBS). Each color-separated light is modulated by a respective color-signal light valve and undergoes color combining by, e.g., a cross-dichroic prism. The second polarized light, if formed, is modulated by a luminance-signal light valve, undergoes color combining and polarized-light combining by, e.g., a second PBS, and is projected by a projection lens (that comprises an aperture stop). The PBSs, cross-dichroic mirrors, and cross-dichroic prisms are situated where principal rays (defined by the aperture stop) are parallel to the optical axis. The first PBS (if present) and color-separation optical system are preferably arranged between a front illumination lens group and a rear illumination lens group both comprising an illumination relay optical system telecentric on both front and rear sides thereof. Field lenses and relay lenses can be included that comprise a relay optical system forming a magnified image of the color-signal light valves at a position conjugate to the luminance-signal light valve with respect to the projection lens.

35 Claims, 24 Drawing Sheets

PROJECTION-DISPLAY APPARATUS

CROSS REFERENCE TO RELATED APPLICATIONS

This application is a continuation of application Ser. No. 08/988,704, filed Dec. 11, 1997, which is a continuation-in-part of application Ser. No. 08/792,541, filed Jan. 31, 1997, now abandoned.

FIELD OF THE INVENTION

The present invention is related to projection-display apparatus that project an image, formed on an illuminated liquid-crystal panel, onto a screen or other viewing surface. More specifically, this invention is related to projection-display apparatus that illuminate an image, formed on multiple illuminated liquid-crystal panels receiving respective color components, using an illumination light having a corresponding number of multiple color components and then combine such images and project the combined image using a projection-optical system.

BACKGROUND OF THE INVENTION

Color projection apparatus are known that employ multiple light-valve panels such as liquid-crystal light valves (LCLVs).

One example of such an apparatus is shown in FIG. 1, in which white light (comprising the three primary colors of red (R), green (G), and blue (B)) from a light source (lamp 1) and converted into a substantially parallel white light flux by a concave mirror 2 and a condenser lens 3. The white light flux enters a color-separating optical system comprising a blue-light (B light) reflecting dichroic mirror 4 and a green-light (G light) reflecting dichroic mirror 5. B light reflected by the B-light-reflecting dichroic mirror 4 is reflected again by a mirror 7 and enters a B-light LCLV 11. G light reflected by the G-light-reflecting dichroic mirror 5 enters a G-light LCLV 10. Red light (R light) passing through the dichroic mirror 5 is reflected by a mirror 6 and a mirror 8 and enters an R-light LCLV 9. Each color of light entering the respective LCLV is modulated by the respective LCLV. Hence, each color's video signal is converted into an image that has a transmission-rate distribution at the respective LCLV. The modulated colored lights passing through the respective LCLVs enter a dichroic prism 12. The dichroic prism 12 comprises a reflecting dichroic film for R light and a reflective dichroic film for B light, thereby accomplishing a three-color combination. The color-combined light exits from the dichroic prism 12 and is magnified and projected on a screen (not shown) by a projection lens 13.

In the configuration shown in FIG. 1, about half the light energy entering the LCLVs 9–11 is absorbed and converted into heat. Thus, a problem with the conventional example shown in FIG. 1 is its inability to produce a sufficiently bright projected image for certain applications.

Another shortcoming of the foregoing configuration and other configurations in the prior art is that the angle of incidence of rays on the dichroic mirrors is not identical over the entire surface of each such mirror. Optical components comprising multilayered films, such as dichroic mirrors and dichroic prisms, are highly angle-dependent in their spectral characteristics. Consequently, whenever the angle of incidence of a principal ray (the principal ray being defined by the projection lens) in relation to a multilayer film is not exactly the same at all locations on the multilayer film, the multilayer film's spectral characteristics are not the same for each such principal ray, resulting in problems with color shading on the projection screen.

LCLVs and related devices are also angle-dependent. Whenever the angle of incidence of a principal ray in relation to a LCLV differs even slightly across the surface of the LCLV, as is the case with prior-art projection apparatus, problems with uneven contrast arise in the projected image.

An alternative configuration to that shown in FIG. 1 is also known in the prior art, in which dichroic mirrors corresponding to the mirrors 4 and 5 are positioned in an X pattern relative to each other rather than parallel to each other. The X pattern is characteristic of so-called "crossed dichroic" mirrors. Unfortunately, with a crossed-dichroic mirror, the intersecting portions of the two dichroic mirrors exhibit color shift relative to other portions of the mirrors. This uneven-color problem affects image quality.

A conventional color-projection apparatus intended for producing an image with enhanced brightness is disclosed in the first figure of Japanese Kokai patent document no. Hei 4-18544, in which a polarizing beamsplitter (PBS) is employed to "split" a white light flux into an S-polarized flux component and a P-polarized flux component. The P-polarized flux component is transmitted through the PBS, and the S-polarized component is reflected by the PBS. The P-polarized component and the S-polarized component are each color-separated into polarized R, G, and B lights by a dichroic mirror. Each of the polarized color fluxes is modulated by a respective transmissive-type LCLV. If a polarizing plate at each LCLV's exit side is situated orthogonally to the incident side, the P-polarized light is converted into S-polarized light and the S-polarized light is converted into P-polarized light. The modulated polarized color fluxes are recombined using dichroic mirrors and a second PBS; the resulting image is projected using a projection lens.

Whereas the image projected by an apparatus according to Kokai '544 is definitely brighter than projected images produced using apparatus that convert substantial amounts of light energy to heat, as described above, this apparatus requires six LCLVs, one for each primary color of S- and P-polarized light. Also, each polarized component of each color of light requires the same number of lenses. Consequently, this apparatus is very costly.

Yet another prior-art color projection apparatus (as disclosed in the first figure of Japanese Kokai patent document no. Hei 3-296030) is shown in FIG. 2. Light flux from a light source 21 is reflected by a curved mirror 22 (to make the rays parallel to each other) and split by a first polarizing beamsplitter A(PBS) 23 into a P-polarized light flux and an S-polarized light flux. The P-polarized flux is separated into the three primary colors SR, SG, and SB by the dichroic mirrors 24 and 25. LCLVs 26, 27, 28 modulate the respective R, G, and B lights SR, SG, SB (according to respective color-difference signals R−Y, G−Y, and B−Y provided to respective terminals 29, 30, and 31). Routing of the R, G, and B lights is performed by mirrors 32, 33. Meanwhile, the other polarized light flux produced by the first PBS 23 is reflected by a mirror 34, enters a "luminance-signal" LCLV 35, and is modulated according to a luminance signal Y provided to a terminal 36. The three colored modulated lights LR, LG, LB (recombined by dichroic mirrors 37, 38) and the modulated luminance light LY are integrated by a second PBS 39. The light is then projected through a projection lens 40 onto a screen (not shown). Thus, the number of LCLVs required in this configuration is four rather than six.

In the Japanese Kokai patent document no. Hei 3-296030 summarized above, the image produced by the luminance-signal LCLV is superimposed on the superimposed images produced by the color-signal LCLVs to enhance luminance (brightness) of the projected image. Preferably, the LCLVs used for each of the primary colors and the LCLV used for the luminance signal have the same size and shape.

Further with respect to the Kokai '030 apparatus, resolution of the projected image could be improved by using LCLVs having higher resolution; i.e., by using LCLVs having a greater number of pixels per unit LCLV area. This could be achieved by reducing pixel size. But, there are manufacturing limitations on the minimum pixel size in LCLVs. A higher-resolution LCLV must be larger in proportion to its resolution. When the LCLVs used for the primary colors are individually the same size as the luminance-signal LCLV, all the LCLVs used in the embodiment described above would have to be enlarged in order to improve resolution. Consequently, cost would be substantially increased. Also, the overall size of the projection apparatus (including an increase in size of optical components) would have to be correspondingly increased with an increase in size of the LCLVs. This would unavoidably lead to substantially higher costs despite the use of only four LCLVs instead of six.

Other problems arise when the shape and size of the image-forming portion of each of the color-signal LCLVs is identical to the shape and size of the image-forming portion of the luminance-signal LCLV. If the numerical aperture (i.e., ratio of the surface area of the portion through which incident light can be transmitted to the surface area of the portion through which incident light cannot be transmitted, such as a portion where a switching element is located) of each color-signal LCLV and the luminance-signal LCLV are identical, it is impossible to obtain both a high-resolution and a bright projected image. Because there is a limit on the size of a switching element provided for each pixel in a LCLV, the number of pixels generally cannot be increased while also maintaining a large numerical aperture. Therefore, if the shape and size of the image-forming portion of a color-signal LCLV is identical to the shape and size of the image-forming portion of the luminance-signal LCLV, and if the number of pixels of each type of LCLV is increased, the numerical aperture of both types drops. The projected image will have a higher resolution but will be darker. In contrast, if the number of pixels of each type of LCLV is decreased while the numerical aperture of both types of LCLVs is increased, the projected image will be brighter but the resolution will be lower.

Further with respect to the Kokai '030 apparatus, greater brightness could be achieved by increasing the resolution of the luminance-signal LCLV 35 relative to the color-signal LCLVs 26, 27, 28.

The Kokai '030 apparatus shown in FIG. 2 has certain problems. First, each dichroic mirror and dichroic prism used in the apparatus comprises a multiple-layer film. The spectral characteristics of the films used in the dichroic mirrors and prisms, as used for color separation or color combining, exhibit an angular dependence. I.e., the angle of incidence differs depending on the location, with respect to the principal ray, of the multiple-layer film as determined by the aperture stop of the projection lens. As a result, the spectral characteristics of the multiple-layer film will be different for each principal ray. This results in color shading on the screen.

Second, the performance of each LCLV is dependent on the angle of incidence of light with respect to the LCLV. Since the angle of incidence of a principal ray is different depending on the location of the principal ray with respect to a LCLV, an uneven contrast of the projected image is exhibited by the apparatus of Kokai '030.

Third, there is an angular dependence on the performance of the polarizing beamsplitter used for separating or combining polarized light in the Kokai '030 apparatus. Any difference in the angle of incidence of the principal ray depending on its location with respect to the polarizing-and-splitting surface of a polarizing beamsplitter results in uneven contrast of the projected image.

Another problem with the configuration shown in FIG. 2 pertains to the PBSs 23, 39. In these PBSs, a multi-layered dielectric film is provided on a supporting optical member such as glass. Increasing the size of the optical components in order to accommodate an increase in size of the LCLVs necessitates a corresponding increase in the size of the dielectric films. This results in an appreciable increase in the cost of the supporting optical members, which must have homogeneous optical qualities. This results in high cost and procurement difficulties.

SUMMARY OF THE INVENTION

According to a first aspect of the invention, a projection-display apparatus is provided that comprises a color-separation optical system situated so as to receive an illumination light flux comprising multiple colors and to split the illumination light flux into multiple color-light fluxes. For each color-light flux, a respective color-light light valve is provided. Each color-light light valve is situated so as to receive and modulate the respective color-light flux in an image-forming way based on image-encoding electrical signals received by the respective color-light light valve. The apparatus also comprises a color-combining optical system for receiving and combining the modulated color-light fluxes and for form a recombined light flux from the combined color-light fluxes. A projection optical system is included for projecting the recombined light flux onto a viewing surface. The projection optical system preferably comprises an aperture stop that defines principal rays. The color-combining optical system is preferably situated where the principal rays are parallel to the optical axis, and the color-separation optical system is preferably situated at or near a position where the principal rays cross the optical axis.

The embodiment summarized above preferably further comprises an illumination relay optical system situated so as to direct the illumination light flux from a light source to the color-separation optical system. The illumination relay optical system preferably comprises a front lens group situated upstream of the color-separation optical system, and a rear lens group situated downstream of the color-separation optical system.

An integrator (most preferably a rod integrator) is preferably situated between the light source and the color-separation optical system; the integrator directs the illumination light flux from the light source to the front lens group of the illumination relay optical system. The integrator defines a surface light source through which the illumination-light flux passes; the illumination relay optical system forms a separate respective image, of the surface light source, formed by each color-light flux and separated from one another by the color-separation optical system.

Further with respect to the above-summarized embodiment, the illumination relay optical system is preferably telecentric on its object side. The front lens group of the illumination relay optical system is situated so as to receive principal rays, from the surface light source and as defined by the aperture stop of the projection optical system, that are parallel to the optical axis.

For making a color projected image, the color-separation optical system typically splits the illumination-light flux into an R-light flux, a G-light flux, and a B-light flux. Thus, the color-light light valves comprise a separate light valve for the R-light flux, a separate light valve for the G-light flux, and a separate light valve for the B-light flux. Such a configuration also preferably comprises a relay optical system for each of the R-light, G-light, and B-light fluxes. The relay optical system for the R-light flux is situated between the image of the surface light source formed by the R-light flux and the R-light light valve, the relay optical system for the G-light flux is situated between the image of the surface light source formed by the G-light flux and the G-light light valve, and the relay optical system for the B-light flux is situated between the image of the surface light source formed by the B-light flux and the B-light light valve. The relay optical systems generally serve to direct the separated R light, G light, and B light, respectively, to the respective light valve. Each of the relay optical systems for R light, G light, and B light forms a secondary image, using the respective light color, of the surface light source on the respective light valve, and each of the relay optical systems for R light, G light, and B light is preferably telecentric on its secondary-image side.

According to another aspect of the invention, a projection-display apparatus is provided that comprises, on an optical axis, a polarizing-and-splitting optical system, a color-separation optical system, a respective color-light light valve for each color-light flux, a color-combining optical system, a luminance-signal light valve, a polarizing-and-combining optical system, and a projection optical system. The polarizing-and-splitting optical system separates an illumination light flux, from a light source and comprising multiple color components, into a first polarized light flux and a second polarized light flux. The color-separation optical system is situated so as to receive the first polarized light flux and split the first polarized light flux into separate color-light fluxes of each of the respective color components. The color-light light valves are situated so as to receive and modulate the respective color-light flux in an image-forming way based on image-encoding electrical signals received by the respective color-light light valve. The color-combining optical system receives and combines the modulated color-light fluxes to form a recombined color-light flux. The luminance-signal light valve receives and modulates, based on a luminance electrical signal, the second polarized light flux to form a modulated second light flux. The polarizing-and-combining optical system receives the recombined color-light flux and the modulated second polarized light flux and forms therefrom a recombined modulated light flux. The projection optical system is situated downstream of the polarizing-and-combining optical system and preferably comprises an aperture stop. The projection optical system projects the recombined modulated light flux to a viewing surface. The polarizing-and-splitting optical system, the color-separation optical system, the color-combining optical system and the polarizing-and-combining optical system are preferably arranged where principal rays, defined by the aperture stop, are parallel to the optical axis.

The color components of the illumination light flux typically comprise R light, G light, and B light.

In such an instance, the color-light light valves include a separate R-light, G-light, and B-light light valve. The R-light, G-light, and B-light light valves and the luminance-signal light valve are preferably situated where the principal rays, as defined by the aperture stop of the projection optical system, are parallel to the optical axis. This provides telecentric illumination of each of the light valves.

According to another aspect of the invention, a projection-display apparatus is provided having characteristics as generally described above, and that additionally comprises an integrator (preferably a rod integrator) and a first relay optical system. The integrator is situated so as to direct the illumination light flux from the light source through a distal end face thereof to the first relay optical system. The first relay optical system is situated so as to direct the illumination light flux from the first relay optical system to the polarizing-and-splitting optical system.

The luminance-signal light valve is preferably situated where a real image of the distal end face is formed by the first relay optical system from the second polarized light flux propagating from the polarizing-and-splitting optical system. This embodiment also preferably comprises second, third, and fourth relay optical systems situated between the luminance-signal light valve and the first, second and third color-signal light valves, respectively. The second, third, and fourth relay optical systems produce a real image of the distal end face on each of the first, second, and third color-signal light valves, respectively, using the first, second, and third light colors, respectively.

In the above-summarized embodiment, each of the polarizing-and-splitting optical system and the polarizing-and-combining optical system preferably comprises a respective polarized-light beamsplitter. Also, each of the color-separation optical system and the color-combining optical system comprises a cross-dichroic prism or a cross-dichroic mirror.

The foregoing embodiment also preferably comprises an optical-distance correction member situated between the luminance-signal light valve and the polarizing-and-combining optical system. The optical-distance correction member serves to substantially equalize an optical distance from the luminance-signal light valve to the projection optical system with an optical distance from any of the first, second, and third color-signal light valves to the projection optical system.

According to another aspect of the invention, a projection-display apparatus is provided that comprises, on an optical axis, a polarizing-and-splitting optical system, a color-separation optical system, a respective color-light light valve for each of the first, second, and third color-light fluxes, a color-combining optical system, a luminance-signal light valve, a polarizing-and-combining optical system, and a projection optical system, all as generally summarized above. Each of the color-signal and luminance-signal light valves includes a respective image-forming portion preferably having identical size and shape, and each of the color-signal and luminance-signal light valves preferably has a respective numerical aperture wherein the numerical aperture of the luminance-signal light valve is smaller than the numerical aperture of any of the first, second, and third color-signal light valves. Each of the color-signal light valves and the luminance-signal light valve comprises a respective number of pixels. The luminance-signal light valve comprises a number of pixels that is preferably greater than the number of pixels of any of the first, second, and third color-signal light valves. The first, second, and third color-signal light valves and the luminance-signal light valve are preferably situated where principal rays, defined by the aperture stop of the projection optical system, are parallel to the optical axis. This provides telecentric illumination of the first, second, and third color-signal light valves and the luminance-signal light valve. The polarizing-and-splitting optical system, the color-separation optical system, the color-combining optical system, and the polarizing-and-combining optical system of this apparatus are situated where principal rays, defined by the aperture stop, are parallel to the optical axis.

According to another aspect of the invention, a projection-display apparatus is provided that comprises a polarizing-and-splitting optical system, a color-separation optical system, a respective color-light light valve for each of the separated color-light fluxes, a color-combining optical system, a luminance-signal light valve, a polarizing-and-combining optical system, and a projection optical system as summarized above. The apparatus also comprises an illumination relay optical system situated so as to direct illumination light from the light source to the color-signal light valves. The illumination relay optical system preferably comprises a front lens group and a rear lens group. The polarizing-and-splitting optical system and the color-separation optical system are preferably situated between the front lens group and the rear lens. The illumination relay optical system is preferably telecentric on both its upstream side and its downstream side.

In the above-summarized embodiment, the color-separation optical system is preferably situated where principal rays, as defined by the aperture stop, are parallel to the optical axis. Also, the polarizing-and-combining optical system is preferably situated where principal rays, defined by the aperture stop, are parallel to the optical axis.

The apparatus also preferably comprises an integrator (preferably a rod integrator) situated between the light source and the polarizing-and-splitting optical system. The front lens group of the illumination relay optical system is preferably situated so as to direct light from the integrator to the polarizing-and-splitting optical system, and the rear lens group of the illumination relay optical system is preferably situated so as to conduct each separated color-light flux from the color-separation optical system. The integrator defines a surface light source; and the illumination relay optical system preferably forms an image of the surface light source formed by each color-light flux separated by the color-separation optical system.

The above-summarized embodiment also preferably includes a color-signal relay optical system for each color-light flux. Each color-signal relay optical system is preferably situated so as to direct the respective color-light flux to the respective color-signal light valve. Also, each color-signal relay optical system is preferably situated between the image of the surface light source formed by the respective color-light flux and the respective color-signal light valve.

The above-summarized embodiment also preferably includes a luminance relay optical system comprising a front lens group and a rear lens group. The luminance relay optical system directs light from the light source toward the luminance-signal light valve. The rear lens group of the luminance relay optical system is situated between the polarizing-and-splitting optical system and the luminance-signal light valve. The front lens group of the luminance relay optical system and the front lens group of the illumination relay optical system are preferably the same. Also, the illumination relay optical system is preferably telecentric on an image side of the light source. The color-signal relay optical systems form a secondary image of the surface light source by each color-light flux onto the respective color-signal light valves. The color-signal relay optical systems are preferably telecentric on the secondary-image side thereof. The luminance relay optical system forms an image of the surface light source on the luminance-signal light valve, wherein the luminance relay optical system is preferably telecentric on the image side of the surface light source.

Further with respect to the above-summarized embodiment, the plurality of color-signal light valves comprise a light valve for R light, a light valve for G light and a light valve for B light. The color-signal relay optical system comprises a relay optical system for R light that directs R light from a primary image, of the surface light source, formed by the R light to the light valve for R light; a relay optical system for G light that directs G light from a primary image, of the surface light source, formed by the G light to the light valve for G light; and a relay optical system for B light that directs B-light from a primary image, of the surface light source, formed by the B light to the light valve for B light.

According to another aspect of the invention a projection-display apparatus is provided comprising a polarizing-and-splitting optical system, a color-separation optical system, a respective color-signal light valve for each of first, second, and third color-light fluxes, a color-combining optical system, a luminance-signal light valve, a polarizing-and-combining optical system, and a projection optical system as summarized above. The embodiment also includes a relay optical system for forming a magnified image of the first, second, and third color-signal light valves at a position conjugate to the luminance-signal light valve with respect to the projection-optical system. The relay optical system preferably comprises first, second, and third lens systems corresponding to the first, second, and third color-light fluxes, respectively. The first, second, and third lens systems are preferably located between the first, second, and third color-signal light valves, respectively, and the color-combining optical system. The relay-optical system is preferably situated between the color-combining optical system and the polarizing-and-splitting optical system. Each of the first, second, and third lens systems preferably comprises a relay lens and a field lens, wherein the field lens is situated between the relay lens and the color-combining optical system.

In the embodiment summarized above, each of the first, second, and third lens systems preferably comprises two illumination lenses. Also, the color-separation optical system preferably comprises a cross-dichroic prism or a cross-dichroic mirror, and the color-combining optical system preferably comprises a cross-dichroic prism. The cross-dichroic prism or mirror of the color-separation optical system and the cross-dichroic prism of the color-combining optical system are preferably centered on the same axis.

Also with respect to the above-summarized embodiment, each of the polarizing-and-splitting optical system and the polarizing-and-combining optical system preferably comprises a respective polarized-light beamsplitter (PBS). Each PBS is preferably centered on a single axis.

In the above-summarized embodiment, the projection optical system preferably comprises an aperture stop. The color-separation optical system is preferably situated where principal rays are parallel to the optical axis as determined by the aperture stop.

Also, the polarizing-and-combining optical system is preferably situated where principal rays are parallel to the optical axis, as telecentrically determined by the aperture stop.

Finally, in the above-summarized embodiment, each of the color-light fluxes entering the color-combining optical system from the respective first, second, and third color-signal light valves is preferably S-polarized with respect to a color-combining membrane of the color-combining optical system.

A number of embodiments are disclosed herein. Hence, the foregoing aspects of the invention are representative only and are not to be construed as limiting in any way.

The foregoing and additional features and advantages of the invention will be more readily apparent from the following detailed description, which proceeds with reference to the accompanying drawings.

DETAILED DESCRIPTION

This invention is described in connection with multiple representative embodiments.
First Embodiment A perspective view of the various optical components in this embodiment is provided in FIG. 3. To simplify the description, the X, Y, and Z axes are as indicated.

Figure 3:
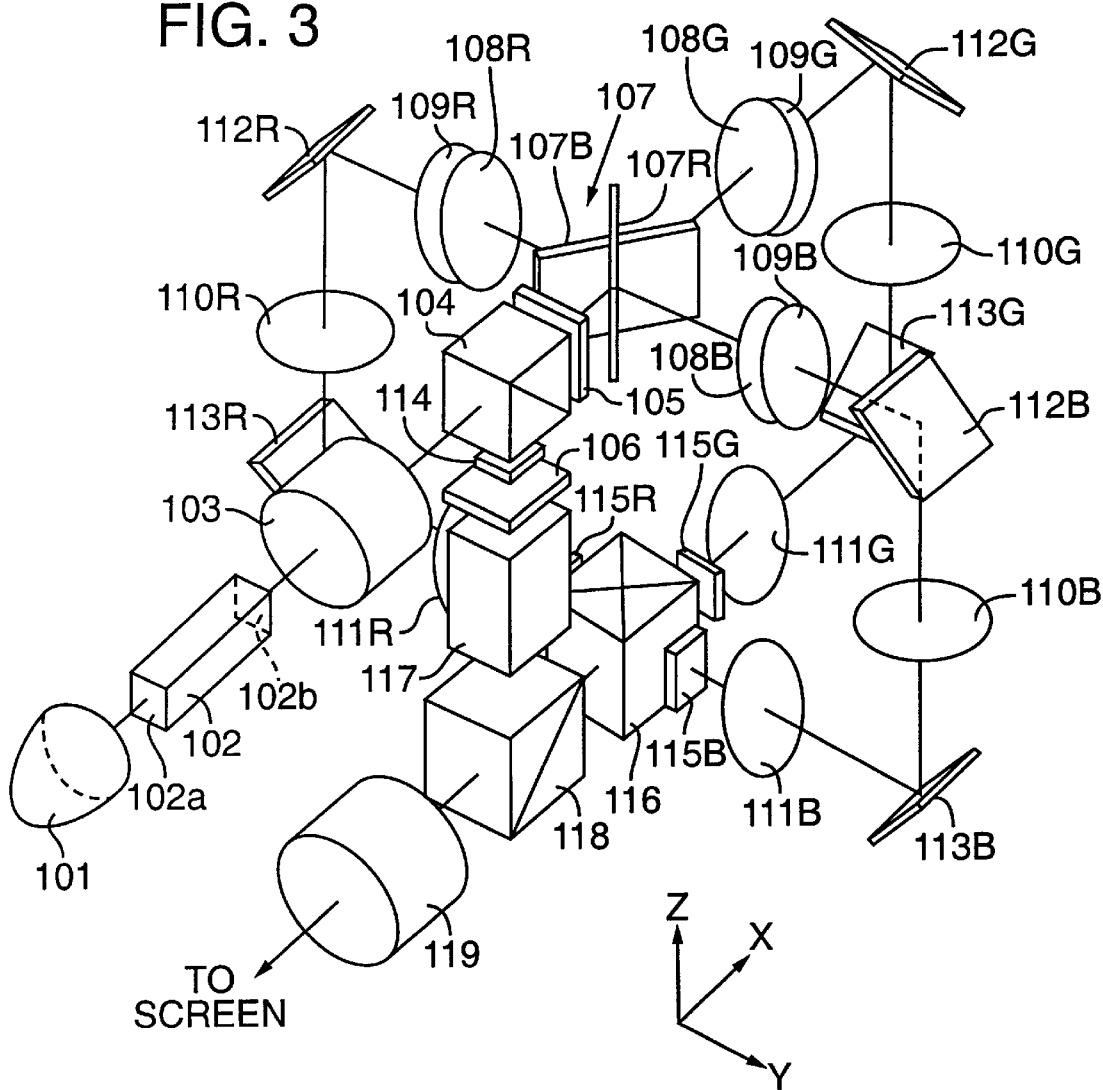
FIG. 3 is a perspective view of a projection display apparatus according to a first representative embodiment of the invention.
Figure 4:
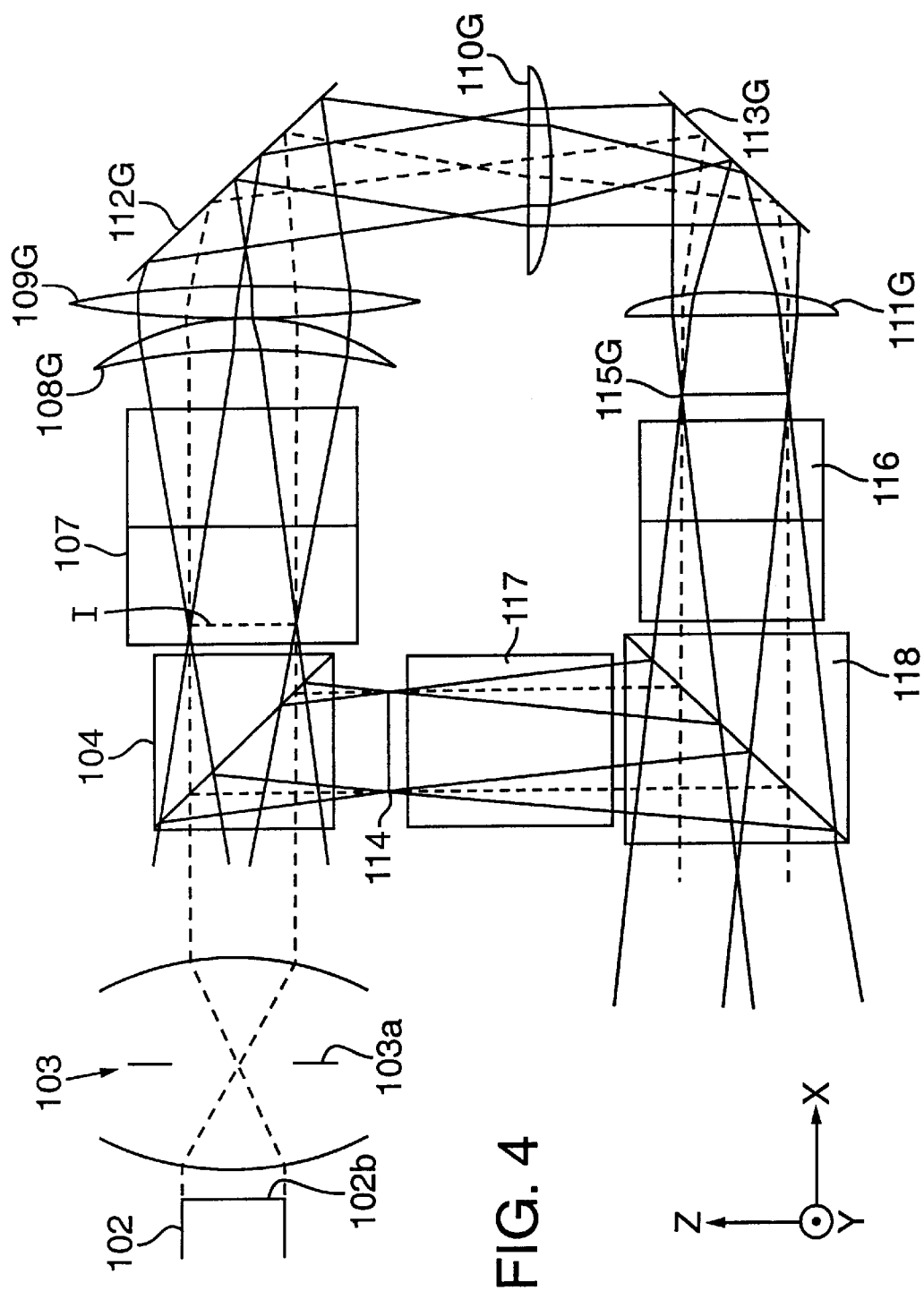
FIG. 4 is an optical diagram of a portion of the FIG. 3 embodiment, showing ray traces in the YZ plane.

FIG. 4 illustrates representative ray traces in the XZ plane of the FIG. 3 embodiment. In FIG. 4, the solid ray-trace lines represent marginal rays and the broken ray-trace lines represent principal rays of off-axis light (principal rays are determined by an aperture stop, not shown in the figure, of the projection lens 119).

The coordinate system in FIG. 4 corresponds to the coordinate system in FIG. 3. In FIG. 4, details of certain optical components are omitted. Also, the optical paths of the R-light and the B-light from color splitting to color combining are not shown in FIG. 4; only the optical path of G-light is shown.

The apparatus of FIG. 3 comprises a light source 101; an integrator 102 (preferably a rod integrator); a relay lens 103; a first polarizing beamsplitter (PBS) 104; half-wave plates 105, 106; a "color-separation optical system" 107 (e.g., a cross-dichroic mirror as shown comprising an R-reflecting dichroic mirror 107R and a B-reflecting dichroic mirror 107B); lenses 108R, 108G, 108B, 109R, 109G, 109B, 110R, 110G, 110B, 111R, 111G, 111B; reflecting mirrors 112G, 112R, 112B, 113G, 113R, 113B; a luminance-signal liquid-crystal light valve (LCLV) 114; color-signal LCLVs 115G, 115R, 115B; a "color-combining optical system" 116 (e.g., a cross-dichroic prism as shown); an "optical-distance correction" element 117; a "polarizing-and-combining optical system" 118 (e.g., a second PBS as shown); and a projection lens 119.

The light source 101 preferably comprises an ellipsoidal mirror and a lamp. The lamp (not shown) is situated at the near focal point of the ellipsoidal mirror. The light source 101 produces an illumination light flux that preferably first passes through an infrared-light absorption filter (not shown) and an ultraviolet-light absorption filter (not shown). The illumination light flux converges on a proximal (relative to the light source 101) end face 102a of the integrator 102 comprising a unit of optical material shaped as a rectangular solid. As the illumination light flux propagates through the integrator 102, the light flux reflects many times from internal surfaces of the integrator 102 and exits from a distal (relative to the light source 101) end face 102b of the integrator 102. The distal end face 102b thus functions as a light source producing a light flux having a uniform light intensity transverse to its direction of propagation.

In this embodiment, the cross-sectional profile and dimensions of the integrator 102 are identical to the shape and dimensions of the image-forming portions of each of the LCLVs 115R, 115G, 115B described later.

Illumination light emitted from the distal surface 102b of the integrator 102 propagates in the X direction and passes through the relay lens 103 (the relay lens 103 comprises the "first relay optical system"). The illumination light then enters the first PBS 104. As the illumination light flux passes through the first PBS 104, the light flux is polarized and split into a first polarized light (P-polarized light) and a second polarized light (S-polarized light). The P-polarized light is transmitted in the X direction through a dielectric multi-layer membrane of the first PBS 104, and the S-polarized light is reflected in the Z direction by the dielectric multi-layer membrane of the first PBS 104. Thus, the first PBS 104 produces first (P) and second (S) polarized light fluxes.

The P-polarized light passes in the X direction from the first PBS 104 through the half-wave plate 105 so as to rotate the polarization orientation of the light by 90 degrees. The P-polarized light (first polarized light flux) then enters the cross-dichroic mirror 107. The cross-dichroic mirror 107 comprises a B-light-reflecting dichroic mirror 107B and an R-light-reflecting dichroic mirror 107R in an X-arrangement. Light incident to the cross-dichroic mirror 107 is separated into G-light that passes in the X direction through the cross-dichroic mirror 107, R-light that is reflected in the −Y direction by the R-light-reflecting dichroic mirror 107R, and B-light that is reflected in the Y direction by the B-light-reflecting dichroic mirror 107B. The G-light from the cross-dichroic mirror 107 passes in the X direction through the lenses 108G, 109G (comprising a first illumination lens group for G-light), reflects in the −Z direction from the mirror 112G, passes through the lens 110G, reflects in the −X direction from the mirror 113G, passes through the lens 111G (wherein the lenses 110G and 111G comprise a second illumination lens group for G light), and is incident on the G-light LCLV 115G. The R-light from the cross-dichroic mirror 107 passes in the −Y direction through the lenses 108R, 109R (comprising a first illumination lens group for R-light), reflects in the −Z direction from the mirror 112R, passes through the lens 110R, reflects in the Y direction from the mirror 113R, passes through the lens 11R (wherein the lenses 110R and 111R comprise a second illumination lens group for R-light), and is incident on the R-light LCLV 115R. The B-light from the cross-dichroic mirror 107 passes in the Y direction through the lenses 108B, 109B (comprising a first illumination lens group for B-light), reflects in the −Z direction from the mirror 112B, passes through the lens 110B, reflects in the −Y direction from the mirror 113B, passes through the lens 111B (wherein the lenses 110B and 111B comprise a second illumination lens group for B-light), and is incident on the B-light LCLV 115B. The LCLVs 115G, 115R, 115B modulate the G, R, and B lights, respectively, and the luminance-signal LCLV 114 modulates the luminance light flux. The modulated luminance light flux then passes through the half-wave plate 106 and through the optical-distance-correction element 117. The cross-dichroic prism 118 recombines the modulated color lights and directs the recombined modulated light flux in the −X direction toward the second PBS 118. The second PBS 118 recombines the recombined modulated color lights with the modulated luminance light. The recombined light is then transmitted through the projection lens 119 to a surface.

As the first polarized light flux (P-polarized light) transmitted by the first PBS 104 propagates in the X-direction, the polarization orientation of the P-polarized light is rotated, by the half-wave plate 105, 90 degrees relative to the second polarized light flux (S-polarized light). The first polarized light flux is incident as P-polarized light on dichroic films of the dichroic mirrors 107R and 107B.

After the P-polarized light is split into the individual color lights G, R, B and modulated by the respective color-signal LCLVs 115G, 115R, 115G, the modulated color lights enter the cross-dichroic prism 116. The cross-dichroic prism 116 comprises color-combining dichroic films on which the modulated color lights are incident as S-polarized light. The color-combining membranes of the cross-dichroic prism 116 exhibit much better spectral characteristics for S-polarized light than for P-polarized light. This allows good reduction of light loss.

In FIG. 4, the projection lens 119 is not shown.

The projection lens 119 includes an aperture stop (not shown) that defines the principal rays through the projection lens. The principal rays passing through the center of the aperture stop becomes parallel to the optical axis by a front lens group of the projection lens 119 (radiation entering the aperture is regarded as entering on the "front side" or "upstream side" and radiation exiting the aperture is regarded as propagating toward the "rear side" or "downstream side"). The projection lens 119 is preferably configured such that the aperture stop is situated at the rear focal point of the front lens group and is telecentric on the front side. In FIG. 4, the two rays from among the principal rays that pass through the outermost side away from the optical axis are indicated by dashed lines.

Light emitted from the distal end face 102b of the integrator 102 forms a real image (primary image) of the distal end face 102b at two conjugate points. A first conjugate point is defined with respect to the first polarized light propagating in the X direction and a second conjugate point is defined with respect to the second polarized light. The real images are formed by the relay lens 103 (in FIG. 4, the aperture stop of the relay lens 103 is denoted by the reference designator 103a) which is telecentric on the emission side. The illumination light is then polarized and split by the first PBS 104.

The second polarized light (S-polarized light) reflected by the first PBS 104 in the −Z direction enters the luminance-signal LCLV 114. The luminance-signal LCLV 114 is situated at the second conjugate point. Thus, the luminance-signal LCLV 114 is situated where the principal rays are parallel to the optical axis. As a result, critical illumination of the luminance-signal LCLV 114 is telecentrically provided. In contrast, the first polarized light transmitted by the first PBS 104 forms an equivalent real image I of the distal end face 102b inside the cross-dichroic mirror 107 as shown in FIG. 4. The principal rays are parallel to the optical axis while entering and exiting the first PBS 104, and the first PBS 104 is situated where the principal rays are parallel to the optical axis.

The polarizing-and-splitting membrane of the first PBS 104 comprises a dielectric multi-layer membrane. This membrane exhibits different polarizing and splitting behavior depending on the angle of incidence of an incoming ray. Since the principal rays are parallel to the optical axis as they enter the first PBS 104, image degradation that would otherwise arise from variations in the angle of incidence at the first PBS 104 does not occur.

The cross-dichroic mirror 107 is situated where the principal rays are parallel to the optical axis, as determined by the aperture stop of the projection lens 119. Although the color-splitting characteristics of the membranes of the cross-dichroic mirror 107 differ depending on the angle of incident light, the telecentricity of incident principal rays to the cross-dichroic mirror 107 ensures that problems with color shading do not occur.

The first illumination lens group (lenses 108R, 109R) and the second illumination lens group (lenses 110R, 111R) for R light comprise a "second relay optical system." Similarly, the first illumination lens group (lenses 108G, 109G) and the second illumination lens a group (lenses 110G, 111G) for G light comprise a "third relay optical system," and the first illumination lens group (lenses 108B and 109B) and the second illumination lens group (lenses 110B, 111B) for B light comprises a "fourth relay optical system". The second, third, and fourth relay optical systems form a real image of the distal end face 102b of the integrator 102 on the respective color-signal LCLVs 115G, 115R, 115B.

In each of the first illumination lens groups, the lenses 108G, 108R, 108B are the same and the lenses 109G, 109R, 109B are the same. Each of the lenses 108G, 108R, 108B is located at the same axial distance from the cross-dichroic mirror 107, and each of the lenses 109G, 109R, 109B is located at the same axial distance from the cross-dichroic mirror 107. Similarly, in the second illumination lens groups, the lenses 110G, 110R, 110B are the same and the lenses 111G, 111R, 111B are the same. Each of the lenses 110G, 110R, 110B is located at the same axial distance from the respective color-signal LCLVs 115G, 115R, 115B, and each of the lenses 111G, 111R, 111B is located at the same axial distance from the respective LCLV 115G, 115R, 115B.

FIG. 4 illustrates rays pertaining to G light. G light passing through the cross-dichroic mirror 107 is transmitted through the third relay optical system comprising the first illumination lens for G light (comprising the lenses 108G and 109G) and the second illumination lens for G light (comprising the lenses 110G and 111G). Upon passing through the first illumination lens, the G light forms a pupil where the principal rays intersect each other. The principal rays diverging downstream of the pupil are made parallel to the optical axis by the second illumination lens and impinge on the G-light LCLV 115G. Thus, the third relay optical system is a telecentric optical system on which entrance and exit sides the principal rays are parallel to the optical axis. The third relay optical system forms a secondary image (i.e., a real image of the image I) of the distal end face 102b of the integrator 102 at the G-light LCLV 115G, and telecentric critical illumination of the G-light LCLV is achieved.

Telecentric critical illumination of the R-light and B-light LCLVs is achieved in the same manner as described above with respect to the G-light LCLV. I.e., the second relay optical system and the fourth relay optical system achieve telecentric critical illumination of the R-light and B-light LCLVs 115R, 115B, respectively.

Each of the color-signal LCLVs 115R, 115G, 115B has a construction wherein a liquid-crystal panel is interposed between two polarizing plates that comprise a cross-Nicol prism. Each liquid-crystal panel comprises, in order from the light-entrance side, a first transparent glass substrate, active nonlinear elements (such as thin-film transistors) that selectively switch ON/OFF a lattice-array of pixels formed on the glass substrate, and a pixel electrode. Each liquid-crystal 35 panel also comprises a liquid-crystal layer, a counter electrode, and a second transparent glass substrate. This construction defines multiple pixels linked to active nonlinear circuit elements. A voltage is created between a locus on the pixel electrode and a corresponding locus on the counter electrode (opposite to the pixel electrode) by the turning ON of a corresponding active element by a light signal for the respective color at that active element. The localized electric field orients liquid-crystal molecules parallel to each other and to the substrate or perpendicular to the substrate. In regions in which active elements are turned ON, polarized light passing through a polarized-light plate on the entrance side passes through the liquid-crystal panel without any changes and is absorbed by the polarized-light plate on the exit side. In regions in which active elements are turned OFF, the liquid-crystal molecules are arranged to maintain a twisted configuration. At such regions, polarized light passing through the polarized-light plate on the entrance side follows the twisting of the liquid crystal molecules; consequently, the orientation of polarization is rotated 90 degrees. Light thus modulated by the LCLV is then emitted from the panel and passes through the polarized-light plate on the emission side. In this way, the LCLVs 115R, 115G, 115B form an image in response to the respective color signals; the luminance-signal LCLV forms a brightness signal by a similar switching action using each color signal or a separate luminance signal. As light passes through each LCLV, the light is modulated according to the signal to which the LCLV responds.

Although each of the color-signal LCLVs 115R, 115B, 115G and the luminance-signal LCLV 114 has an image-forming portion preferably with an identical shape and size as well as a similar basic construction, there are some differences.

Compared to the luminance-signal LCLV 114, each of the color-signal LCLVs 115R, 115B, 115G preferably has fewer pixels (i.e., fewer nonlinear elements (switching elements)). Also, the numerical aperture of the color-signal LCLVs is preferably larger than the numerical aperture of the luminance-signal LCLV 114.

The number of pixels in each of the color-signal LCLVs 115R, 115B, 115G can be identical to the number of pixels in the luminance-signal LCLV 114. But, in such an instance, the numerical aperture is lower for both types of LCLVs. This could pose a problem because, if the number of pixels per unit area is great, the LCLVs are "high resolution", but the projected image is relatively dark. Also, manufacturing high-resolution LCLVs can be very costly. With low-resolution LCLVs (i.e., having a relatively low number of pixels per unit area), the projected image can be brightened by increasing the numerical aperture; however, the projected image would still have low resolution.

In this embodiment, each pixel of the color-signal LCLVs 115R, 115B, 115G preferably has a surface area that is larger than the surface area of a pixel of the luminance-signal LCLV 114. This increases the amount of light emitted by the color-signal LCLVs 115R, 115B, 115G due to an increased numerical aperture, thereby brightening the projected color-signal image. Also, this allows the projected image formed by the luminance-signal LCLV 114 to overlap the projected color-signal, which provides a bright and high-resolution projected image.

Because a secondary real image of the distal end face 102b of the integrator 102 is formed on each color-signal LCLV 115R, 115B, 115G to achieve telecentric critical illumination of each LCLV, there is no occurrence of uneven contrast of the projected image caused by angular characteristics of the color-signal LCLVs 115R, 115B, 115G (namely, uneven contrast arising from differences in the modulation characteristics of the LCLVs due to differences in the angle of incidence of principal rays on the LCLVs).

Light emitted from the color-signal LCLVs 115R, 115B, 115G enters the cross-dichroic prism 116. The cross-dichroic prism 116 is situated closely to the downstream sides of the color-signal LCLVs 115R, 115B, 115G. Nevertheless, the principal rays are maintained parallel to the optical axis. Light entering the cross-dichroic prism 116 undergoes a color combination by the dichroic films thereof. The combined light exits from the cross-dichroic prism 116 while maintaining telecentricity. Namely, the cross-dichroic prism 116 is situated where each principal ray is parallel to the optical axis, as determined by the aperture stop of the projection lens 119. The dichroic films of the cross-dichroic prism 116 have different color-combining characteristics depending on the angle of the incident light. However, because of the telecentricity, color shading does not occur.

Light passing through the color-signal LCLVs 115R, 115B, 115G is the first polarized light flux that was transmitted through the first PBS 104 and that underwent a 90-degree rotation of its polarization orientation by the have-wave plate 105. This light is incident to the dichroic films of the cross-dichroic prism 116 as S-polarized light. This improves the color-combining characteristics of the cross-dichroic prism 116.

Color-combined light transmitted through the cross-dichroic prism 116 enters the second PBS 118. In the second PBS 118, the color-combined light is combined with light transmitted through the luminance-signal LCLV 114 while the principal rays remain parallel with the optical axis.

The luminance-signal LCLV 114 experiences critical illumination by the second polarized light flux separated from the first polarized light flux by the first PBS 104. The luminance-signal LCLV 114 is situated where an equivalent real image of the distal end face 102b of the integrator 102 is formed by the relay lens 103. Because the principal rays of the second polarized light flux are parallel to the optical axis, the second polarized light flux telecentrically illuminates the luminance-signal LCLV 114. This eliminates uneven contrast that would otherwise arise from variations in the angle of incidence of rays on the LCLV.

The luminance-signal LCLV 114 preferably has more pixels than any of the color-signal LCLVs 115R, 115B, 115G and therefore is a "higher resolution" LCLV. But, because there is a limit to how small a nonlinear switching element can be on an LCLV, the luminance signals can be inferior to the color signals in the numerical aperture. While maintaining telecentricity, light passing through the luminance-signal LCLV 114 is transmitted by the half-wave plate 106 to cause another 90-degree rotation of the polarization orientation of the light. The light is transmitted by the transparent optical-distance correction element 117 and enters the second PBS 118. While the principal rays remain parallel to the optical axis, light passing through the optical-distance correction element 117 and the color-combined light emitted by the cross-dichroic prism 116 are polarized and combined by the second PBS 118. The recombined light is projected onto a screen (not shown) by the projection lens 119.

The optical-distance correction element 117 is preferably a rectangular transparent optical member having a fixed refractive index. The correction element 117 is situated between the luminance-signal LCLV 114 and the color-signal LCLVs 115R, 115B, 115G to provide a conjugate relationship between the image on the screen and the projection lens 119. Namely, the optical-distance correction element 117 equalizes the optical distance from the luminance-signal LCLV 114 to the projection lens 119 with the optical distance from each of the color-signal LCLVs 115R, 115B, 115G to the projection lens 119.

The second PBS 118 is situated where the principal rays are parallel with the optical axis. This makes it possible to eliminate uneven contrast that would otherwise be caused by variations in the angle of incidence of rays with the polarizing-and-splitting membrane of the second PBS 118.

Various modifications to the specific configuration of this embodiment, as described above, are contemplated. For example, although a cross-dichroic mirror 107 is preferably used as the color-separation optical system, a cross-dichroic prism can alternatively be used. Compared to a cross-dichroic mirror, a cross-dichroic prism exhibits large differences in color-splitting characteristics with changes in the polarization orientation of the polarized incoming radiation. As a result, it is advantageous with a cross-dichroic prism to avoid using incident light that is P-polarized. In such a situation, before incident light reaches the cross-dichroic prism, it is preferable not to impart any polarization-orientation changes by the have-wave plate 105. Rather, it is preferable that the incident light be S-polarized. Consequently, a half-wave plate is placed upstream of each color-signal LCLV to change the polarization orientation of light before it reaches the respective LCLV. Light from the LCLVs thus reaches the cross-dichroic prism 116 in an S-polarized orientation.

In this embodiment, although a cross-dichroic prism 116 is preferably used as the color-combining optical system, a cross-dichroic mirror could be used instead.

The integrator 102 preferably has a transverse profile that causes light incident on the color-signal LCLVs 115G, 115R, 115B and the luminance-signal LCLV 114 to have a transverse profile identical to the shape and size of the image-forming portion of the LCLVs. However, if the color-signal LCLVs 115R, 115B, 115G, were to be made larger, an integrator having a correspondingly larger transverse profile would be required. This can result in substantially increased cost and manufacturing difficulty. Alternatively, a change in the transverse profile relative to the image-forming portion of the LCLVs could be effected by, e.g., using the relay lens 103 comprised as a magnifying relay lens. Thus, the size of the image of the distal end face 102b of the integrator 102, as formed by the relay lens 103, can be magnified to substantially match the size of the image-forming portion of the LCLVs 115R, 115B, 115G, 114.

Light exiting the distal end face 102b of the integrator 102 is incident to the first relay optical system (comprising the single relay lens 103). Alternatively, the first relay optical system can comprise multiple lenses. The first, second, third, and fourth relay optical systems arranged between the color-separation optical system and each color-signal LCLV 115R, 115B, 115G can also comprise multiple lenses in which a lens is situated directly behind the color-separation optical system and another lens is situated directly upstream of each color-signal LCLV 115R, 115B, 115G.

By arranging the polarizing-and-splitting optical system, the color-separation optical system, the color-combining optical system, and the polarizing-and-combining optical system at positions where principal rays are parallel to the optical axis, a projected image with higher luminance can be obtained. Such a configuration also eliminates uneven contrast and color shading of the projected image.

Also, by providing each color-signal LCLV and the luminance-signal LCLV with telecentric illumination, uneven contrast caused by the angular characteristics of each LCLV can also be eliminated.

In addition, by making the numerical aperture of the luminance-signal LCLV 114 smaller than the numerical aperture of the color-signal LCLVs, a high-resolution, bright projected image can be projected.

Second Embodiment

Figure 5:
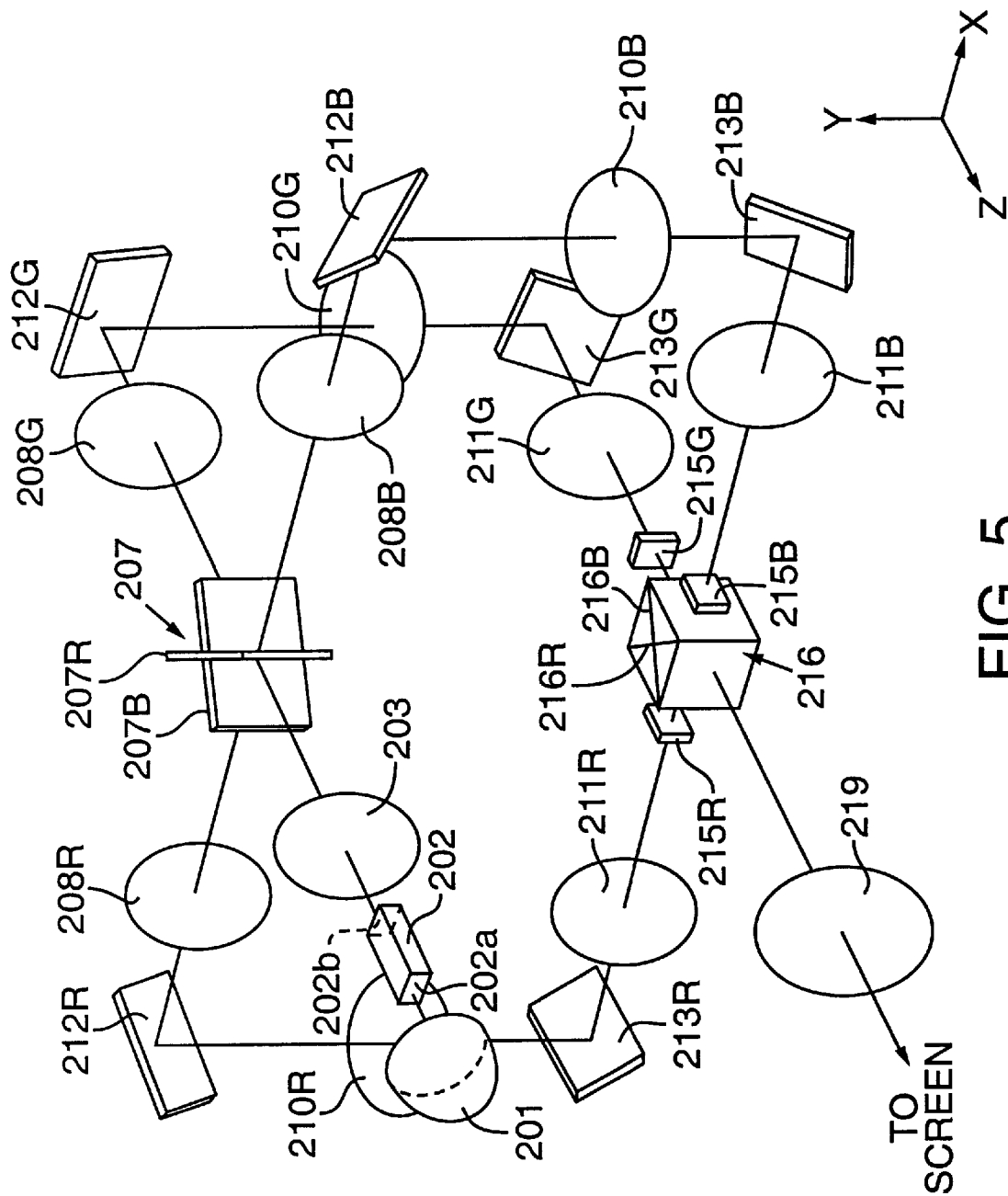
FIG. 5 is a perspective view of a projection display apparatus according to a second representative embodiment of the invention.
Figure 6:
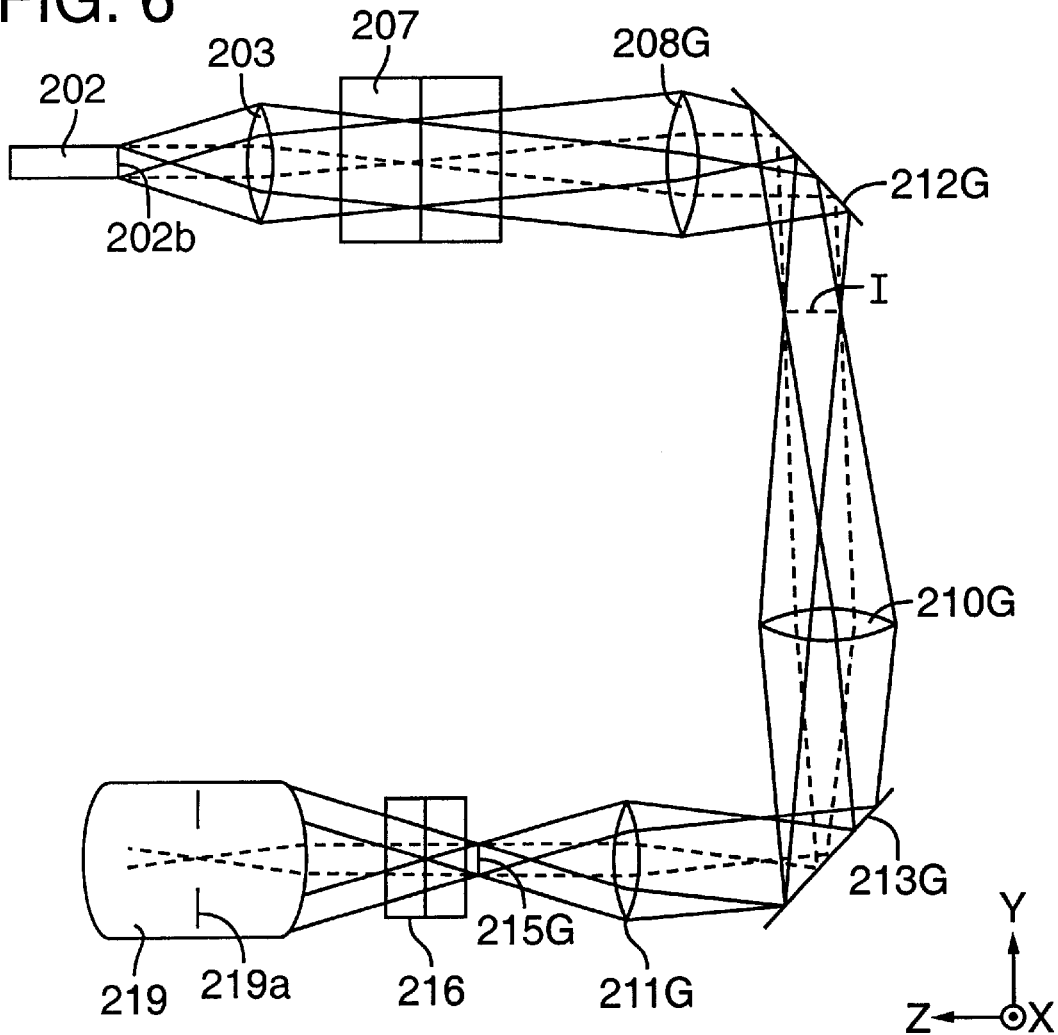
FIG. 6 is an optical diagram of a portion of the FIG. 5 embodiment, showing ray traces in the XZ plane.

This embodiment is illustrated in FIG. 5, in which the X, Y, and Z axes are oriented as indicated. FIG. 6 shows ray traces in the YZ plane of FIG. 5. The solid lines in FIG. 6 denote the most marginal rays of off-axis light and the broken lines in FIG. 6 denote principal rays of off-axis light. Principal rays are determined by an aperture stop 219a in the projection lens 219. The coordinate system in FIG. 6 corresponds to the coordinate system used in FIG. 5.

Referring to FIG. 5, this embodiment comprises a light source 201; an integrator 202 (preferably a rod integrator); a "color-separation optical system" (comprising a cross-dichroic mirror 207 including an R-light-reflecting dichroic mirror 207R and a B-light-reflecting dichroic mirror 207B); a first illumination lens 203; second illumination lenses 208R, 208G, 208B; third illumination lenses 210R, 210G, 210B; fourth illumination lenses 211R, 211G, 211B; a "color-combining optical system" (comprising a cross-dichroic prism 216 including an R-light-reflecting dichroic film 216R and a B-light-reflecting dichroic film 216B); color-signal liquid-crystal light valves (LCLVs) 215R, 215G, 215B; bending mirrors 212R, 213R, 212G, 213G, 212B, 213B; and a projection lens 219.

The light source 201 and integrator 202 are preferably configured as described above in the first embodiment. The integrator 202 comprises a proximal end face 202a and a distal end face 202b. As light passes through the integrator 202 from the proximal end face 202a to the distal end face 202b, the light reflects many times from internal surfaces of the integrator 202. Consequently, the distal end face 202b is illuminated with overlapping light from multiple virtual images of the light source 201. Thus, light exiting the distal end face 202b essentially functions as a planar light source having uniform light intensity.

Light emitted from the distal end face 202b propagates in the −Z direction and enters the first illumination lens 203. The first illumination lens 203, together with the second illumination lenses 208R, 208G, 208B, forms an "illumination relay optical system".

The cross-dichroic mirror 207 is situated between the first illumination lens 203 and the second illumination lenses 208R, 208G, 208B. The first illumination lens 203 has a focal length $f_1$ and each of the second illumination lenses has a focal length $f_2$. The first illumination lens 203 is axially spaced from each of the second illumination lenses 208R, 208G, 208B by the distance $f_1+f_2$. In other words, the rear focal point of the first illumination lens 203 and the front focal point each of the second illumination lenses 208R, 208G, 208B coincide.

Light passing through the first illumination lens 203 enters a pupil space defined by the first illumination lens 203 and the second illumination lenses 208R, 208G, 208B. The light then enters the color-separation optical system comprising the R-light-reflecting dichroic mirror 207R and the B-light-reflecting dichroic mirror 207B arranged in an X configuration relative to each other. R light is reflected from the R-light-reflecting dichroic mirror 207R and propagates in the −X direction; B light is reflected by the B-light-reflecting dichroic mirror 207B and propagates in the X direction; and G light is transmitted through the R-light- and B-light-reflecting dichroic mirrors 207R, 207B and continues propagation in the −Z direction.

The cross-dichroic mirror 207 is situated at the rear focal point of the first illumination lens 203 (and thus at the front focal points of the second illumination lenses 208R, 208G, 208B). In other words, the cross-dichroic mirror 207 is situated where principal rays cross the optical axis as shown in FIG. 6.

R light, G light, and B light separated by the cross-dichroic mirror 207 are transmitted by the respective second illumination lenses 208R, 208G, 208B and further reflected by the respective bending mirrors 212R, 212G, 212B to the −Y direction. An image of the distal end face 202b of the integrator 202 is formed by each light at the rear focal point of each of the respective second illumination lenses 208R, 208G, 208B.

FIG. 6 shows ray traces pertaining to G light. In FIG. 6, the G-light optical system is shown between the color-separation optical system and the color-combining optical system.

The G-light component in the light passing through the first illumination lens 203 passes through the dichroic mirror 207 (situated an axial distance $f_1$ from the first illumination lens 203), passes through the second illumination lens 208G (situated an axial distance $f_1+f_2$ from the first illumination lens 203), is reflected in the −Z direction by the mirror 212G, and forms a real image I of the distal end face 202b at a location axially situated a distance $f_2$ from the second illumination lens 208G. Thus, the image I has a size that is $f_2/f_1$ of the size of the distal end face 202b.

The location of the cross-dichroic mirror 207 coincides with a location at which the principal rays cross the optical axis, as determined by an aperture stop 219a of the projection lens 219 and as shown in FIG. 6. Because the transverse profile of the illumination light flux is smallest at such a location, the cross-dichroic mirror 207 can be made quite small.

Further with respect to FIG. 6, the principal rays are parallel to the optical axis between the distal end face 202b and the first illumination lens 203 and between the second illumination lens 208G and the real image I. Thus, the illumination-relay optical system defined by the first illumination lens 203 and the second illumination lens 208G is a telecentric optical system with respect to both the entrance side and the exit side thereof.

R light reflected in the −X direction by the cross-dichroic mirror 207 passes through the second illumination lens 208R (having a focal length $f_2$), is reflected in the −Y direction by the bending mirror 212R, and (similar to the G light) forms a real image at a position located the axial distance $f_2$ from the second illumination lens 208R (situated the distance $f_1+f_2$ from the first illumination lens 203).

B light reflected in the X direction by the cross-dichroic mirror 207 passes through the second illumination lens 208B (having a focal length $f_2$), is reflected in the −Y direction by the bending mirror 212B, and forms a real image at an axial distance $f_2$ from the second illumination lens 208B (situated the distance $f_1+f_2$ from the first illumination lens 203).

In FIG. 6, rays propagating from the real image I formed by the G-light component passes through the third illumination lens 210G (having a focal length $f_2$ and situated the axial distance $f_2$ from the real image I), is reflected by the bending mirror 213G in the Z direction, is transmitted by the fourth illumination lens 211G (having a focal length f, and situated the axial distance $f_1+f_2$ from the third illumination lens 210G), and enters the G-light LCLV 215G situated the axial distance $f_1$ from the fourth illumination lens 211G. Thus, the rear focal point of the third illumination lens 210G and the front focal point of the fourth illumination lens 211G coincide. As a result of this configuration, an image of the real image I is formed on the G-light LCLV 215G at a magnification of $f_1/f_2$. The principal rays are parallel to the optical axis between the G-light LCLV 215G and the fourth illumination lens 211G, thereby forming a telecentric optical system between the LCLV 215G and the fourth illumination lens 211G and between the third illumination lens 210G and the real image I.

R light separated by the cross-dichroic mirror 207 passes through the second illumination lens 208R and forms a real image I at an axial distance $f_2$ from the second illumination lens 208R. The R light is reflected by the mirror 212R in the −Y direction and passes through the third illumination lens 210R (having a focal length $f_2$ and situated a distance $f_2$ from the real image I formed by the R light. The R light is reflected by the bending mirror 213R in the X direction, is transmitted by the fourth illumination lens 211R (having a focal length fl), and enters the R-light LCLV 215R (situated a distance $f_1$ from the fourth illumination lens 211R). The third illumination lens 210R is situated an axial distance $f_1+f_2$ from the fourth illumination lens 211R. Thus, the rear focal point of the third illumination lens 210R and the front focal point of the fourth illumination lens 211R coincide. The third and fourth illumination lenses comprise an "R-light illumination-relay optical system".

The B light separated by the cross-dichroic mirror 207 passes through the second illumination lens 208B and forms a real image I a distance $f_2$ from the second illumination lens 208B. The B light is reflected by the mirror 212B in the −Y direction and passes through the third illumination lens 210B (having a focal length $f_2$ and situated the axial distance $f_2$ from the real image I formed by the B light). The B light is reflected by the bending mirror 213B in the −X direction, passes through the fourth illumination lens 211B (having a focal length $f_1$), enters a B-light LCLV 215B (situated the distance $f_1$ from the fourth illumination lens 211B). The third illumination lens 210B and the fourth illumination lens 211B are axially spaced apart by the distance $f_1+f_2$. This arrangement is such that the rear focal point of the third illumination lens 210B and the front focal point of the fourth illumination lens 211B coincide. The third and fourth illumination lenses 210B, 211B comprise a "B-light illumination relay-optical system".

Similar to the G light, principal rays of the R light are parallel to the optical axis at certain locations in the optical path. The aperture stop 219a of the projection lens 219 forms a telecentric optical system between the real image I and the third illumination lens 210R as well as between the fourth illumination lens 211R and the LCLV 215R. B-light principal rays are parallel to the optical axis between the real image I and the third illumination lens 210B and between the fourth illumination lens 211B and the B-light LCLV 215B.

Thus, an image of the distal end face 202b, having a uniform light intensity distribution, is formed on the surface of each LCLV 215R, 215G, 215B. Each LCLV 215R, 215G, 215B receives critical illumination by the uniform-intensity image. The image on each LCLV 215R, 215G, 215B has a magnification $f_1/f_2$.

In view of the foregoing, the distal end face 202b and each LCLV 215R, 215G, 215B have a conjugate relationship. In this relationship, there is no net magnification. Consequently, the image-forming surfaces of the LCLVs 215R, 215G, 215B and the distal end face 202b of the integrator 202 can have identical sizes and shapes, and an efficient and uniform critical illumination of the LCLVs can be achieved.

The second illumination lenses 208R, 208G, 208B all have the focal length $f_2$. Similarly, the third illumination lenses 210R, 210G, 210B all have the focal length $f_2$; and the fourth illumination lenses 211R, 211G, 211B all have focal length $f_1$. Moreover, the axial distance from the cross-dichroic mirror 207 to each of the LCLVs 215R, 215G, 215B is the same.

Each LCLV 215R, 215G, 215B has a construction and operating principle as described above with respect to the primary-color LCLVs in first embodiment.

The cross-dichroic prism 216, which functions as a color-combining optical system, is situated on the emission side of each LCLV 215R, 215G, 215B. The cross-dichroic prism 216 is preferably constructed of four right-angle prisms with the R-light-reflecting dichroic film 216R and the B-light-reflecting dichroic film 216B forming an X-shaped profile. G light modulated by the G-light LCLV 215G propagates in the Z direction and passes through the R-light-reflecting dichroic film 216R and the B-light-reflecting dichroic film 216B. R light modulated by the R-light LCLV 215R propagates in the X direction and is reflected in the Z direction by the R-light-reflecting dichroic film 216R. B light modulated by the B-light LCLV 215B propagates in the −X direction and is reflected in the Z direction by the B-light-reflecting dichroic film 216B. Thus, each color component is emitted from the cross-dichroic prism 216 in a direction (Z direction) opposite to the direction (−Z direction) in which the illumination light propagated toward the cross-dichroic mirror 207.

Each of the cross-Nicol polarized-light plates comprising each color-signal LCLV has a polarization direction such that linearly polarized light transmitted through the R-light LCLV 215R oscillates in the ±Y direction, linearly polarized light transmitted through the G-light LCLV 215G oscillates in the ±Y direction, and linearly polarized light transmitted through the B-light LCLV 215B also oscillates in the ±Y direction. Hence, with respect to the R-light reflecting dichroic film 216R and the B-light reflecting dichroic film 216B, the linearly polarized light emitted by each LCLV 215R, 215G, 215B is S-polarized. This enables the spectral characteristics of the dichroic films 216R, 216B to be improved.

The projection lens 219 is situated on the emission side (Z direction) of the cross-dichroic prism 216. As shown in FIG. 6, the projection lens 219 comprises an aperture stop 219a. The aperture stop 219a is situated at the rear focal point of a lens group positioned closer to the cross-dichroic prism 216 than the aperture stop 219a. The principal rays of the projection-display apparatus of this embodiment are determined by the aperture stop 219a, and the principal rays are parallel to the optical axis between the cross-dichroic prism 216 and the projection lens 219. Thus, the projection lens 219 is telecentric on the cross-dichroic-prism 216 side (i.e., entrance side).

As shown in FIG. 6, the principal rays are also parallel to the optical axis between the distal end face 202b of the integrator 202 and the first illumination lens 203, between the second illumination lens 208G and the third illumination lens 210G, and between the fourth illumination lens 211G and the projection lens 219. Although not shown in FIG. 6, the principal rays are parallel to the optical axis between the second illumination lens 208R and the third illumination lens 210R and between the second illumination lens 208B and the third illumination lens 211B. In other words, each of the illumination-relay optical system, the R-light-relay optical system, the G-light-relay optical system, and the B-light-relay optical system is telecentric on both sides.

Because the color-combining dichroic prism 216 is located where the principal rays are parallel to the optical axis, namely in a region of telecentricity, color shading that would otherwise arise from the angular characteristics of the color-combining optical system does not occur. This makes it possible, with this embodiment, to project a full-color image with excellent image quality. Also, because the R-light, G-light, and B-light LCLVs 215R, 215G, 215B are located in respective regions of telecentricity, any uneven contrast of the projected image caused by the angular characteristics of the LCLVs 215R, 215G, 215B does not occur. This also facilitates projection of full-color images with excellent image quality.

In this embodiment, the cross-dichroic mirror 207 is preferably located where the principal rays cross the optical axis between the first illumination lens 203 and the second illumination lenses 208R, 208G, 208B. More specifically, the line of intersection of the mirrors 207R, 207B crosses the optical axis at the point where the principal rays cross the optical axis, as shown in FIG. 6. Such positioning of the cross-dichroic mirror 207 avoids any problems of uneven color projection that could otherwise arise if the cross-dichroic mirror 207 were to be placed at any other location the first illumination lens 203 and the second illumination lenses 208R, 208G, 208B.

The modulated images produced by each color-signal LCLV 215R, 215G, 215B are superimposed with each other on a viewing screen (not shown) or other suitable surface. Each LCLV is adjustable to allow precise registration of the individual images with each other on the screen.

Various modifications to the specific configuration of this embodiment described above are contemplated. For example, a fly-eye lens can be used instead of the integrator 202. Also, instead of the light source 201 comprising a with ellipsoidal mirror, illumination light can be produced by a lamp with a parabolic mirror or a spherical mirror.

In addition, a field stop can be placed at a position conjugate to the distal end face 202b of the integrator 202. With such an alternative arrangement, any internal reflections and scattered light in the optical system of the projection-display system can be eliminated, thereby allowing further improvements in contrast of the projected image and preventing heating of the LCLVs.

With this embodiment, the color-combining optical system is arranged at a position where principal rays, as defined by the aperture stop 219a, are parallel to the optical axis. Such a configuration makes it possible to eliminate color shading caused by angular characteristics of the color-combining optical system. Also, the color-separation optical system is preferably arranged at a position where the principal rays cross the optical axis. Such a configuration enables the size of the color-separation optical system to be reduced and facilitates elimination of color unevenness in the projected image.

In addition, each color-signal LCLV is situated at a position where the principal rays are parallel to the optical axis. Such a configuration eliminates uneven contrast of the projected image caused by the angular characteristics of the light valves.

Third Embodiment

Figure 7:
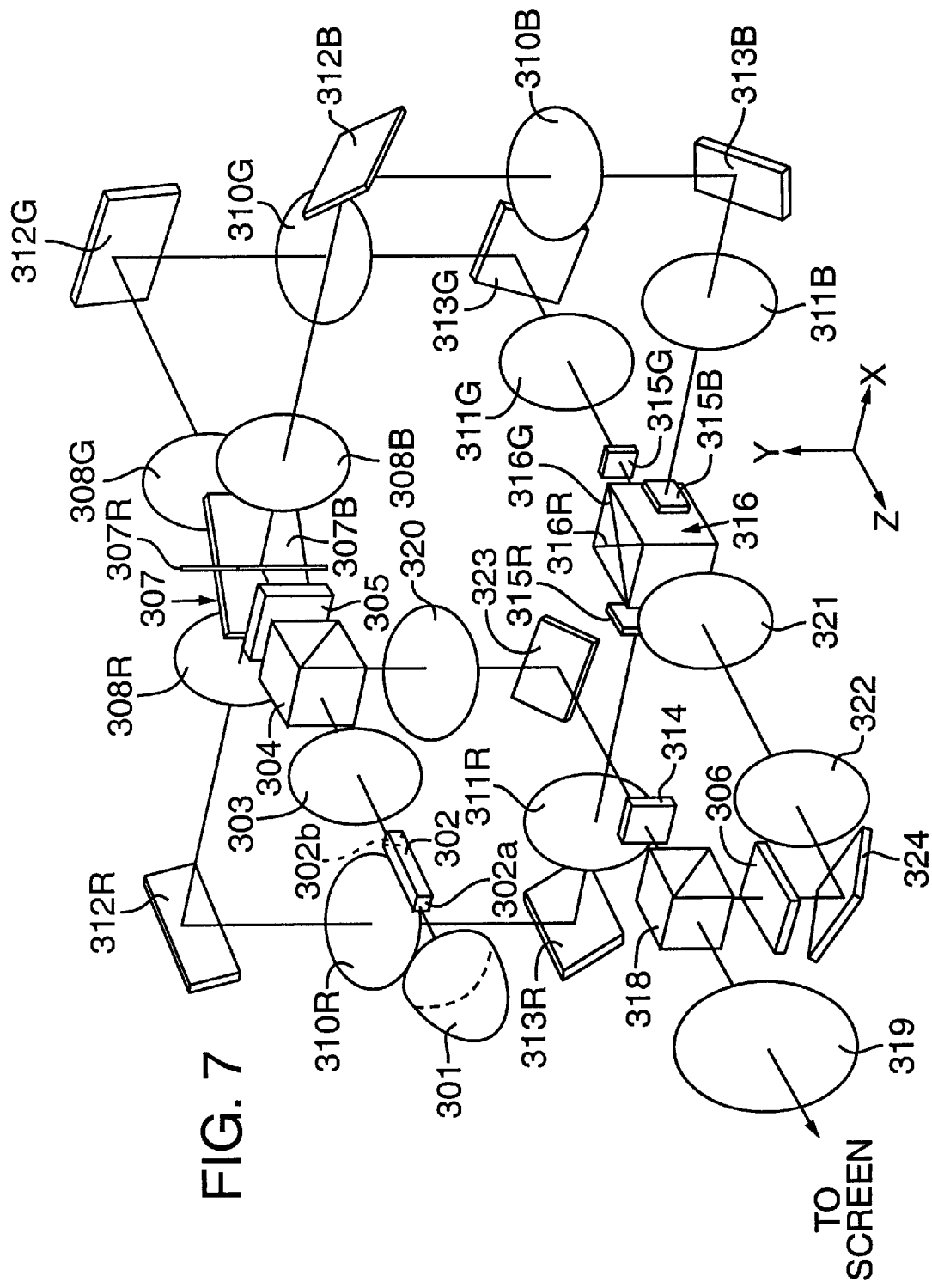
FIG. 7 is a perspective view of a projection-display apparatus according to a third representative embodiment of the invention.
Figure 8:
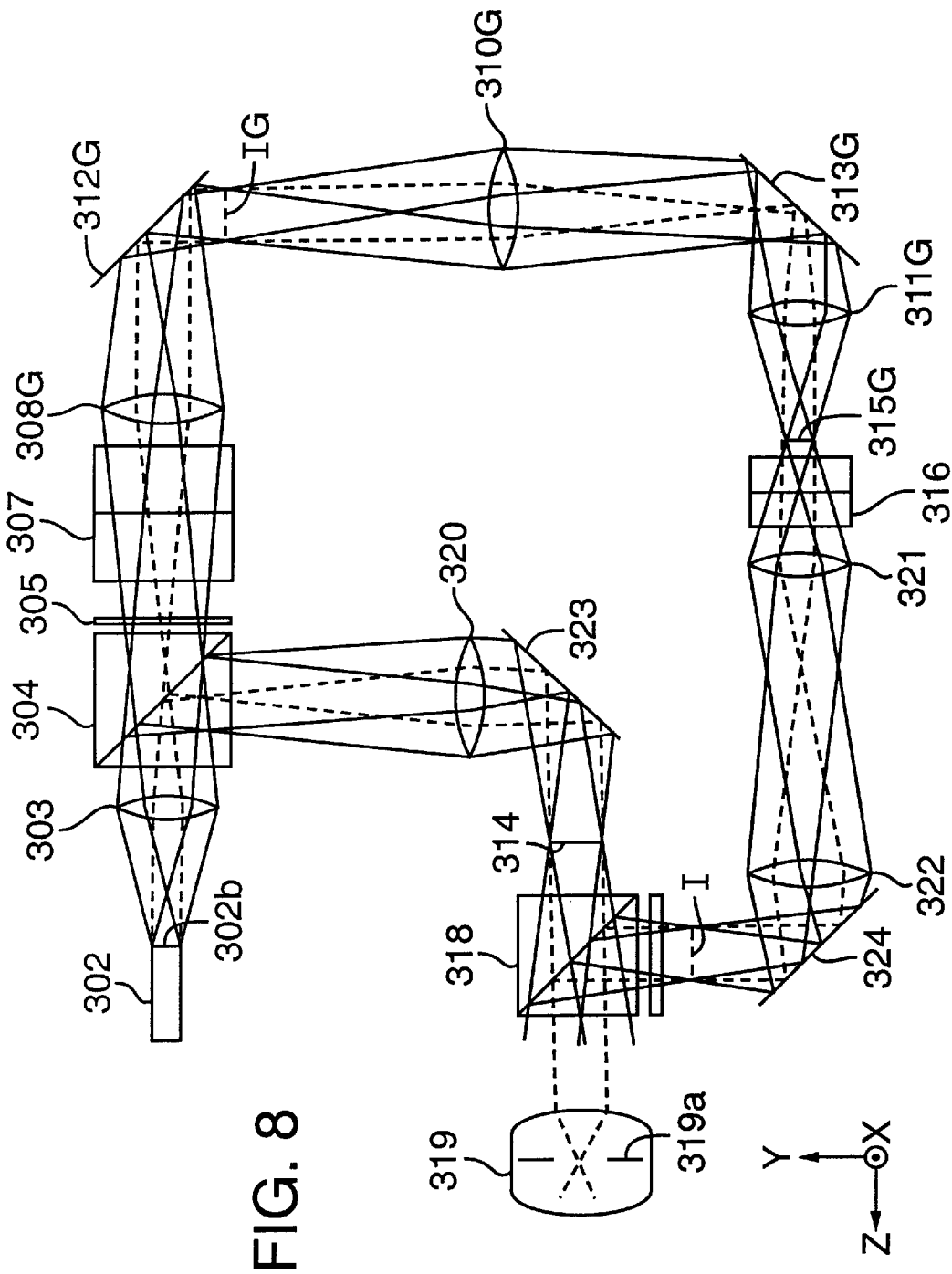
FIG. 8 is an optical diagram of a portion of the FIG. 7 embodiment, showing ray traces in the XZ plane.

FIG. 7 is a schematic perspective view of a projection-display apparatus according to this embodiment. X, Y, and Z coordinate axes are as shown. FIG. 8 depicts ray traces in the YZ plane of FIG. 7. In FIG. 8, the solid lines denote the most marginal of off-axis rays and the broken lines denote principal rays of off-axis light, wherein the principal rays are determined by an aperture stop located a projection lens of the apparatus. The coordinate system in FIG. 8 corresponds to the coordinate system in FIG. 7.

Referring to FIG. 7, this embodiment comprises a light source 301; an integrator 302 (preferably a rod integrator); a first illumination lens 303; a first PBS 304; a first half-wave plate 305, a "color-separation optical system" (comprising a cross-dichroic mirror 307 including an R-light-reflecting dichroic mirror 307R and a B-light-reflecting dichroic mirror 307B); second illumination lenses 308R, 308G, 308B; first bending mirrors 312R, 312G, 312B; third illumination lenses 310R, 310G, 310B; second bending mirrors 313R, 313G, 313B; fourth illumination lenses 311R, 311G, 311B; color-signal liquid-crystal light valves (LCLVs) 315R, 315G, 315B; a "color-combining optical system" (comprising a cross-dichroic prism 316 including an R-light-reflecting dichroic film 316R and a B-light-reflecting dichroic film 316B); lenses 321, 322; a third bending mirror 324; a second half-wave plate 306; a second PBS 318; a luminance-signal illumination lens 320; a fourth bending mirror 323; a luminance-signal LCLV 314; and a projection lens 319.

The preferred configuration of the light source 301 is as described above in the first embodiment. Illumination light from the light source 301 converges on a proximal end face 302a of the integrator 302 and propagates through the integrator as described above in the first and second embodiments. Light exiting the distal end face 302b of the integrator 302 has a uniform light intensity.

Light is emitted from the distal end face 302b in the −Z direction and passes through the first illumination lens 303. The first illumination lens 303 together with the second illumination lenses 308R, 308G, 308B comprise an "illumination-relay optical system".

The first illumination lens 303 has a focal length $f_1$ and serves as a "front group" of the illumination-relay optical system. The second illumination lenses 308R, 308G, 308B each have a focal length $f_2$ and serve as a "rear group" of the illumination-relay optical system. The axial distance between the first illumination lens 303 and any of the second illumination lenses 308R, 308G, 308B is $f_1+f_2$. Thus, the rear focal point of the first illumination lens 303 and the front focal points of the second illumination lenses 308R, 308G, 308B coincide.

The first PBS 304 is located between the first illumination lens 303 and the second illumination lenses 308R, 308G, 308B. The first PBS 304 functions as a "polarizing-and-splitting optical system" and the cross-dichroic mirror 307 functions as a "color-separation optical system". The first half-wave plate 305 is arranged between the first PBS 304 and the cross-dichroic mirror 307.

Light passing through the first illumination lens 303 enters the first PBS 304, is polarized and separated into a first polarized light (P-polarized light, i.e., linearly polarized light having an oscillation direction in the ±Y direction) emitted in the −Z direction, and a second polarized light (S-polarized light, i.e., linearly polarized light having an oscillation direction in the ±Y direction) emitted in the −Y direction. The first polarized light passes through the first half-wave plate 305 in which the light undergoes a 90-degree rotation of its oscillation direction. Thus, the first polarized light is incident to the cross-dichroic mirror 307 as linearly polarized light oscillating in the ±X direction.

With respect to the cross-dichroic mirror 307, the R-light-reflecting dichroic mirror 307R and the B-light-reflecting dichroic mirror 307B are arranged in an X configuration to separate incident light into R, G, and B light. B light is reflected by the B-light-reflecting dichroic mirror 307B in the X direction, G light is transmitted by the dichroic mirrors 307R, 307B to continue propagating in the −Z direction, and R light is reflected by the R-light-reflecting dichroic mirror 307R.

The R light then enters the second illumination lens 308R, the B light enters the second illumination lens 308B, and the G light enters the second illumination lens 308G of the illumination relay optical system. Each of the color-separated R, G, and B lights forms an image of the distal end face 302b for the respective color at the rear focal point of the respective second illumination lens 308R, 308G, 308B in the respective light path.

FIG. 8 illustrates rays associated with G light. The G light emitted by the cross-dichroic mirror 307 is transmitted by the second illumination lens 308G and is reflected by the bending mirror 312G in the −Y direction. At an axial location separated from the second illumination lens 308G by the distance $f_2$, the G light forms a real image (primary image) IG of the distal end face 302b. The G light from the primary image IG is transmitted by the third illumination lens 310G (having a focal length $f_2$ and axially separated from the primary image IG by the distance $f_2$), is reflected by the bending mirror 313G in the Z direction, and is transmitted through the fourth illumination lens 311G (having a focal length $f_1$ and axially separated from the third illumination lens 310G by the distance $f_1+f_2$.

The illumination lenses 310G and 311G comprise a G-light relay optical system. As described above, these lenses are arranged such that the rear focal point of the lens 310G and the front focal point of the lens 311G coincide on the optical axis. Light emitted from the G-light relay optical system propagates in the Z direction to the G-light LCLV 315G. The G-light LCLV 315G is separated from the illumination lens 311G by the axial distance $f_1$. At the G-light LCLV 315G a real image (secondary image) of the distal end face 302b is formed.

R light reflected in the −X direction by the cross-dichroic mirror 307 is reflected by the bending mirror 312R in the −Y direction. The R light is transmitted by the second illumination lens 308R and forms a real image (primary image) of the distal end face 302b of the integrator 302 at an axial location a distance $f_2$ from the second illumination lens 308R. The R light from this primary image is transmitted by the third illumination lens 310R, reflected by the bending mirror 313R in the X direction, and passed through the fourth illumination lens 311R.

The illumination lenses 310R and 311R comprise an R-light relay optical system. The third illumination lens 310R has a focal length $f_2$ and situated an axial distance of $f_2$ from the primary image. The fourth illumination lens 311R has a focal length $f_1$ and is situated an axial distance of $f_1+f_2$ from the third illumination lens 310R. Thus, the rear focal point of the third illumination lens 310R and the front focal point of the fourth illumination lens 311R coincide. R light from the R-light relay optical system propagates in the X direction to the R-light LCLV 315R. The R-light LCLV 315R is separated from the fourth illumination lens 311R by an axial distance of $f_1$. At the R-light LCLV 315R a real image (secondary image) of the distal end face 302b is formed by the R light.

B light reflected in the X direction by the cross-dichroic mirror 307 is reflected by the bending mirror 312B in the −Y direction. The B light is transmitted by the second illumination lens 308B and forms a real image (primary image) of the distal end face 302b, using B light, at an axial location spaced a distance $f_2$ from the second illumination lens 308B. B light from the primary image is transmitted by the third illumination lens 310B, reflected by the bending mirror 313B in the −X direction, and passed through the fourth illumination lens 311B.

The illumination lenses 310B and 311B comprise a B-light relay optical system. The third illumination lens 310B has a focal length $f_2$ and is situated an axial distance of $f_2$ from the image. The fourth illumination lens 311B has a focal length $f_1$ and is situated an axial distance of $f_1+f_2$ from the third illumination lens 310B. Thus, the rear focal point of the third illumination lens 310B and the front focal point of the fourth illumination lens 311B coincide on the optical axis. B light from the B-light relay optical system propagates in the −X direction to the B-light LCLV 315B. The B-light LCLV 315B is separated from the fourth illumination lens 311B by an axial distance $f_1$. At the B-light LCLV 315B a real image (secondary image) is formed by the B light of the distal end face 302b of the integrator 302.

Thus, at each color-signal LCLV 315R, 315G, 315B, an image of the distal end face 302b is formed having uniform light intensity. Each color-signal LCLV receives critical illumination by such an image. The first illumination lens 303 comprising the illumination-relay optical system and the second illumination lenses 308R, 308G, 308B form respective primary images of the distal end face 302b at a magnification of $f_2/f_1$. Each respective light-color relay optical system forms the corresponding secondary image (of the respective primary image) at the respective color-signal LCLV 315R, 315G, 315B at a magnification of $f_1/f_2$. In such a manner, the =distal end face 302b of the integrator 302 has a conjugate relationship with each color-signal LCLV 315R, 315G, 315B. Because there is no magnification, the height and width of the distal end face 302b is identical to the height and width of the image-display surface of each color-signal LCLV.

The R-light second illumination lens 308R and the B-light second illumination lens 308B each have a focal length $f_2$ identical to the G-light second illumination lens 308G. Also, the third illumination lens 310R and the third illumination lens 310B each have a focal length $f_2$ identical to the third illumination lens 310G; and the fourth illumination lens 311R and the fourth illumination lens 311B each have a focal length $f_1$ identical to the fourth illumination lens 311G.

The axial distance from the cross-dichroic mirror 307 to each color-signal LCLV 315R, 315G, 315B is the same.

The color-signal LCLVs 315R, 315G, 315B have structure and function that are preferably as described above in the first embodiment.

The cross-dichroic prism 316 functions as a color-combining optical system and is situated on the emission side of each color-signal LCLV 315R, 315G, 315B. The cross-dichroic prism 316 comprises four right-angle prisms with an intervening R-light-reflecting dichroic film 316R and an intervening B-light-reflecting dichroic film 316B arranged in an X configuration. G light modulated by the G-light LCLV 315G and propagating in the Z direction passes through the R-light-reflecting dichroic film 316R and the B-light-reflecting dichroic film 316B. R light modulated by the R-light LCLV 315R and propagating in the X direction is reflected by the R-light reflecting dichroic film 316R in the Z direction. B light modulated by the B light LCLV 315B and propagating in the −X direction is reflected in the Z direction by the B-light reflecting dichroic film 316B.

Thus, the illumination light is separated into three colors each propagating in a respective direction (R light in the −X direction, G light in the −Z direction, and B light in the X direction) by the cross-dichroic mirror 307. The colored lights pass through the corresponding color-signal LCLVs 315R, 315G, 315B and enter the cross-dichroic prism 316 in opposite directions (R light in the X direction, G light in the Z direction, B light in the −X direction) for color-combination. The color-combined light is emitted from the cross-dichroic prism 316 in a direction (Z direction) opposite to the direction (−Z direction) in which the illumination light entered the cross-dichroic mirror 307. The linearly polarized R light emitted from the R-light LCLV 315R oscillates in the ±Y direction, the linearly polarized G light emitted from the G-light LCLV 315G oscillates in the ±Y direction, and the linearly polarized B light emitted from the B-light LCLV 315B oscillates in the ±Y direction.

As a result of the first half-wave plate 305 being situated between the first PBS 304 and the cross-dichroic mirror 307, the oscillation direction of linearly polarized light emitted from each color-signal LCLV 315R, 315G, 315B and entering the cross-dichroic prism 316 is made S-polarized with respect to the membrane surfaces of the dichroic films of the cross-dichroic prism 316. Making the incoming radiation to the color-combining optical system S-polarized with respect to the color-combination membrane surfaces of the color-combining optical system provides the color-combining membranes with much higher-quality spectral characteristics compared to their spectral characteristics with P-polarized light. This reduces light loss.

A combining relay optical system comprising the lenses 321, 322 is situated on the emission side (Z direction) of the cross-dichroic prism 316. Light passing through the combining relay optical system propagates in the Z direction to the bending mirror 324, reflects in the Y direction, and then forms a combined superimposed image I (FIG. 8) of each color-signal LCLV 315R, 315G, 315B.

With respect to the combining relay optical system, the lens 321 has a focal length $f_3$ and the lens 322 has a focal length $f_4$. The lenses 321, 322 are axially separated from each other by a distance $f_3+f_4$. Thus, the image I has a magnification of $f_4/f_3$ relative to the size of the distal end face 302b of the integrator 302.

The second polarized light (linearly polarized light having an oscillation direction in the ±X direction) reflected by the first PBS 304 propagates in the −Y direction and passes through the third illumination lens 320 having a focal length $f_2$. The light is then reflected by the bending mirror 323 in the Z direction. The third illumination lens 320 is situated an axial distance of $f_1+f_2$ from the first illumination lens 303. Thus, the rear focal point of the first illumination lens 303 and the front focal point of the third illumination lens 320 are coincident.

The luminance-signal LCLV 314 is situated at the rear focal point of the third illumination lens 320. In this embodiment, the illumination lenses 303, 320 comprise a luminance-signal relay optical system that forms an image of the distal end face 302b of the integrator 302 on the luminance-signal LCLV 314. The illumination lens 303 comprises a front group of the luminance-signal relay optical system and the illumination lens 320 comprises a rear group of the luminance-signal relay optical system. (Actually, the illumination lens 303 functions as both the front group of the illumination relay optical system and the front group of the luminance-signal relay optical system.)

The luminance-signal LCLV 314 has a construction similar to the color-signal LCLVs 315R, 315G, 315B. However, the luminance-signal LCLV 314 is preferably larger than the color-signal LCLVs and preferably has a a larger number of pixels. A magnified image of the distal end face 302b of the integrator 302 is formed on the luminance-signal LCLV 314 by the luminance-signal relay optical system. The image has a magnification of $f_2/f_1$. In contrast, as described above, the combined image I has a magnification of $f_4/f_3$. Therefore, the values of $f_1$ and $f_2$ and the values of $f_3$ and $f_4$ can be determined from the ratio of the sizes of the luminance-signal LCLV 314 and any of the color-signal LCLVs 315R, 315G, 315B.

The second PBS 318 functions as a combining optical system. The second PBS 318 is situated on the emission side (Z-direction side) of the luminance-signal LCLV 314. Light emitted from the luminance-signal LCLV 314 is linearly polarized and has an oscillation in the ±Y direction. Because the light is P-polarized with respect to the polarizing-and-splitting portion of the second PBS 318, the light is transmitted by the second PBS 318 and enters the projection lens 319.

Linearly polarized light having an oscillation direction in the ±Z direction propagates in the Y direction from the combined image I formed by the combining relay optical system (lenses 321, 322). This linearly polarized light passes through the second half-wave plate 306 that rotates the polarization orientation 90 degrees (such that the light oscillates in the ±X direction). The light thus becomes S-polarized light with respect to the polarizing-and-splitting portion of the second PBS 318. The light is thus reflected by the polarizing-and-splitting portion in the Z direction and enters the projection lens 319.

The luminance-signal LCLV 314 and the combined image I are at a position conjugate to the projection lens 319.

Thus, color-combined light and light from the luminance-signal LCLV 314 are combined by the second PBS 318. The combined light is projected on the screen (not shown in the figure) by the projection lens 319.

The projection lens 319 comprises an aperture stop 319a. The aperture stop 319a is situated at the rear focal point of the lens group positioned closer to the second PBS 318 than the aperture stop 319a. The principal rays of the projection-display apparatus are determined by the aperture stop 319a; the principal rays are parallel to the optical axis between the second PBS 318 and the projection lens 319. Thus, the projection lens 319 is telecentric on the second-PBS side.

In FIG. 8, the principal rays are parallel to the optical axis between the distal end face 302b of the integrator 302 and the first illumination lens 303, between the second illumination lens 308G for G light and the third illumination lens 310G, between the fourth illumination lens 311G and the lens 321, and between the third illumination lens 320 and the projection lens 319.

Although not depicted in FIG. 8, the principal rays are parallel to the optical axis between the second illumination lens 308R for R light and the third illumination lens 310R, between the fourth illumination lens 311R and the lens 321, between the second illumination lens 308B for B light and the third illumination lens 310B, and between the fourth illumination lens 311B and the lens 321. Thus, each of the illumination relay optical systems 303 and 308R, 303 and 308G, 303 and 308B, the illumination-signal relay optical system 303 and 320, the R-light relay optical system 310R and 311R, the B-light relay optical system 310B and 311B, and the G-light relay optical system 310G and 311G is telecentric on both sides.

The combining relay optical system comprising the illumination lenses 321, 322 is telecentric; the principal rays are parallel to the optical axis between each color-signal LCLV 315R, 315G, 315B and the combining relay optical system. The principal rays are also parallel to the optical axis from the combining relay optical system, through the luminance-signal LCLV 314, and to the illumination lens 320.

Each color-signal LCLV 315R, 315G, 315B and the luminance-signal LCLV 314 are configured to maintain the principal rays parallel with the optical axis. Maintenance of such telecentricity helps eliminate uneven contrast in the projected image arising from variations of the angle of incidence of the principal rays on the color-signal LCLVs.

Because the parallel orientation of the principal rays with the optical axis is ensured with respect to the color-combining optical system, color shading which is dependent on characteristics of the angle of incidence of the principal rays is eliminated.

Figure 1:
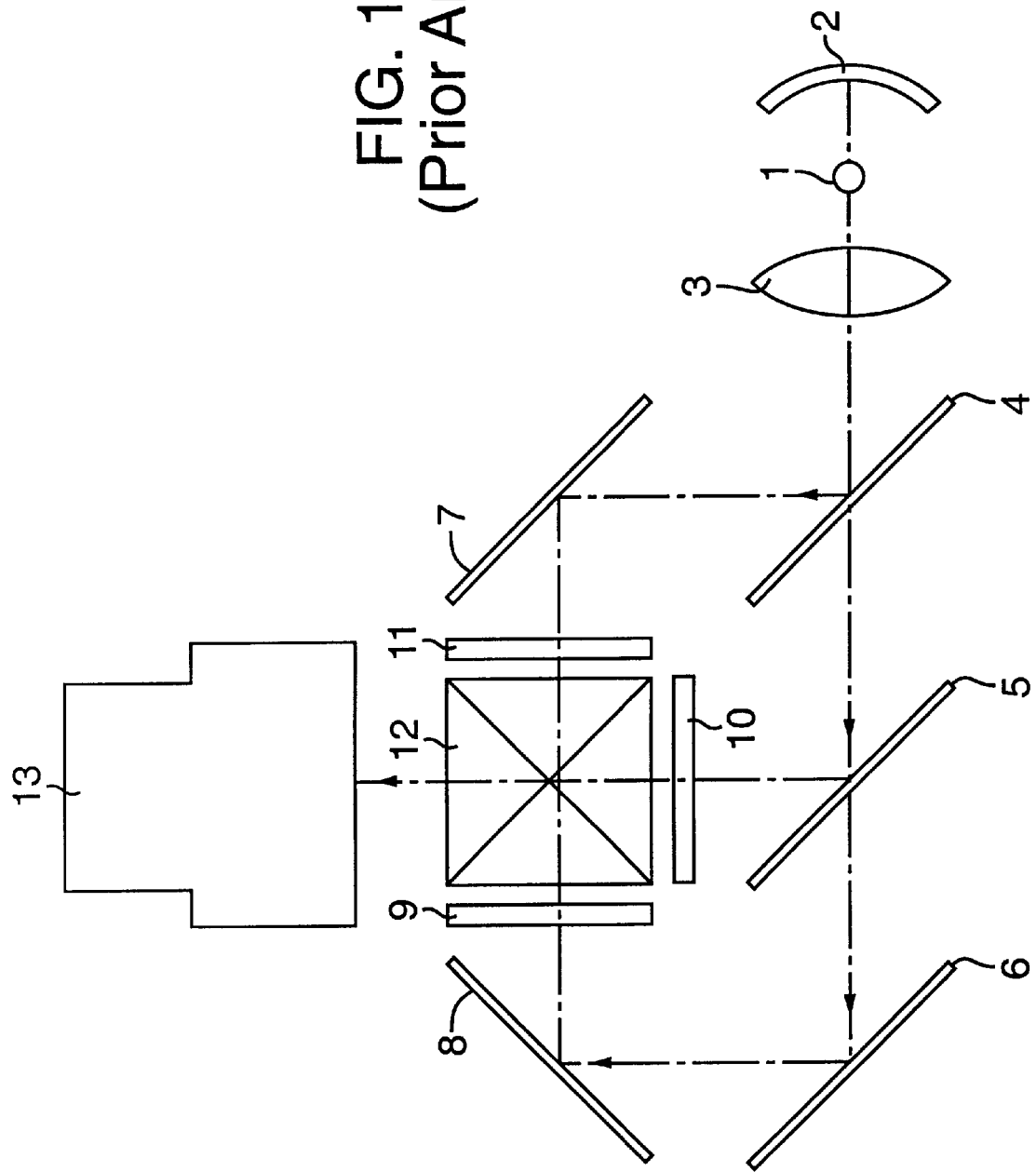
FIG. 1 is a schematic optical diagram of a prior projection-display apparatus.
Figure 2:
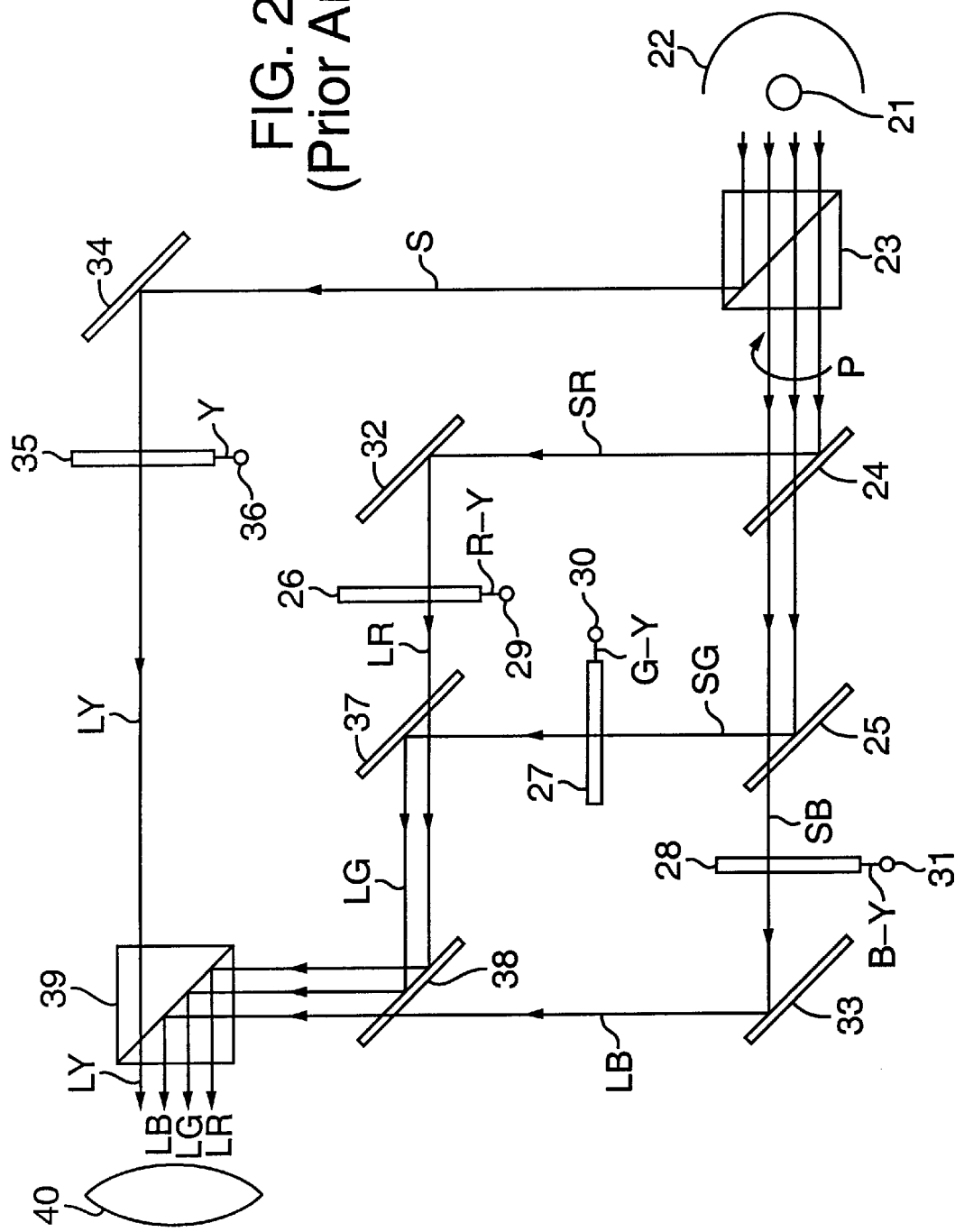
FIG. 2 is a schematic optical diagram of another prior-aft projection-display apparatus.

The cross-dichroic mirror 307 is preferred for use as the color-separation optical system in this embodiment. The cross-dichroic mirror 307 typically has configuration in which two plane mirrors are connected to each other in an X-shaped profile, wherein one mirror is the plane mirror 307R (R-light-reflecting dichroic mirror) having an R-light-reflecting dichroic film and the other mirror is the plane mirror 307B (B-light-reflecting dichroic mirror) having a B-light-reflecting dichroic film. Such a construction forms an intersection line of the R-light-reflecting mirror 307R with the B-light-reflecting mirror 307B. (In the conventional projection display apparatus of FIG. 2, the R-light-reflecting dichroic mirror 24 and the G-light-reflecting dichroic mirror 25 are not connected to each other in an X shape but are separate from each other. As a result, no intersecting line is formed by them.) The line of intersection extends in the Y direction in the center of the light path. Conventionally, such a line of intersection causes uneven color extending vertically in the center portion of the projected image.

However, in this embodiment, because the cross-dichroic mirror 307 is situated between the illumination lens 303 and the illumination lenses 308R, 308G, 308B, any effect of the intersection line in causing uneven color of the projected image is eliminated.

A cross-dichroic prism can be used instead of the cross-dichroic mirror 307 as the color-combining optical system. According to conventional wisdom, a cross-dichroic prism would be expected to produce the same color-shading phenomenon because a cross-dichroic prism also has a vertical line of intersection. However, a cross-dichroic prism has a construction in which right-angle prisms are cemented together in close proximity. Thus, there is almost no uneven color effect. Furthermore, because the cross-dichroic prism would be situated between the illumination lens 303 and the illumination lenses 308R, 308G, 308B, any effect of the intersection line in causing uneven color of the projected image would be eliminated.

Tracing the light flux backward from the screen toward the projection lens 319, and from each color-signal LCLV 315R, 315G, 315B toward the light source 301, the light fluxes from each point on the LCLVs 315R, 315G, 315B pass uniformly through the intersection line of the cross-dichroic mirror 307. Therefore, the effect of the intersecting line of the cross-dichroic mirror 307 is experienced uniformly over the LCLVs and the intersecting line does not appear as uneven color on the screen. If the intersecting line of the cross-dichroic mirror 307 is positioned at the focal point on the rear side (LCLV side) of the illumination lens 303 (as is preferred), the effect of preventing uneven color is greatest.

As discussed above, the images of each color-signal LCLV 315R, 315G, 315B and the image of the luminance-signal LCLV 314 are formed superimposedly on the viewing screen. In order to align the separate images with each other to achieve full registration of the images, the color-signal LCLVs 315R, 315G, 315B and the luminance-signal LCLV 314 are preferably individually adjustable.

Various modifications to the specific configuration of this embodiment, as described above, are contemplated. For example, with respect to FIGS. 7 and 8, the combining relay optical system was described as preferably comprising a group of two lenses 321, 322. Alternatively, the combining relay optical system can comprise a relay lens having positive refractive power and being arranged between a field lens situated close to the emission side of the cross-dichroic prism 316 and. a field lens situated close to the combined image.

Although the second half-wave plate 306 is situated between the combined image I and the second PBS, 318, other locations are possible. For example, the second half-wave plate 306 can be situated between the cross-dichroic prism 316 and the second PBS 318.

A sheet-type half-wave membrane can be used instead of the half-wave plates 305, 306. In the alternative situation, the sheet-type membrane can be cemented to a surface of a prism such as one of the PBSs 304, 318 or the cross-dichroic prism 316.

Although use of the integrator 302 is preferred, it can be replaced with a fly-eye-lens or analogous optical component. Further, in place of using a lamp and an ellipsoidal mirror as the light source 301, the light source 301 can comprise a lamp and a parabolic mirror or spherical mirror.

A field stop can be situated at a position that is conjugate to the distal end face 302b of the integrator 302. Such an arrangement allows internal reflections and scattered light in the optical system of the projection-display system to be eliminated. This also makes it possible to improve the contrast of the projected image and prevent heating of the LCLVs.

Thus, this embodiment provides a high-luminance, high-resolution projected image at lower cost using only a few LCLVs while preventing color unevenness in the projection image caused by a use of a cross-dichroic mirror as a color-separation optical system.

By arranging the color-combining optical system where the principal rays are parallel to the optical axis, as determined by the aperture stop of the projection optical system, color shading caused by angular characteristics of the color-combining optical system can be eliminated. Also, by arranging the polarizing-and-combining optical system where the principal rays are parallel to the optical axis, as determined by the aperture stop of the projection optical system, uneven contrast of the projected image caused by angular characteristics of the polarizing-and-combining optical system can be eliminated.

By arranging each LCLV where the principal rays are parallel to the optical axis, as determined by the aperture stop of the projection optical system, uneven contrast of the projected image caused by angular characteristics of each light valve can be eliminated.

Fourth Embodiment

A projection-display apparatus according to this embodiment is described with reference to FIGS. 9–11.

Figure 9:
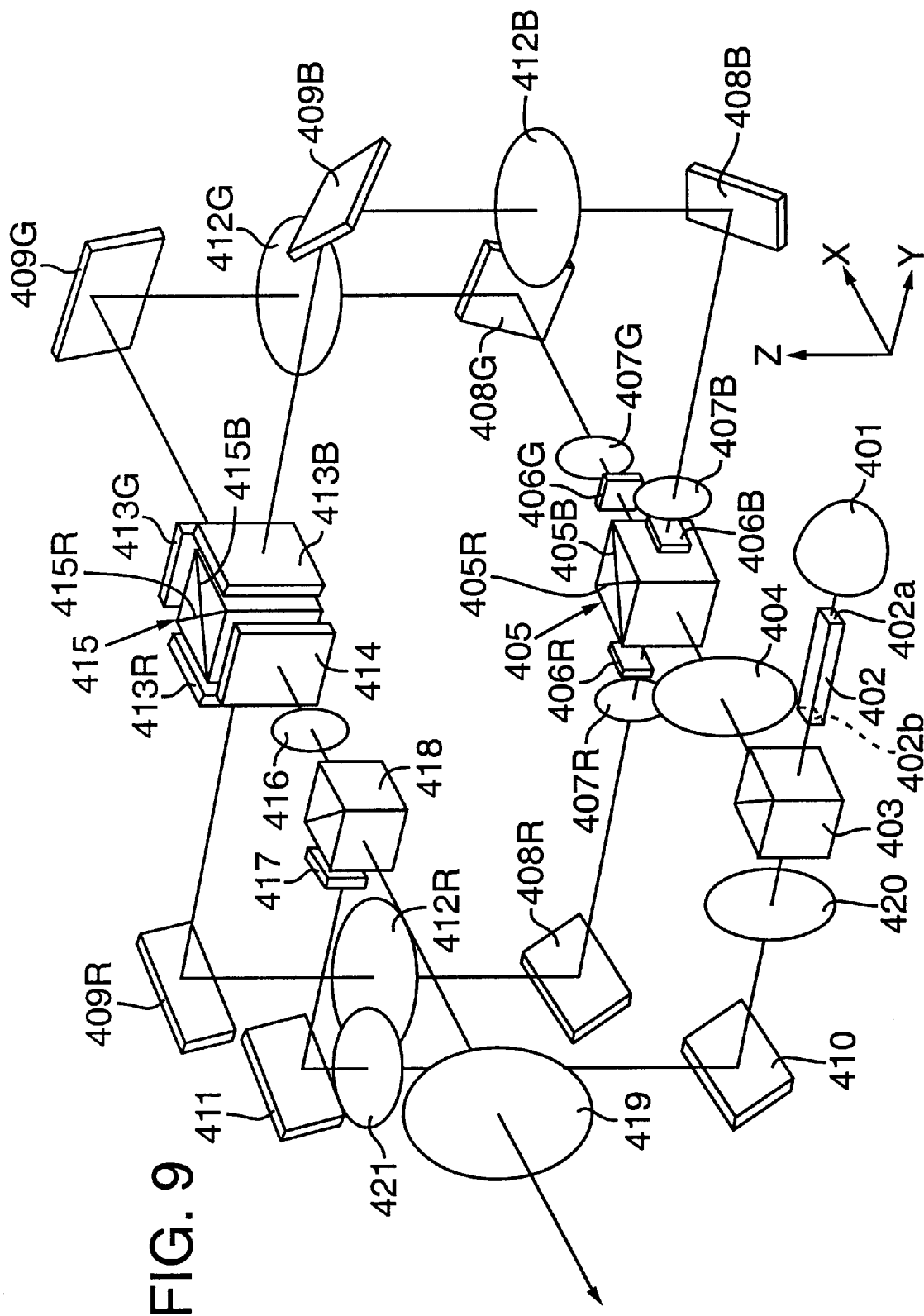
FIG. 9 is a perspective view of a projection-display apparatus according to a fourth representative embodiment of the invention.

FIG. 9 is a schematic perspective of the projection-display apparatus. The X, Y, and Z axes are oriented as shown. FIG. 10 depicts ray traces in the XZ plane of FIG. 9, particularly with respect to the first color-signal optical system. The perspective of FIG. 10 is from the −Y-axis direction. FIG. 11 depicts ray traces in the YZ plane of FIG. 9, particularly with respect to the luminance-signal optical system. The perspective of FIG. 11 is from the X-axis direction.

Figure 10:
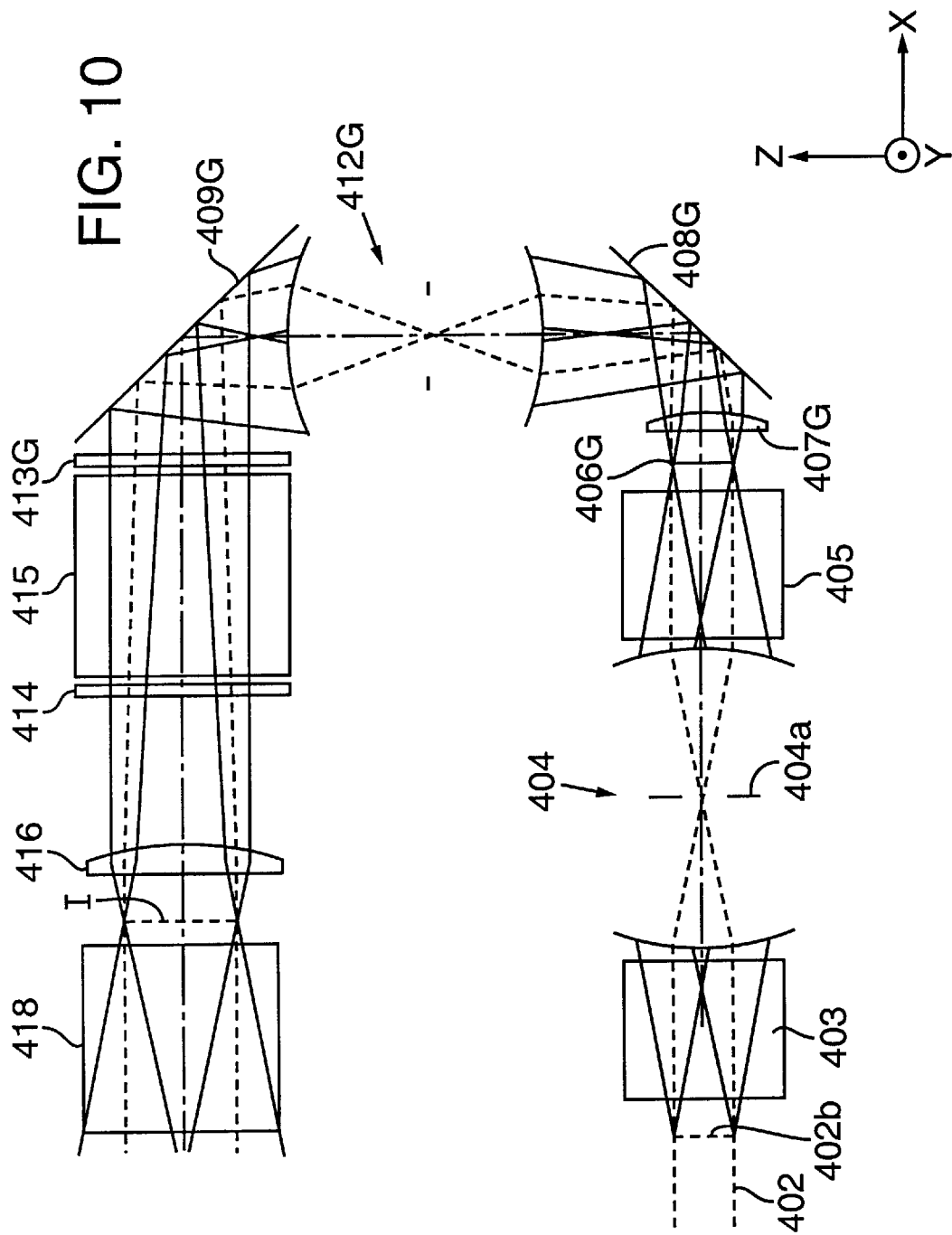
FIG. 10 is an optical diagram of a portion of the FIG. 9 embodiment, showing ray traces in the XZ plane.
Figure 11:
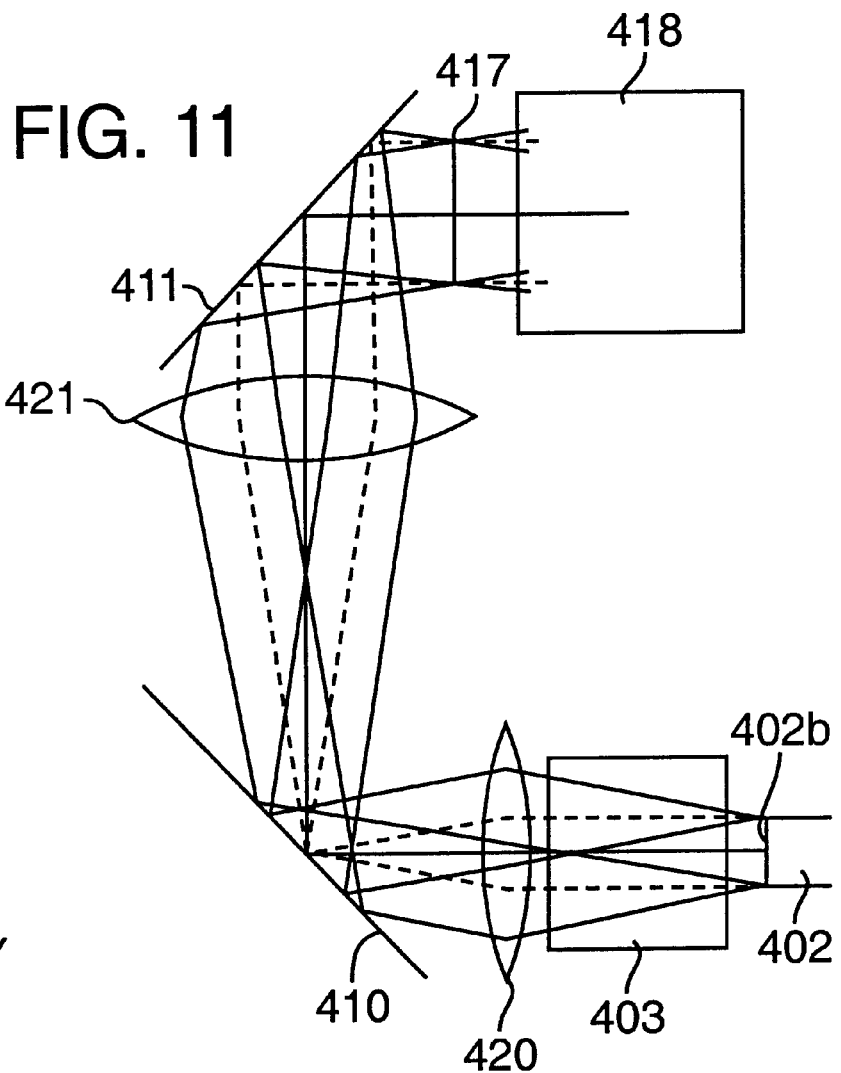
FIG. 11 is an optical diagram of a portion of the FIG. 9 embodiment, showing ray traces in the YZ plane.

The solid lines in FIGS. 10 and 11 denote the most marginal rays of off-axis light. The broken lines in FIGS. 10 and 11 pertain to the most off-axis principal rays of off-axis light. (The principal rays are determined by the aperture stop (not shown in figure) of the projection lens 419). The coordinate systems in FIGS. 10 and 11 correspond to the coordinate system in FIG. 9.

In FIG. 10, details of the light source 401 and the projection lens 419 are omitted. Also, in FIG. 10, only rays pertaining to G-light are shown.

Referring to FIG. 9, this embodiment comprises a light source 401; an integrator 402 (preferably a rod integrator); a first PBS 403 (serving as a "polarizing-and-splitting optical system"); a relay lens 404; a cross-dichroic prism 405 (serving as a "color-separation optical system" comprising an R-reflecting dichroic film 405R and a B-reflecting dichroic film 405B); red, green, and blue color-signal LCLVs 406R, 406G, 406B, respectively; field lenses 407R, 407G,

407B; reflecting mirrors 408R, 408G, 408B, 409R, 409B, 409G, 410, 411; relay lenses 412R, 412G, 412B; half-wave plates 413R, 413G, 413B, 414; a cross dichroic prism 415 (serving as a "color-combining optical system" comprising a red-reflecting dichroic film 415R and a blue-reflecting dichroic film 415G; a field lens 416; a second PBS 418; a luminance-signal LCLV 417; a first illumination lens 420; a second illumination lens 421; and a projection lens 419.

The light source 401 and integrator 402 are preferably configured as described above in the first embodiment. The integrator 402 comprises a proximal end face 402a and a distal end face 402b.

Light emitted from the distal end face 402b of the integrator 402 propagates in the −Y direction to the first PBS 403 where the light is polarized and split into a first polarized light (S-polarized light) and a second polarized light (P-polarized light). The S-polarized light is reflected by the first PBS 403 and emitted in the X direction. The P-polarized light is transmitted through the first PBS 403 in the −Y direction.

The first polarized light emitted from the first PBS 403 in the X direction passes through the relay lens 404 to the cross-dichroic prism 405. The cross-dichroic prism 405 is constructed from four right-angled triangle-shaped transparent glass members adhered together with intervening R-reflecting dichroic film 405R and B-reflecting dichroic film 405B arranged in an X-shaped configuration. The first polarized light (comprising a mixture of R light, G light, and B light) is separated by the cross-dichroic prism 405 into R light, G light, and B light. The R light is reflected in the −Y direction by the R-reflecting dichroic film 405R. The B light is reflected in the Y direction by the B-reflecting dichroic film 405B. The G light is transmitted in the X direction by the dichroic films 405R, 405B.

The color-signal LCLVs 406R, 406G, 406B are situated close to respective facets of the cross-dichroic prism 405 from which the respective R light, G light, and B light propagate. The color-signal LCLVs are conjugate, with respect to the relay lens 404, to the distal end face 402b of the integrator 402. From the cross-dichroic prism 405, the R light, G light, and B lights enter the respective LCLVs 406R, 406G, 406B.

The integrator 402 is situated in the Y direction with respect to the first PBS 403. However, for reasons of expediency, it is shown in FIG. 10 by a dashed line at a conjugate position over the X axis.

Although not shown in FIG. 10, the projection lens 419 comprises an aperture stop and is configured such that the aperture stop is situated at the rear-focal-point (rear side of aperture stop) position of a lens group positioned closer to the second PBS 418 than the aperture stop. The principal rays of the projection-display apparatus of this embodiment are determined by the aperture stop. The principal rays are parallel to the optical axis between the second PBS 418 and the projection lens 419. Namely, the projection lens 419 is telecentric on the second-PBS side.

Because the distal end face 402b of the integrator 402 functions as a planar light source, principal rays emitted from the distal end face 402b intersect at a position of the pupil of the relay lens 404. (In FIG. 10, 404a denotes an aperture stop of the relay lens 404.) The principal rays enter the cross-dichroic prism 405 parallel to each other. In other words, the principal rays enter and exit the cross-dichroic prism 405 while maintaining telecentricity. The principal rays then telecentrically illuminate each LCLV 406R, 406G, 406B. In this embodiment, critical illumination is used to form an image of the distal end face 402b of the integrator 402 (as a virtual image) on the LCLVs 406R, 406G, 406B through the relay lens 404.

In order to produce the virtual image, the shape and size of the distal end face 402b of the integrator 402 are preferably identical to the shape and size, respectively, of the image-forming portion of each color-signal LCLV. If the LCLVs 406R, 406G, 406B are large, then the integrator 402 should likewise be large. To avoid cost increases arising from use of a large integrator 402, the relay lens 404 can be magnifying and the transverse profile of the integrator 402 can be proportionally reduced to the size and shape of the image-forming portion of the respective LCLVs 406R, 406G, 406B.

Because telecentricity is maintained with respect to the cross-dichroic prism 405 (i.e., because the cross-dichroic prism 405 is situated where the principal rays are parallel to the optical axis), color shading that otherwise would be caused by variations in the angle of incidence of rays on the dichroic films 405R, 405B can be controlled. Furthermore, by providing telecentric illumination to the LCLVs 406R, 406G, 406B, uneven contrast that otherwise would be caused by variations in the angle of incidence of rays on the LCLVs 406R, 406G, 406B can be controlled.

The color-signal LCLVs are preferably constructed and configured as described above with respect to the first embodiment.

The R light, G light, and B light modulated according to a respective color signal and emitted from the respective LCLVs 406R, 406G, 406B which have the above-mentioned construction and functions have their polarization orientations rotated 90 degrees. The lights then pass through the respective field lenses 407R, 407G, 407B and reflect from respective mirrors 408R, 408G, 408B in the Z direction. The color lights then pass through the respective relay lenses 412R, 412G, 412B, and reflect from respective mirrors 409R, 409G, 409B in the Y direction, −X direction, and −Y direction, respectively. The polarization orientation is rotated 90 degrees by the respective half-wave plates 413R, 413B, 413G. The lights enter the cross-dichroic prism 415.

The cross-dichroic prism 415 has a construction similar to the cross-dichroic prism 405, and serves to color-combine the R light, G light, and B light entering the cross-dichroic prism 415. Namely, the R light and the B light are reflected by the R-reflecting dichroic film 415R and by the B-reflecting dichroic film 415B, respectively, and the G light is transmitted through the dichroic films 415R, 415B, all in the −X direction as color-combined light from the same emission surface of the cross-dichroic prism 415.

Because the first polarized-light reflected by the first PBS 403 enters the color-separation cross-dichroic prism 405 with maintenance of the polarization state of the light, radiation incident to the color-separation cross-dichroic prism 405 is incident as S-polarized light with respect to the surface of the dichroic films 405R and 405B. By having the incident radiation of the cross-dichroic prism 405 being S-polarized light with respect to the dichroic films 405R and 405B, the spectral characteristics of the dichroic films will be much higher in quality for the S-polarized light compared to the P-polarized light. The consequent reduction in light loss is preferred. Compared to a cross-dichroic mirror, a cross-dichroic prism exhibits a, larger difference in reflecting performance at the polarizing surface where the light is incident; compared to S-polarized light, the wavelength bandwidth of the reflectivity of P-polarized light is narrower.

The polarization orientation in the color-combining cross-dichroic prism 415 is rotated 90 degrees by the LCLVs 406R, 406G, 406B. Thus, without any other changes, P-polarized light incident to the surface of the dichroic films 415R and 415B of the cross-dichroic prism 415 degrades the combining characteristics of the membranes. To avoid such a problem, the half-wave plates 413R, 413B, 413G in this embodiment are situated directly in front of (i.e., upstream of) the respective faces of the cross-dichroic prism 415. The half-wave plates 413R, 413B, 413G change the polarization orientation of the light and cause the light to be incident as S-polarized light on the surfaces of the dichroic films 415R, 415B. Thus, if the radiation incident to the cross-dichroic prism 415 is made into S-polarized light with respect to the dichroic films 415R and 415B, the spectral characteristics of the dichroic films will be much higher quality for S-polarized light compared to P-polarized light. The resulting reduction in light loss is preferred.

The half-wave plate 414 immediately downstream of the emission surface of the cross-dichroic prism 415 rotates the polarization orientation of the color-combined light emitted by the color-combining cross-dichroic prism 415 by 90 degrees once again. The light then passes through a field lens 416 and enters the second PBS 418.

Referring to FIG. 10, other features of the color-signal optical system are now described. The color-signal optical system is essentially an optical system that can form an image of the image of the distal end face 402b on the LCLVs 406R, 406G, 406B. The "image of the image" is a color-combined and magnified real image I formed using the relay lenses 412R, 412G, 412B directly upstream of the second PBS 418. The principal rays intersect at the pupil position of the relay lenses 412R, 412G, 412B. Telecentricity is maintained with respect to the magnified image I by the field lenses 407R, 407G, 407B situated immediately downstream of the LCLVs 406R, 406G, 406B, respectively. The field lens 416 is situated directly upstream of the magnified image I.

Light from the magnified image I enters the second PBS 418 while maintaining telecentricity. The the size and shape of the magnified image I is identical to the size and shape, respectively, of the image-forming portion of the luminance-signal LCLV 417. The arrangement of the field lenses 412, 416 ensures that the principal rays will be parallel with the optical axis with respect to the combined image I. In view of the above, telecentricity in the strictest sense of the word is not achieved with respect to the color-combining cross-dichroic prism 415. However, since the principal rays can have trajectories that are close to being parallel to the optical axis with respect to the color-combining cross-dichroic prism 415, decreases in the color-combining performance of the color-combining cross-dichroic prism 415 can be kept to a minimum.

Because the color-signal optical system is arranged in three dimensions and utilizes the same types of optical components, as described above, for each color, the axial distances traversed by the R light, G light, and B light are essentially equal. The color-separation cross-dichroic prism 405 and the color-combining cross-dichroic prism 415 are oriented such that the intersection lines of each (i.e., line defined by the intersection of the constituent dichroic films) extend parallel to the Z-axis.

The field lenses 407R, 407G, 407B, the relay lenses 412R, 412G, 412B, and the field lens 416 comprise a relay optical system that forms a magnified image I of the color-signal LCLVs 406R, 406G, 406B at a position conjugate to the luminance-signal light valve 417 with respect to the projection lens 419.

In this embodiment, the relay optical system comprises two field lenses and one relay lens for each color. Alternatively, a relay system comprising two illumination lenses for each color can be utilized as the relay optical system. For G light, e.g., one illumination lens can be arranged between the LCLV 406G and the mirror 408G or downstream of the mirror 408G; another illumination lens can be arranged between the mirror 409G and the color-combining dichroic prism 415 or upstream of the mirror 409G.

In FIG. 10, the mirror 408G and the LCLV 406G are not in close proximity to each other. The mirror 409G and the dichroic prism 415 are also not in close proximity with each other.

As shown in FIG. 9, the second polarized light transmitted by the first PBS 403 is emitted in the −Y direction through the first illumination lens 420. The second polarized light is then reflected by the mirror 410 in the Z direction, passes through the second illumination lens 421, is reflected by the mirror 411 and enters the luminance-signal LCLV 417. Light passing through the luminance-signal LCLV 417 is modulated by a luminance signal and has its polarization orientation rotated 90 degrees. Modulated light emitted by the luminance-signal LCLV 417 enters the second PBS 418 as S-polarized light with respect to the surface of the polarizing-and-splitting portion of the second PBS 418.

FIG. 11 depicts certain aspects of the luminance-signal optical system. Light emitted from the distal end face 402b of the integrator 402 enters the first PBS 403 and is separated by the polarizing-and-splitting portion of the first PBS 403. The second polarized light transmitted by the polarizing-and-splitting portion of the first PBS 403 passes through the first illumination lens 420, is reflected by the mirror 410 in the Z direction, passes through the second illumination lens 421, is reflected by the mirror 411 in the Z direction, and then enters the luminance-signal LCLV 417. The principal rays cross proximally to the bending mirror 410 to form a pupil on the surface of the mirror 410. The principal rays diverging from the pupil are made parallel to the optical axis by the second a illumination lens 421. Thus, the principal rays are made parallel to the optical axis and reflect from the bending mirror 411 to enter the luminance-signal LCLV 417. In other words, the luminance-signal LCLV 417 receives telecentric illumination.

As can be understood from FIG. 11, an image of the distal end face 402b of the integrator 402 is formed at the luminance-signal LCLV 417 which receives critical illumination at a magnification determined by the relay optical system comprising the illumination lenses 420 and 421. The reason a magnified image of the distal end face 402b forms on the luminance-signal LCLV 417 in this way is that the luminance-signal LCLV 417 has more pixels than the color-signal LCLVs 406R, 406G, 406B. Also, the luminance-signal LCLV 417 is configured larger and with a higher resolution than the color-signal LCLVs 406R, 406G, 406B.

The magnification at which the image of the distal end face 402b is formed on the luminance-signal LCLV 417 is determined by the focal length of the illumination lenses 420 and 421 and by the arrangement of these lenses. The distal end face 402b is magnified so as to illuminate the entire luminance-signal LCLV 417 without wasting light.

Although the luminance-signal LCLV 417 preferably has a different number of pixels than any of the color-signal LCLVs 406R, 406G, 406B, it has a similar construction. The polarization orientation of modulated light emitted from the luminance-signal LCLV 417 is rotated 90 degrees with respect to the polarization orientation of the incident polarized light.

The light emitted by the luminance-signal LCLV 417 enters the second PBS 418 as S-polarized light with respect to the polarizing-and-splitting surface of the second PBS 418. The principal rays of such light are parallel to the optical axis. The light is then combined with the P-polarized light emitted from the color-combined real image I and entering the second PBS 418. This combined light is then projected onto a viewing screen (not shown) by the projection lens 419. Because the second PBS 418 is arranged where the principal rays are parallel to the optical axis, any uneven contrast that would otherwise be caused by differences in angle of incidence are eliminated. The size of the combined image I and the size of the image on the second PBS 418 are the same.

The first PBS 403 (for splitting light) and the second PBS 418 (for combining light) are both arranged such that their respective film portions are parallel to the Z axis. The Z axis is also parallel to the intersection line of each of the color-separating cross-dichroic prism 405 and the color-combining cross-dichroic prism 415.

According to this embodiment, small-sized LCLVs can be used, that do not have a high degree of precision, as the three color-signal LCLVs 406R, 406G, 406B. Polarizing and combining the color-combined light of the magnified projection light emitted from these light valves with the modulated light emitted from the high-precision luminance-signal LCLV makes a suitable image for projection using the projection lens 419. Thus, the size of the color-signal LCLVs 406R, 406G and 406B can be reduced and/or can have lower resolution so as to reduce cost while still projecting a high-precision image at a high luminance.

Fifth Embodiment

Figure 12:
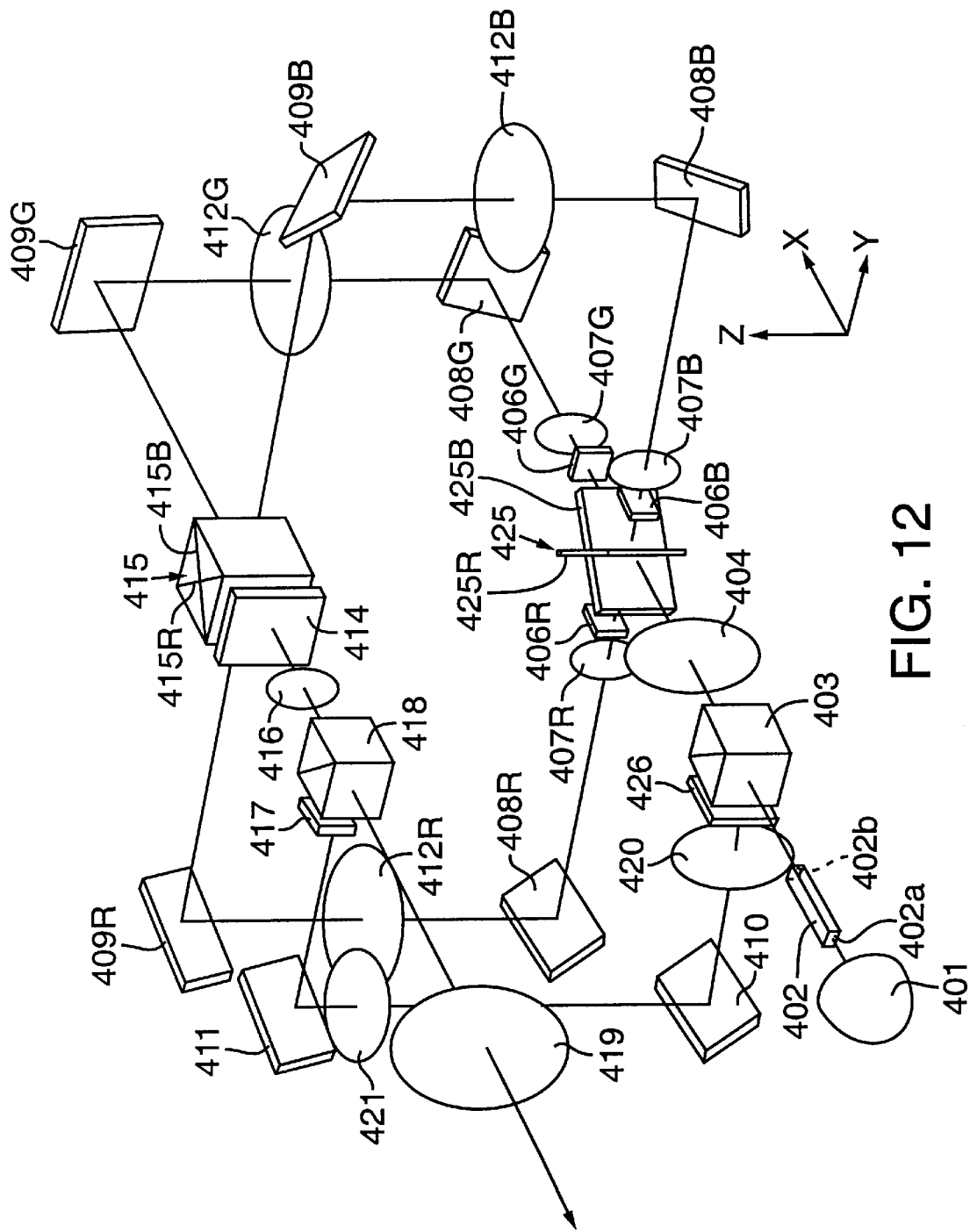
FIG. 12 is a perspective view of a projection-display apparatus according to a fifth representative embodiment of the invention.

This embodiment is shown in FIG. 12. In FIG. 12, components that are the same as corresponding components in FIGS. 9–11 have the same reference designators and are not described further.

The fifth embodiment differs from the fourth embodiment with respect to the angle by which light from the light source 401 enters the polarized-light-separation portion of the first PBS 403. Also, in the fifth embodiment, a cross-dichroic mirror 425 is used instead of the cross-dichroic prism 405 used in the fourth embodiment as the color-separation optical system.

In the fifth embodiment, the light emitted from the light source 401 converges on the proximal end face 402a of the integrator 402, passes with many internal reflections through the integrator 402, and is emitted from the distal end face 402b of the integrator 402. In contrast to the fourth embodiment, the light emitted from the integrator 402 of the fifth embodiment propagates in the X direction and enters the first (color-separating) PBS beamsplitter 403. Also in contrast to the fourth embodiment, P-polarized light transmitted and emitted by the first PBS 403 is directed to the color-signal optical system as a first polarized light. S-polarized light reflected by the first PBS 403 is directed to the luminance-signal optical system as a second polarized light. The first polarized light then passes through the relay lens 404 to the cross-dichroic mirror 425 (color-separation optical system). The cross-dichroic mirror 425 comprises an R-light-reflecting dichroic film 425R formed on a transparent glass substrate and a B-light-reflecting dichroic film 425B formed on a transparent glass substrate. The membranes are arranged in an X configuration. R light color-separated by the cross-dichroic mirror 425 is emitted in the −Y direction, the G light is emitted in the X direction, and the B light is emitted in the Y direction. Telecentric illumination-(wherein the principal rays are parallel to the optical axis as determined by the aperture stop in the projection lens 419) is provided to the color-signal LCLVs 406R, 406G, 406B. The color-signal LCLVs are situated at positions conjugate to the distal end face 402b of the integrator 402 with respect to the field lens 404. The modulated light from the LCLVs 406R, 406G, 406B each has a polarization orientation rotated 90 degrees. (Ray traces up to the LCLVs 406R, 406G, 406B are identical to ray traces shown in FIG. 10.)

Light incident to the cross-dichroic mirror 425 is reflected as P-polarized light, without any S-polarized light, with respect to the dichroic surface of the cross-dichroic mirror 425. However, in contrast to the cross-dichroic prism 405 used in the fourth embodiment, even if P-polarized light is incident to the cross-dichroic mirror 425, color separation is not significantly degraded with the fifth embodiment.

Light emitted by each LCLV 406R, 406G, 406B passes through respective field lenses 407R, 407G, 407B, is reflected by respective reflective mirrors 408R, 408G, 408B, passes through respective relay lenses 412R, 412G, 412B, and reflected from respective mirrors 409R, 409G, 409B. The modulated color lights enter and are color-combined by the cross-dichroic prism 415. The color-combined light has a polarization orientation rotated 90 degrees by the half-wave plate 414. The color-combined light passes through a field lens 416 and enters the second (combining) PBS 418.

A color-combined magnified real "image of the image" is formed on each color-signal LCLV 406R, 406G, 406B immediately upstream of the second PBS 418 by the respective relay lenses 412R, 412G, 412B and respective field lenses 407R, 407G, 407B. These lenses are arranged so as to ensure the telecentricity of the principal rays as in the fourth embodiment. Light of each color entering the cross-dichroic prism 415 enters as S-polarized light with respect to the dichroic films 415R and 415B. This ensures sufficient color-combination performance.

The second polarized light reflected and emitted by the first PBS 403 passes through a half-wave plate 426 that rotates the polarization orientation of the light by 90 degrees. The light passes through the first illumination lens 420, is reflected by the mirror 410, passes through the second illumination lens 421, is reflected by the mirror 411, and then enters the luminance-signal LCLV 417. The illumination lenses 420, 421 ensure critical telecentric illumination of the LCLV 417 as in the fourth embodiment. The light modulated and emitted by the luminance-signal LCLV 417 enters the second PBS 418 while maintaining the principal rays parallel to the optical axis. The light enters as S-polarized light with respect to the polarizing-and-splitting surface of the second PBS 418, is reflected by the second PBS 418, and then combined with the light discussed above that was color-combined upon entering the second PBS 418. This color-combined light is magnified and projected onto the screen (not shown in the figure) by the projection lens 419.

The fourth and fifth embodiments can have various modifications. For example, in each of the fourth and fifth embodiments, although a rod integrator 402 is preferably used for uniformizing the illumination light flux, a fly-eye lens or analogous optical component could be used instead. Also, instead of using a lamp and an ellipsoidal mirror as the light source 401, a lamp and a parabolic mirror or spherical mirror could be used.

A field stop can be arranged at a position conjugate to the distal end face 402b of the integrator 402. With such an arrangement, internal reflections and scattered light in the optical system of the projection-display system can be eliminated. This allows improvements in the contrast of the projected image and prevents heating of the LCLVs.

The fourth and fifth embodiments produce a high-luminance, high-resolution projected image at low cost using fewer LCLVs. Also, because the color-signal LCLVs can be smaller, cost is reduced even more.

In the fourth and fifth embodiments, by situating the color-separation optical system where the principal rays are parallel to the optical axis, as determined by the aperture stop of the projection optical system, color shading caused by angular characteristics of the color-combining optical system are eliminated. Also, by placing the polarizing-and-combining optical system at a position that where the principal rays, as determined by the aperture stop of the projection optical system, are parallel to the optical axis, uneven contrast of the projected image caused by angular characteristics of the polarizing-and-combining optical system are eliminated.

Also with respect to the fourth and fifth embodiments, by making the polarization orientation of each light color entering the color-combining optical system (after exiting the respective color-signal LCLV) S-polarized with respect to the color-combining membrane surface of the color-combining optical system, the characteristics of the color-combining optical system are improved.

Sixth Embodiment

Figure 13:
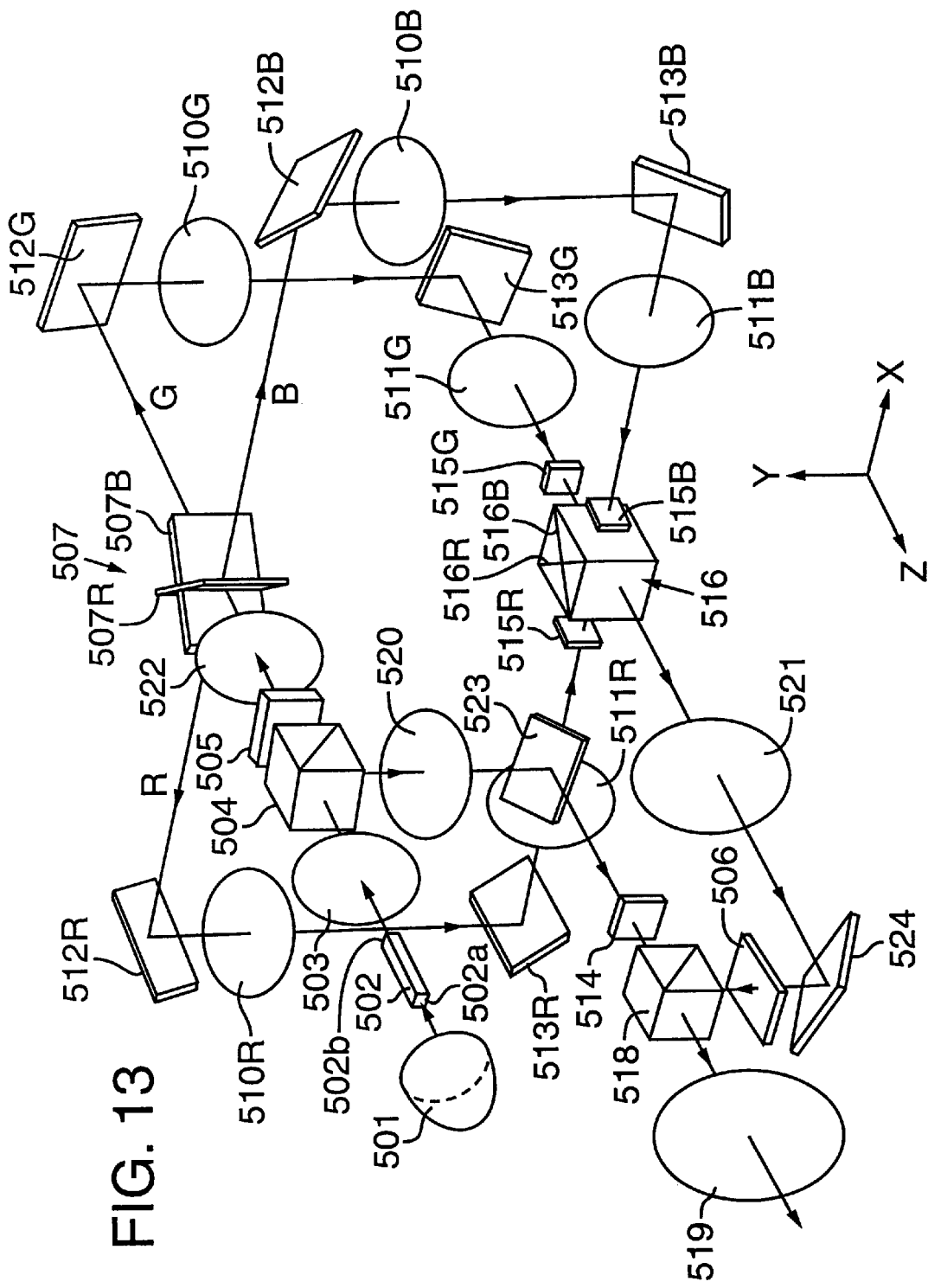
FIG. 13 is a perspective view of a projection-display apparatus according to a sixth representative embodiment of the invention.
Figure 14:
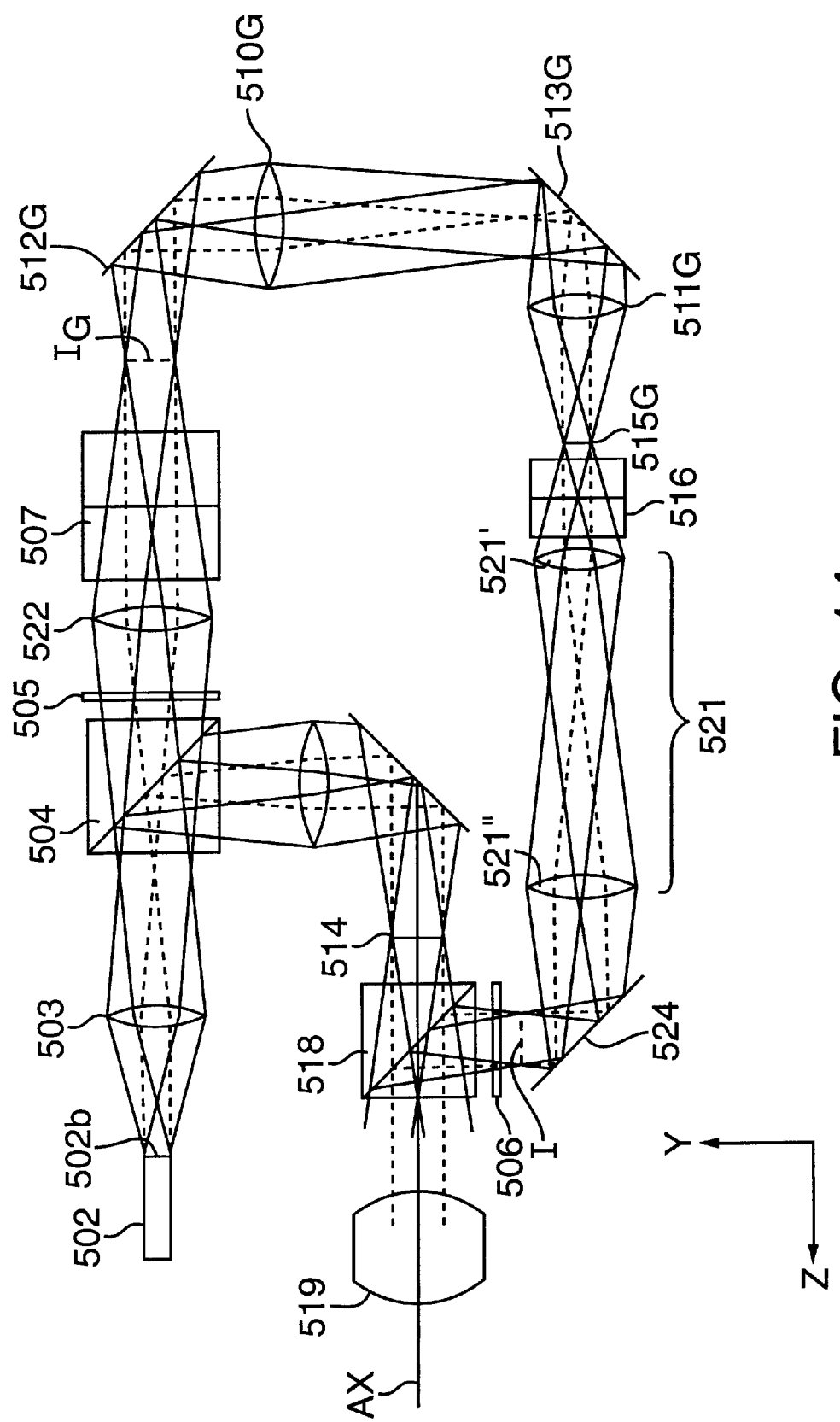
FIG. 14 is an optical diagram of the FIG. 13 embodiment in the Y–Z plane, and including ray traces.

A projection apparatus according to the sixth representative embodiment is illustrated in FIG. 13 and FIG. 14. FIG. 13 presents an oblique view depicting the overall construction of this embodiment. In order to simplify the description, FIG. 13 employs an X–Y–Z coordinate system. FIG. 14 provides an optical diagram with ray traces for components on the Y–Z plane of FIG. 13. In FIG. 14, solid lines indicate off-axis outer peripheral rays, while broken lines indicate off-axis principal rays. The coordinate system used in FIG. 14 corresponds to that used in FIG. 13.

In the FIG. 13 embodiment, a parallel light flux from a light source 501 preferably passes through an infrared filter (not shown) and an ultraviolet filter (not shown). Although details are not shown, the light source 501 preferably comprises a lamp and an elliptical mirror having a primary focus at which the lamp is situated.

The illumination light flux is collected on a proximal end face 502a of a rod integrator 502 made from square-prism-shaped transparent optical material. Light entering the rod integrator 502 is repeatedly reflected on interior surfaces of the rod integrator. Light exits the rod integrator 502 from a distal end face 502b (opposite the proximal end face 502a) as uniform-intensity planar light waves. To such end, the distal end face 502b is overlappingly illuminated by light from a plurality of light-source ghost images formed at locations on the proximal end face 502a by reflections of light from the inner surfaces along the length of the rod integrator 502.

Light from the distal end face 502b of the rod integrator 502 propagates in the –Z direction and enters an "illumination-relay optical system" comprising first and second illumination lenses 503, 522, respectively. The first illumination lens 503, having a focal length $f_1$, and the second illumination lens 522, having a focal length $f_2$, are separated by a distance $(f_1+f_2)$; i.e., the rear focal point of the first illumination lens 503 and the front focal point of the second illumination lens 522 are coincident.

As a representative "polarizing-and-splitting optical system," a first polarizing beam splitter (PBS) 504 is provided at or near the pupil location of the illumination-relay optical system, i.e., in the optical path between the first illumination lens 503 and the second illumination lens 522. When light enters the first PBS 504 from the first illumination lens 503, the P-polarized light component (i.e., linearly polarized light having a vibration direction of ±Y in the diagram) of the light is separated from the S-polarized light component (i.e., linearly polarized light having a vibration direction of ±X in the diagram) of the light.

The P-polarized light passes through the first PBS 504 and through a first half-wave plate 505, and enters the second illumination lens 522 as linearly polarized light having a polarization orientation rotated 90 degrees (linearly polarized light having a vibration direction of ±X in the diagram).

The linearly polarized light passing through the second illumination lens 522 enters a crossed dichroic mirror 507 comprising an R-light-reflecting dichroic mirror 507R and a B-light-reflecting dichroic mirror 507B in an X configuration. (The crossed dichroic mirror 507 comprises a representative "color-separation optical system.") At the R-light-reflecting dichroic mirror 507R, R light is reflected in the –X direction; at the B-light-reflecting dichroic mirror 507B, B light is reflected in the +X direction. G light passes through both the R-light-reflecting dichroic mirror 507R and the B-light-reflecting dichroic mirror 507B and propagates in the –Z direction in the diagram.

At the rear focal "point" of the second illumination lens 522 (one of which points is located in the optical path of the R light, another in the optical path of the G light, and another in the optical path of the B light), an image of the distal end face 502b of the rod integrator 502 is formed for each color of light. (FIG. 14 shows the image $I_G$ formed in the G-light flux.) Referring further to FIG. 14, the G light from this image $I_G$ is reflected by a first mirror 512G and propagates in the –Y direction in the diagram. The G light then passes through a first lens 510G, is reflected by a second mirror 513G so as to be deflected in the +Z direction in the diagram, and passes through a second lens 511G. (The lenses 510G, 511G comprise a "G-light-relay optical system.") The first lens 510G, having the focal length $f_2$, and the second lens 511G, having the focal length $f_1$, are separated from each other by the distance $(f_1+f_2)$, i.e., the rear focal point of the first lens 510G coincides with the front focal point of the second lens 511G.

G light from the G-light-relay optical system thus propagates in the +Z direction and reaches a G-light LCLV 515G. The G-light LCLV 515G is situated a distance of $f_1$ from the G-light-relay optical system, and an image of the distal end face 502b of the rod integrator 502 is formed on the G-light LCLV 515G using the G light.

Returning now to FIG. 13, the R light reflected in the –X direction by the crossed dichroic mirror 507 forms an image $I_R$ (not shown) of the distal end face 502b of the rod integrator 502 at a location that is the distance $f_2$ from the second illumination lens 522, in the same manner as with the G light. The R light from this image is reflected by a first mirror 512R, and thus propagates in the –Y direction in the diagram. The R light passes through a first lens 510R, is reflected by a second mirror 513R so as to propagate in the +X direction in the diagram, and passes through a second lens 511R. (The lenses 510R and 511R comprise an "R-light-relay optical system.") The first lens 510R, having the focal length $f_2$, and the second lens 511R, having the focal length $f_1$, are separated from each other by the distance $(f_1+f_2)$, i.e., the rear focal point of the first lens 510R coincides with the front focal point of the second lens 511R. The R light from the R-light-relay optical system propagates in the +X direction and reaches an R-light LCLV 515R. The R-light LCLV 515R is situated a distance of $f_1$ from the R-light-relay optical system, and an image of the distal end face 502b of the rod integrator 502 is formed on the R-light LCLV 515R using R light.

The B light reflected by the crossed dichroic mirror 507 forms an image $I_B$ (not shown) of the distal end face 502b of the rod integrator 502 at a location situated a distance $f_2$ from the second illumination lens 522, in the same manner as with the G light. The B light from this image is reflected by a first mirror 512B, and propagates in the −Y direction in the diagram. The B light then passes through a first lens 510B, is reflected by a second mirror 513B so as to propagate in the +Z direction in the diagram, and passes through a second lens 511B. (The lenses 510B and 511B comprise a "B-light-relay optical system.") The first lens 510B, having the focal length $f_2$, and the second lens 511B, having the focal length $f_1$, are separated by the distance $(f_1+f_2)$, i.e., the rear focal point of the first lens 510B coincides with the front focal point of the second lens 511B.

The B light from the B-light-relay optical system propagates in the +X direction and reaches a B-light LCLV 515B. The B-light LCLV 515B is separated a distance $f_1$ from the B-light-relay optical system, and an image of the distal end face 502b of the rod integrator 502 is formed on the B-light LCLV 515B using the B light.

According to the foregoing, an image of the distal end face 502b having a uniform, planar light-intensity distribution is formed at each color-signal LCLV 515G, 515R, 515B. In addition, the illumination-relay optical system (comprising lenses 503 and 522) forms the image of the distal end face 502b of the rod integrator 502 with an $f_2/f_1$ magnification, and the R-, G-, and B-light relays render this image at each respective color-signal LCLV with an $f_1/f_2$ magnification. Thus, an identical-magnification image of the distal end face 502b of the rod integrator 502 is formed at each color-signal LCLV 515G, 515R, 515B. Because the distal end face 502b of the rod integrator 502 and the color-signal LCLVs 515G, 515R, 515B have conjugate positions in this example embodiment, and their magnification relationship is the same for each color-signal LCLV, the distal end face 502b has a vertical and horizontal dimension that is identical to the vertical and horizontal dimensions, respectively, of the image-display surface of each color-signal LCLV 515G, 515R, 515B.

The first lens 510R of the R-light-relay optical system, the first lens 510G of the G-light-relay optical system, and the first lens 510B of the B-light-relay optical system preferably have the same focal length $f_2$; similarly, the second lens 511R of the R-light-relay optical system, the second lens 511G of the G-light-relay optical system, and the second lens 511B of the B-light-relay optical system preferably each have the same focal length $f_1$. The various optical path lengths from the crossed dichroic mirror 507 to each of the color-signal LCLVs 515R, 515B, and 515G are also preferably identical.

Each color-signal LCLV 515R, 515G, 515B forms an image corresponding to respective "color signals" electronically input to each color-signal LCLV. In response to such electronic input, each color-signal LCLV 515G, 515R, 515B modulates light passing therethrough.

More specifically, each color-signal LCLV 515R, 515B, 515G preferably has a structure in which a liquid-crystal panel is sandwiched between two polarizing plates (i.e., and incident polarizing plate and an exit polarizing plate), the plates forming a cross-Nicol prism. The liquid-crystal panel comprises, in sequence from the incident side, a transparent glass substrate, active nonlinear elements (for example, TFT (thin-film transistor) elements) which perform selective switching of latticed pixels formed on the glass substrate and the electrodes which constitute the pixels connected to these elements, a liquid crystal layer, opposing electrodes, and a transparent glass substrate. When an active element causes a corresponding electrode to turn on, voltage is applied between the electrode and the corresponding opposite electrode across the respective pixel's liquid-crystal layer. The resulting electrical field aligns molecules of the liquid crystal in the pixel so that the molecules are mutually parallel with each other and perpendicular to the plate. Thus, polarized light from the incident polarizing plate passes directly through the liquid-crystal pixel, and is absorbed by the exit polarizing plate. Liquid-crystal molecules in pixels having electrodes that are not turned on remain in a twisted configuration; polarized light from the incident polarizing plate follows the twist of the liquid crystal and is thus rotated 90 degrees from the polarization direction and passes through the exit polarizing plate. In this way, each color-signal LCLV forms a continuously changeable image for the respective color. Light passing through the color-signal LCLVs 515G, 515R, 515B is thus modulated.

A crossed dichroic prism 516 (serving as a representative "polarizing-and-combining optical system"), comprising a combination of four right-angled prisms positioned so that an R-light-reflecting dichroic film 516R and a B-light-reflecting dichroic film 516B form an X configuration relative to each other, is situated at the exit side of the color-signal LCLVs 515R, 515B, and 515G. G light modulated by the G-light LCLV 515G propagates in the +Z direction in the diagram and passes through both the R-light-reflecting dichroic film 516R and the B-light-reflecting dichroic film 516B. R light modulated by the R-light LCLV 515R propagates in the +X direction in the diagram and is reflected in the +Z direction by the R-light-reflecting dichroic film 516R. B light modulated by the B-light LCLV 515B propagates in the −X direction in the diagram and is reflected in the +Z direction by the B-light-reflecting dichroic film 516B. Hence, each primary-color component R, G, B is recombined. The recombined light flux exits from the crossed dichroic prism 516 in the +Z direction.

The recombined R light is linearly polarized (vibrating in the ±Y direction); the recombined B light is linearly polarized (vibrating in the ±Y direction; and the recombined G light is linearly polarized (vibrating in the ±Y direction). Due in part to the presence of a half-wave plate 505 between the first PBS 504 and the crossed dichroic mirror 507, light from each of the color-signal LCLVs 515G, 515R, 515B is S-polarized relative to the dichroic films 516R and 516B at the crossed dichroic prism 516, and the spectral characteristics of the dichroic films 516R and 516B can be provided satisfactorily.

A "recombined-light optical relay" 521 for the recombined light is provided at the exit side (i.e., the +Z direction side) of the crossed dichroic prism 516. Light passing through the recombined-light optical relay 521 proceeds in the +Z direction and is deflected in the +Y direction by a third mirror 524.

Images from each of the color-signal LCLVs 515R, 515B, 515G form at the same location. In particular, a composite image I (FIG. 14) of the color-signal LCLVs 515R, 515B, and 515G is formed by the recombined-light optical relay 521. The recombined-light optical relay 521 preferably comprises a first lens 521' having a focal length $f_3$ and a second lens 521" having a focal length $f_4$, arranged so that the separation between the two lenses is $(f_3+f_4)$ The second polarized light component reflected at the first PBS 504 (i.e., linearly polarized light having a vibration direction in the ±X in the diagram) propagates in the −Y direction in the diagram (FIG. 13) and passes through a third illumination lens 520 having a focal length of $f_2$. The polarized light is then reflected in the +Z direction in the diagram by a fourth mirror 523. The third illumination lens

520 is preferably positioned so that the optical path length together with the first illumination lens 503 is ($f_1+f_2$); i.e., the rear focal point of the first illumination lens 503 coincides with the front focal point of the third illumination lens 520.

A luminance-signal LCLV 514 is situated at the rear focal point of the third illumination lens 520. A "luminance-signal optical relay," which forms images of the distal end face 502*b* of the rod integrator 502 on the luminance-signal LCLV 514, comprises as a first lens group the first illumination lens 503 of the illumination-relay optical system, and as a second lens group the third illumination lens 520. Thus, the illumination-relay optical system and the luminance-signal optical relay share the first illumination lens 503 in this Example Embodiment.

In an alternative configuration of this embodiment, the illumination-relay optical system and the luminance-signal optical relay share the second illumination lens 522 rather than the first illumination lens 503.

The luminance-signal LCLV 514 is preferably structured the same as the color-signal LCLVs 515R, 515B, 515G; however, the size of the luminance-signal LCLV 514 is preferably larger than any of the color-signal LCLVs 515R, 515B, 515G. Also, the luminance-signal LCLV 514 preferably has a greater number of pixels than any of the color-signal LCLVs 515G, 515R, 515B. The luminance-signal optical relay (comprising illumination lenses 503 and 520) forms a magnified image (magnification of $f_2/f_1$) of the distal end face 502*b* of the rod integrator 502 on the luminance-signal LCLV 514. Therefore, the focal lengths of the illumination lenses 503, 522, 520 and the focal lengths $f_1$, $f_2$ of the various lenses of each of the R-, G-, and B-light-relay optical systems are preferably established according to the size ratio of the luminance-signal LCLV 514 to the color-signal LCLVs 515R, 515B, 515G.

A second PBS 518 is situated, as a representative "color-combining optical system," at the exit side (i.e., the +Z direction side) of the luminance-signal LCLV 514. Since light exiting from the luminance-signal LCLV 514 is linearly polarized light vibrating in the ±Y direction in the diagram, and is P-polarized light relative to the second PBS 518, this right passes through the second PBS 518 and enters the projection-lens system 519.

Meanwhile, linearly polarized light vibrating in the ±Z direction propagates from the composite image I (formed by the recombined-light optical relay 521) in the +Y direction. This linearly polarized light passes through a second half-wave plate 506 operable to rotate the polarization of the light 90 degrees to vibrate in the ±X direction. The light then enters the second PBS 518. Since this light has S-polarity relative to the second PBS 518, the light is reflected by the second PBS 518 and propagates in the +Z direction to the projection-lens system 519. The luminance-signal LCLV 514 and the composite image I have a mutually conjugate position with regard to the projection-lens system 519.

Although not specifically shown in FIG. 13, the projection-lens system 519 preferably comprises a rear (toward the screen) lens group, a front (toward the second PBS 518) lens group, and an aperture stop situated at the rear focal point of the front lens group. The principal rays of the entire projection apparatus is established by this aperture stop. As shown in FIG. 14, the principal rays are parallel to the optical axis AX between the second PBS 518 and the projection-lens system 519. (The projection-lens system 519 is preferably telecentric on the second-PBS side.)

As also shown in FIG. 14, the principal rays are also parallel to the optical axis between the distal end face 502*b* of the rod integrator 502 and the first illumination lens 503, between the second illumination lens 522 and the first G-light lens 510G, between the second G-light lens 511G and the first lens 521' of the recombined-light optical relay, between the second lens 521" of the recombined-light optical relay and the projection-lens system 519, and between the third illumination lens 520 and the projection-lens system 519.

In addition, although not shown in FIG. 14, the principal rays are parallel to the optical axis between the second illumination lens 522 and the first R-light lens 510R, between the second R-light lens 511R and the first lens 521' of the recombined-light optical relay, between the second illumination lens 522 and the first B-light lens 510B, and between the second B-light lens 511B and the first lens 521' of the recombined-light optical relay. In other words, each paired combination of lenses 503 and 522, 503 and 520, 510G and 511G, 510B and 511B, 510G and 511G, as well as the recombined-light optical relay represents a two-sided telecentric optical system.

The principal rays between the first illumination lens 503 and the second illumination lens 522 (and between the first illumination lens 503 and the third illumination lens 520) intersect the optical axis preferably at a point located in the first PBS 504. Off-axis rays established by the diameter of the aperture stop in the projection-lens system 519, regardless of object height (transverse distance between the principal ray and the optical axis), pass through the optical axis at this point. Thus, the first PBS 504 is located where telecentricity is not maintained.

Since the diameter of the light flux in this region is smallest at this location (occupied by the first PBS 504) where the principal rays intersect the optical axis, the first PBS 504 can have a small size, which decreases cost, without causing any significant adverse effect on color shading of the projected image.

Multi-layer dichroic films as used in dichroic mirrors and dichroic prisms are angle-dependent in their spectral characteristics. Consequently, whenever the incidence angles of principal rays are not exactly the same at any of various locations on a multi-layer dichroic film, the spectral characteristics of the film differ for each principal ray. This can result in problems with color shading on the projection screen. To rectify this problem, it is preferable that the color-separation optical system, the color-combining optical system, and the recombined-light optical relay be constituted and situated so that principal rays passing therethrough are parallel to the optical axis, i.e., so that telecentricity is maintained. Thus, shading of the projected image is avoided.

Operation of LCLVs is also angle-dependent. Whenever the incidence angle of a principal ray on an LCLV varies across the surface of the LCLV, problems can arise with uneven contrast in the projected image. Accordingly, it is also preferable that the LCLVs 515G, 515R, 515B, 514 be situated where the principal rays are parallel to the optical axis. Such an arrangement facilitates projecting full-color images with high luminance and superior picture quality at lower cost.

It is also preferred that the first illumination lens 503 and the second color lenses 511R, 511G, 511B be identical lenses each having a focal length $f_1$. It is also preferred that the second and third illumination lenses 522, 520 and each of the first color lenses 510R, 510G, 510B be identical lenses each having a focal length $f_2$. These similarities of lenses are especially advantageous for cost reduction.

Figure 15:
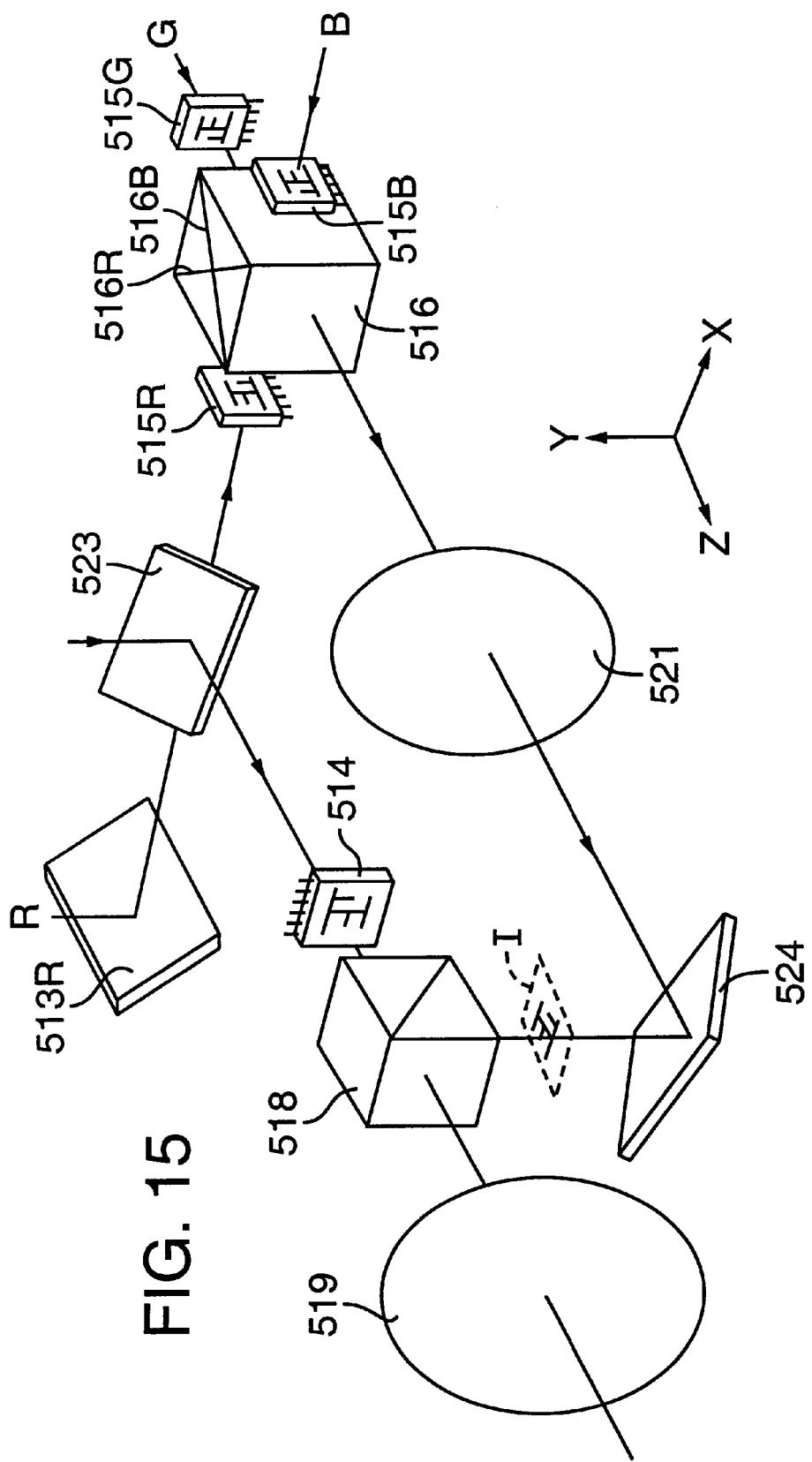
FIG. 15 is an optical diagram of a portion of the FIG. 13 embodiment showing the orientation of images on each of the primary-color LCLVs and on the luminance-signal LCLV relative to the combined image from each of the primary-color LCLVs.

The image from each of the color-signal LCLVs 515R, 515G, 515B and the image from the luminance-signal LCLV 514 are superimposed on the projection screen (not shown). The four LCLVs are driven such that the orientation of each respective image on the screen is proper. For example, FIG. 15 depicts the orientation of images defined by each of the color-signal LCLVs 515R, 515B, and 515G, and by the luminance-signal LCLV 514. The respective primary-color light fluxes, each modulated by the respective color-signal LCLV 515R, 515G, 515B, exit the crossed dichroic prism 516 and enter the recombined-light optical relay 521. Light passing through the recombined-light optical relay 521 and propagating in the +Z direction encounters the third mirror 524 that reflects the light toward the +Y direction. The second PBS 518 reflects an image representing a combination of images from each of the color-signal LCLVs 515R, 515G, 515B. The color-signal LCLVs 515R, 515B, 515G are arranged proximally to the sidewalls of the crossed dichroic prism 516 and the optical path lengths from these LCLVs to the recombined-light optical relay 521 are all identical.

Light exiting from the G-light LCLV 515G enters the crossed dichroic prism 516 in the +Z direction. After passing through the dichroic films 516R and 516B, the G light exits the crossed dichroic prism 516 in the +Z direction. The respective color light fluxes exiting from the LCLVs 515R, 515B, however, enter the crossed dichroic prism 516 in the +X and −X directions, respectively, and are reflected by the dichroic films 516R, 516B. The directions of both these light fluxes are bent 90 degrees such that they exit the crossed dichroic prism 516 in the +Z direction.

Referring further to FIG. 15, the image electronically "written" on the G-light LCLV 515G, compared to the image on the R-light LCLV 515R or the B-light LCLV 515B, must be oriented with the left and right sides reversed. The recombined light flux, from all three color-signal LCLVs, exiting the crossed dichroic prism 516 via the recombined-light optical relay 521 is bent 90 degrees from the +Z direction to the +Y direction via the third mirror 524.

The recombined-light optical relay 521 forms an enlarged combined image I, having the same size and shape as the luminance-signal LCLV 514, at a location directly below the second PBS 518. This position corresponds to the conjugate position for the three primary-color LCLVs 515B, 515G, 515R in relation to the projection-lens system 519.

The image formed on the luminance-signal LCLV 514 is also shown in FIG. 15. After recombination, the image defined by the LCLV 514 must coincide with the combined images of the color-signal LCLVs 515R, 515G, 515B. To such end, the image from the luminance-signal LCLV 514 is rotated 180 degrees and reversed top to bottom compared to the image defined by the G-light LCLV us 515G. Light exiting in the +Y direction from the image I is reflected by the second PBS 518 in the +Z direction, and is recombined with light propagating in the +Z direction from the luminance-signal LCLV 514 and through the second PBS 518. This recombined light is projected in the +Z direction onto the screen (not shown) via the projection-lens system 519.

In this Example Embodiment, the crossed dichroic mirror 507 and the crossed dichroic prism 516 are configured such that the G light is transmitted through them and the R and B lights are reflected. This embodiment is not limited to such a configuration. It is alternatively possible to form the dichroic prisms and mirrors in a way that either of the other two primary colors are transmitted rather than reflected. In such alternative instances, the image defined by the LCLV corresponding to the transmitted light and the image defined by the luminance LCLV should have relative orientations as described above.

Although the recombined-light optical relay 521 in this Example Embodiment preferably comprises two lens groups 521', 521", it is alternatively possible for the recombined-light optical relay 521 to comprise a first field lens situated proximally to the exit side (+Z direction side) of the crossed dichroic prism 516, a second field lens situated proximally to the combined image I, and a positive lens group situated between the two field lenses.

In this Example Embodiment, the first half-wave plate 505 is preferably located in the optical path between the first PBS 504 and the crossed dichroic mirror 507, and the second half-wave plate 506 is preferably located in the optical path between the crossed-dichroic prism 516 and the second PBS 518 (most preferably between the combined image I and the second PBS 518). However, half-wave plates are not limited to these locations. For example, a half-wave plate can be situated in the optical path downstream of the crossed-dichroic mirror 507 rather than immediately downstream of the first PBS 504, with additional half-wave plates for each primary color situated immediately upstream of the respective color-signal LCLV 515G, 515R, 515B. The second half-wave plate 506 can alternatively be situated in the optical path between the combined image I and the third mirror 524.

Sheet-type half-wave plates can be used as the first and second half-wave plates 50S, 506. If such sheet-type plates are used, they should be installed on the surfaces of prism members such as the PBSs 504, 518, and the crossed dichroic prism 516, etc.

In this Example Embodiment, the illumination-relay optical system preferably comprises first and second illumination lenses 503 and 522. Alternatively, the illumination-relay optical system can comprise a positive lens group sandwiched between two field lenses. In the alternative instance, if the first PBS 504 is situated between the field lens on the crossed dichroic mirror 507 side and the positive lens group, an identical field lens is situated in the optical path between the first PBS 504 and the second PBS 518. If the first PBS 504 is situated in the optical path between the positive lens group and the rod integrator 502, then the same positive lens group and field lens are preferably situated in the optical path between the first PBS 504 and the second PBS 518. In this alternative configuration, the first PBS 504 is situated in a position intersecting the principal rays.

This Example Embodiment preferably employs a rod integrator 502. Alternatively, a fly-eye lens can be used. In addition, instead of using a lamp and elliptical mirror for the light source 501, a lamp and a parabolic mirror or spherical mirror can be used.

In this Example Embodiment, principal rays are defined using the aperture stop of the projection-lens system 519. Alternatively or in addition to this configuration, an aperture stop can be installed at a location conjugate to the relative position of the aperture stop of the projection-lens system 519. For example, the aperture stop can be at a location (conjugate to the relative position of the aperture stop of the projection-lens system 519) between the first illumination lens 503 and the second illumination lens 522; between the first illumination lens 503 and the first PBS 504; between the respective first color lens 510R, 510G, 510B and the respective second color mirrors 513R, 513G, 513B; and/or within the recombined-light optical relay. Locating the aperture stop outside the projection-lens system 519 in this manner facilitates elimination of internally reflected and scattered light and can prevent overheating of the LCLVs.

Also, a field stop can be situated at a location conjugate to the distal end face 502b of the rod integrator 502. Even with such a field stop installed, it is possible to eliminate internally reflected light and scattered light in the entire projection optical system, improve projected-image contrast, and prevent heating of the LCLVs.

It is also noted that a crossed-dichroic prism can be used instead of the crossed dichroic mirror 507, and that a crossed dichroic mirror can be used instead of the crossed-dichroic prism 516. To such end, FIG. 16 is a representative plot of spectral transmission characteristics of a crossed dichroic prism such as component 516, and FIG. 17 is a representative plot of spectral transmission characteristics of a crossed dichroic mirror such as component 507, as configured for a B-light center reference wavelength of 458 nm.

Figure 16:
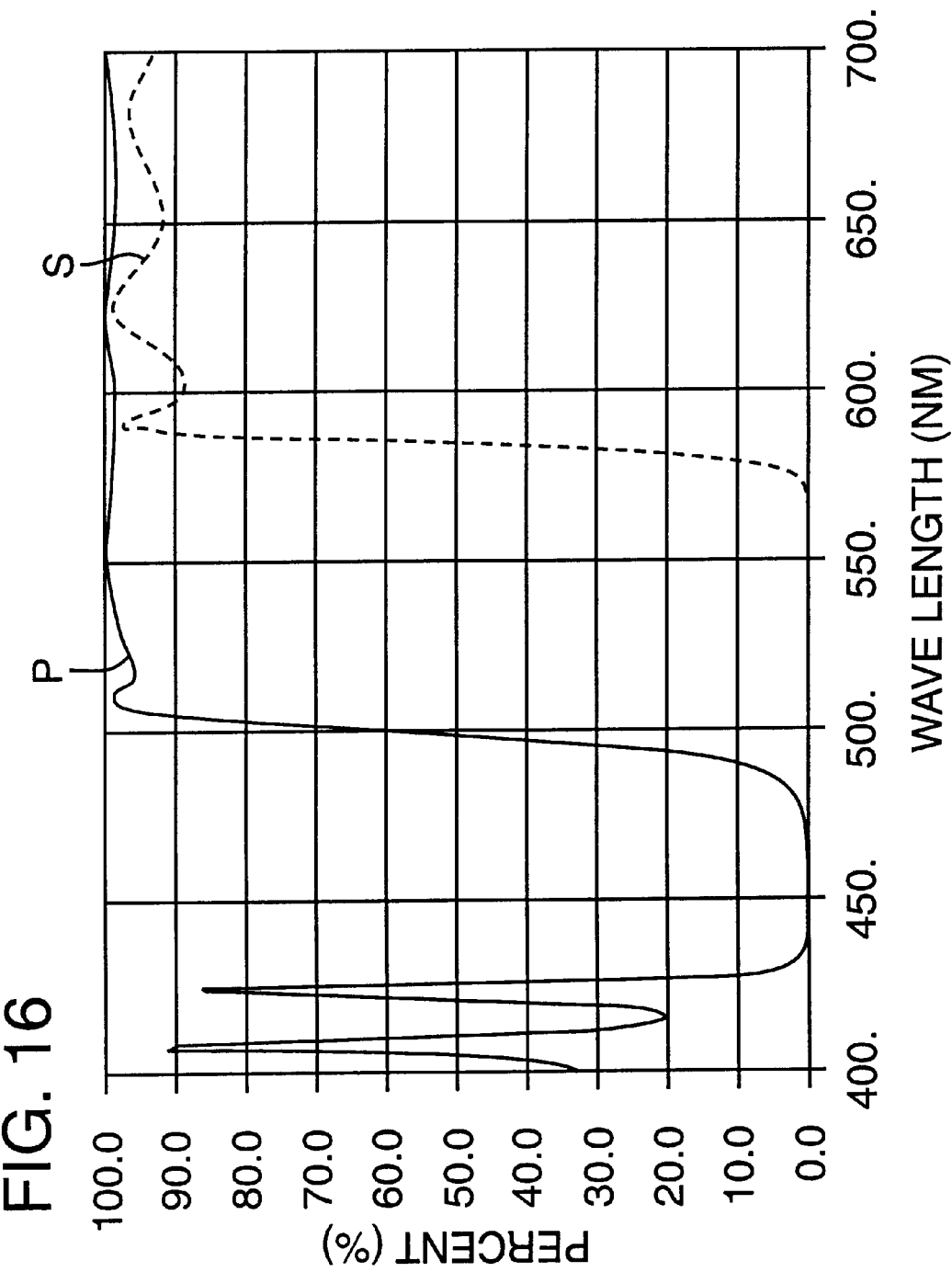
FIG. 16 is a spectral transmission plot for a crossed dichroic prism, as described in the sixth representative embodiment.

Turning first to FIG. 16, it will be recalled that the crossed dichroic prism 516 comprises an R-light-reflecting dichroic film 516R and a B-light-reflecting dichroic film 516B sandwiched between the right angles of four right-angle prisms. The four right-angle prisms are cemented together using an optical adhesive. The dichroic films 516R, 516B each have multiple layers in which a high-refractive-index substance and a low-refractive-index substance are alternatingly laminated together. Each layer is formed by, for example, chemical-vapor deposition or by sputtering on the surface of a glass substrate. By way of example, titanium dioxide (n=2.38) is used as the high-refractive-index substance and silicon dioxide (n=1.47) is used as the low-refractive-index substance, and there are 29 laminated layers. The glass substrate is a glass equivalent to BSC7 (n=1.52). FIG. 16 shows transmission (reflection) characteristics when the angle of incidence is 45 degrees relative to a line normal to the surface of the dichroic film. The Y axis shows transmissivity and the X axis shows wavelength. From this plot, it can be seen that, when P-polarized light enters the film, the reflected wavelength band is very narrow compared to S-polarized light.

Figure 17:
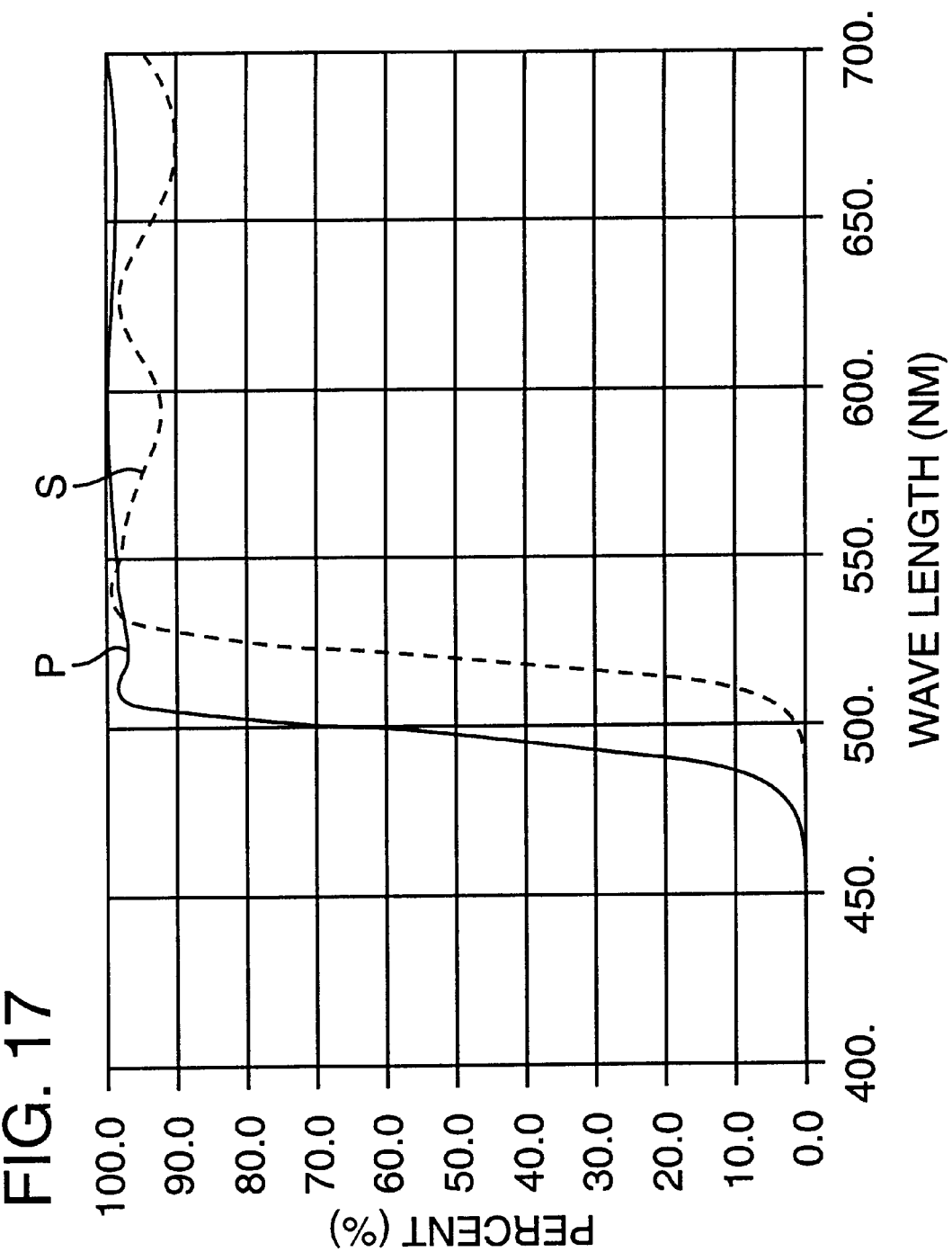
FIG. 17 is a spectral transmission plot for a crossed dichroic mirror, as described in the sixth embodiment.

FIG. 17 shows the spectral transmission characteristics of a dichroic film on a crossed dichroic mirror, such as component 507, employed as a component of the color-combining optical system. The dichroic films are formed by layering substances, as described above with reference to FIG. 16, on a, e.g., 1-mm thick glass plate. Typically, the film comprises about 20 layers. The plot in FIG. 17 shows the transmissivity of P-polarized light and S-polarized light (i.e., differences in reflectivity characteristics). As can be seen, there is a difference in the reflection band of P-polarized light and S-polarized light. Thus, light loss while combining colors can be diminished by making light entering the dichroic film have S polarization relative to the dichroic film surface. This figure shows spectral transmission characteristics for B light, but the same characteristics are applicable to both R light and G light.

According to this Example Embodiment, relatively low-resolution primary-color LCLVs can be used that are more compact and lower in cost than the high-resolution luminance-signal LCLV. This substantially reduces cost of the overall system.

Figure 18:
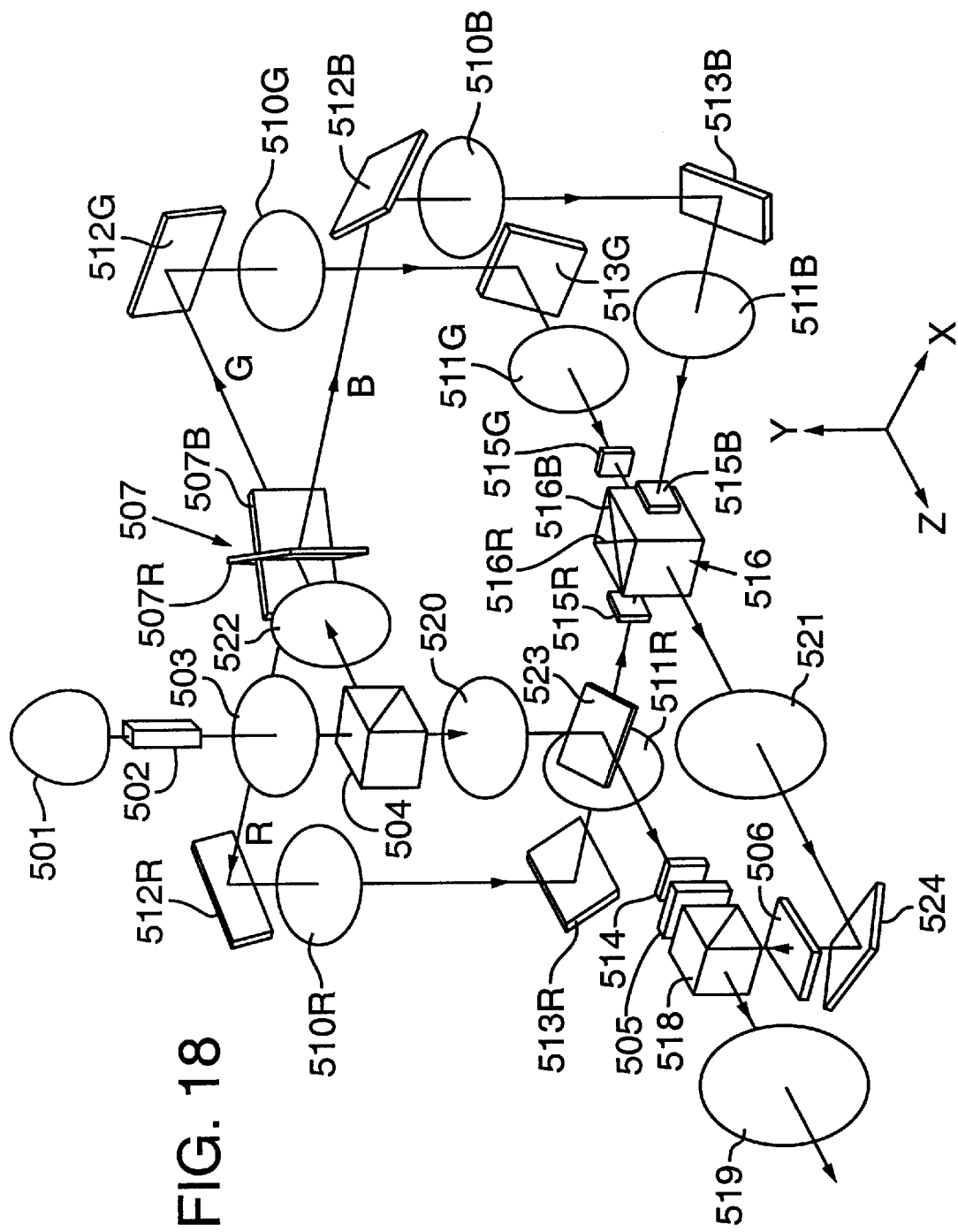
FIG. 18 is a perspective view of a projection-display apparatus according to a seventh representative embodiment of the invention.

Moreover, this Example Embodiment makes it possible to obtain high-resolution, high-luminance projection images from a relatively small number of LCLVs. This also results in a substantial cost reduction and increase compactness without compromising quality of the projected image.
Seventh Embodiment The seventh representative embodiment is shown in FIG. 18. Components shown in FIG. 18 that are the same as shown in FIG. 13 have the same reference designators and are not described further. This seventh embodiment differs from the sixth embodiment in that, in the seventh embodiment, the first polarized light component that is split by the first PBS 504 is S-polarized light (rather than P-polarized light) and the second polarized light component is P-polarized light (rather than S-polarized light). Thus, half-wave plates have different locations in the seventh embodiment compared to the sixth embodiment.

In FIG. 18, light from the light source 501 is split into the P- and S-polarized light components by the first PBS 504. The first polarized light component, which has S polarity (linearly polarized light that vibrates in the ±X direction in the diagram), is reflected by the first PBS 504 to propagate in the −Z direction, passes through the second illumination lens 522, and enters the crossed dichroic mirror 507 for color separation.

As can be ascertained from FIG. 18, a half-wave plate is not situated between the first PBS 504 and the crossed dichroic mirror 507, in contrast to the sixth embodiment.

The crossed dichroic mirror 507 reflects R light in the −X direction in the diagram, and reflects B light in the +X direction in the diagram. G light is transmitted through the crossed dichroic mirror 507 and propagates in the −Z direction in the diagram. Considering the B light as exemplary, FIG. 18 shows that B light is reflected to the −Y direction by the first color mirror 512B. The B light then passes through a first lens (of a B-light relay optical system) 510B, and is reflected by the second color mirror 513B to the −X direction toward the B-light LCLV 515B. B light incident on the B-light LCLV 515B is linearly polarized and vibrating in the ±Z direction. B light modulated by the B-light LCLV 515B propagates in the −X direction and is reflected in the +Z direction by the B-light-reflecting dichroic film 516B in the crossed dichroic prism 516 (serving as the color-combining optical system). Here the B light is a linearly polarized light flux vibrating in the BY direction.

R light and G light are also color-separated at the crossed dichroic mirror 507, and the respective primary-color light fluxes pass through respective color-signal LCLVs 515R, 515G. The modulated R and G light fluxes then enter the crossed dichroic prism 516. At this time the R light and the G light are also linearly polarized light fluxes vibrating in the ±Y direction.

Light exiting the color-combining optical system in the +Z direction comprises all three primary-color modulated light fluxes. Such "recombined" light propagates through the recombined-light optical relay 521 and is bent to the +Y direction by the third mirror 524. The recombined light then passes through the half-wave plate 506 that rotates the polarization orientation by 90 degrees; the recombined light then enters the second PBS 518.

The second polarized light component, which has P polarity (linearly polarized light vibrating in the ±Z direction) relative to the first PBS 504 passes through the first PBS 504. The second polarized light component, propagating in the −Y direction, then passes through the third illumination lens 520 and is reflected by the fourth mirror 523 to the +Z direction so as to enter the luminance-signal LCLV 514. Light modulated by the luminance-signal LCLV 514 undergoes a 90-degree rotation of its polarization orientation by a half-wave plate 505 situated between the luminance-signal LCLV 514 and the second PBS 518. The second PBS 518 combines the luminance light flux with the recombined color light fluxes.

Arranging the half-wave plates 505, 506 according to this representative embodiment (as shown in FIG. 18) enables the light from the color-signal LCLVs 515G, 515R, 515B to be S-polarized relative to the R- and B-light-reflecting dichroic films 516R, 516B, respectively, using a small number of plates. In the same manner as the sixth embodiment, the spectral characteristics of the R-light-reflecting dichroic film 516R and the B-light-reflecting dichroic film 516B are quite satisfactory for their intended purpose in the seventh embodiment. While primary colors are combined, part of each primary-color flux passes through without loss.

The seventh embodiment permits the use of a large, high-resolution LCLV for the luminance signal and smaller lower-resolution LCLVs for the color signals. Thus, this embodiment permits the generation and projection of a color image with high resolution and high luminance, but at reduced cost. Also, imaging performance is not degraded because light loss is eliminated at the color-combining optical system. Therefore, the image has excellent color balance as well.

Eighth Embodiment

Figure 19:
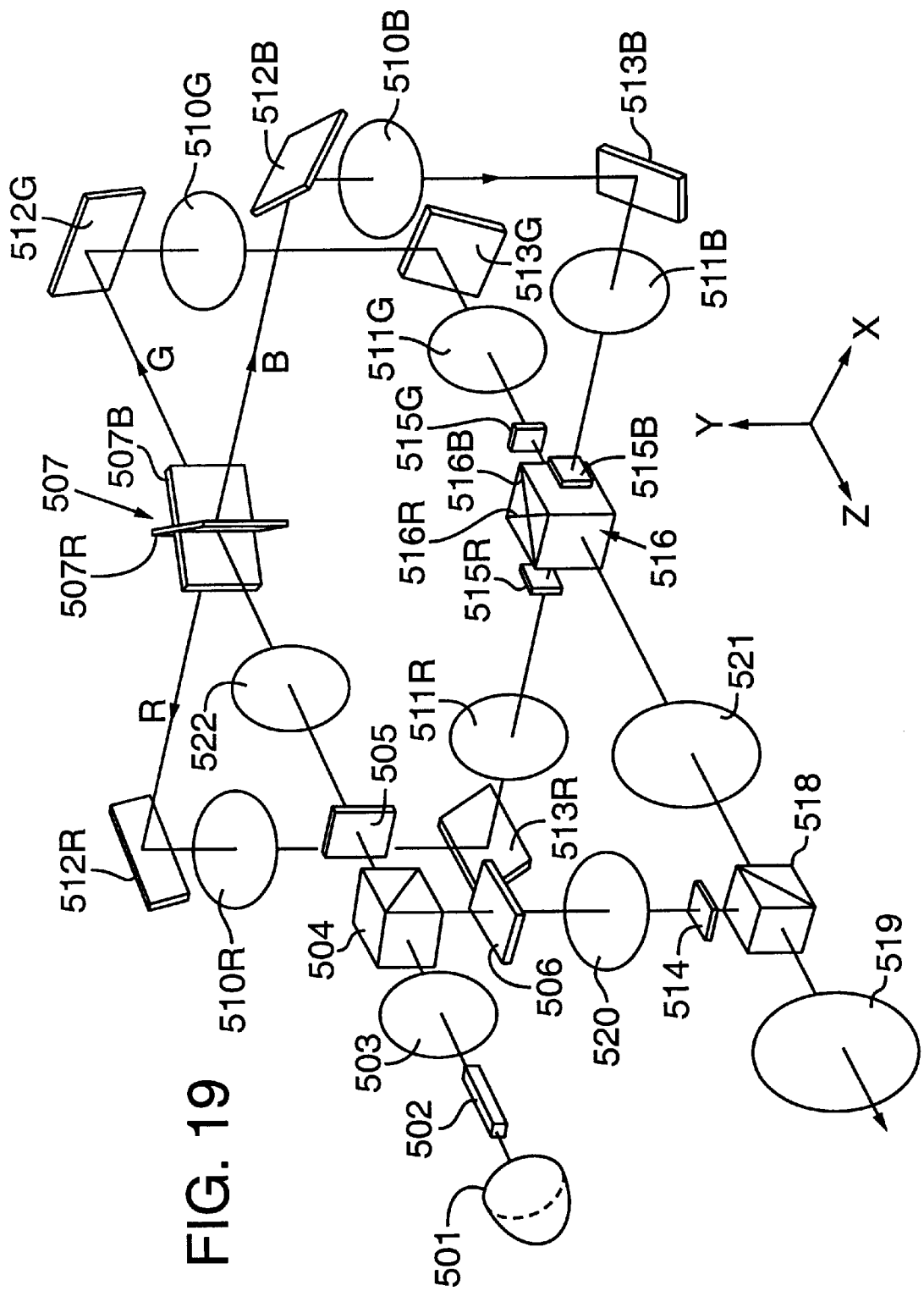
FIG. 19 is a perspective view of a projection display apparatus according to an eighth representative embodiment of the invention.

The eighth representative embodiment is illustrated in FIG. 19, in which components that are similar to those shown in FIG. 13 have the same reference designators and are not described further.

In the eighth embodiment, the first polarized light component of an illumination light flux, as split by the first PBS 504, is P-polarized relative to the first PBS 504. As seen in FIG. 19, the half-wave plates 505, 506 are situated adjacent the first PBS 504 so as to rotate the polarization orientation of both light fluxes exiting the first PBS 504 by 90 degrees. I.e., the half-wave plate 505 is situated between the first PBS 504 and the color-separation optical system, and the half-wave plate 506 is situated between the first PBS 504 and the color-combining optical system.

Linearly polarized light vibrating in the ±Y directions and exiting the crossed dichroic prism 507 passes through the recombined-light optical relay 521, and enters the second PBS 518 as a P-polarized light component (vibrating in the ±Z directions in the diagram).

Meanwhile, light flux comprising the second polarized light component light beam (linearly polarized light vibrating in the ±X directions) that was split by the first PBS 504 undergoes a 90-degree rotation of polarization orientation by passage through the half-wave plate 506. This light flux passes through the third illumination lens 520 (comprising a portion of the illumination-relay optical system) as a polarized light component (linearly polarized light vibrating in the ±Z directions) and enters the luminance-signal LCLV 514. By passing through the luminance-signal LCLV 514, the light is modulated and undergoes a further 90-degree rotation of polarization orientation. The light flux is then combined as S-polarized light (linearly polarized light vibrating in the ±X directions) with the P-polarized light component (vibrating in the ±Z directions in the diagram) by the second PBS 518 and exits through the projection lens 519 in the +Z direction.

In this embodiment, light enters the crossed dichroic prism 516 as S-polarized light relative to the prism's dichroic film surfaces. Consequently, reflection characteristics are improved, and the same advantages are realized as in other embodiments disclosed herein.

The eighth embodiment permits the use of a large high-resolution LCLV for the luminance-signal and smaller low-resolution LCLVs for the color signals. Thus, this embodiment permits the generation and projection of a color image with high resolution and high luminance, but at reduced cost. Also, performance is not degraded because light loss is eliminated at the color-combining optical system. Therefore, the image has excellent color balance as well.

Ninth Embodiment

Figure 20:
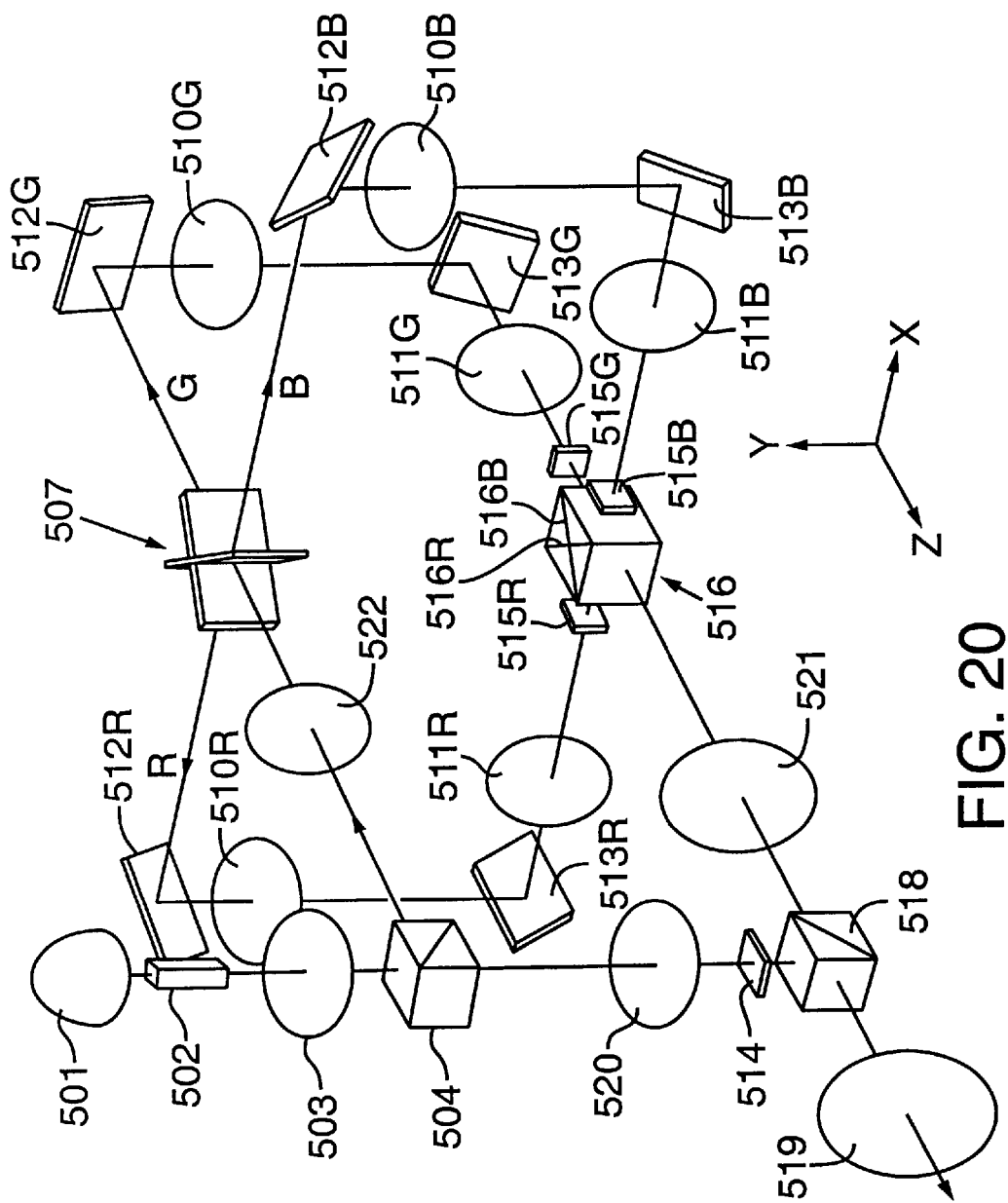
FIG. 20 is a perspective view of a projection-display apparatus according to a ninth representative embodiment of the invention.

The ninth representative embodiment is shown in FIG. 20, in which components that are the same as shown in FIG. 13 have the same reference designators and are not further described. In this embodiment, a light flux from the light source 501 is polarized and split by a first PBS 504. The S-polarized light component propagates in the −Z direction in the diagram to the color-separation optical system (comprising the crossed dichroic mirror 507). The P-polarized light component is transmitted in the −Y direction through the first PBS 504 to the luminance-signal LCLV 514. Thus, half-wave plates are not needed, in contrast to the sixth, seventh, and eighth embodiments.

The S-polarized light component is split by the crossed dichroic mirror 507 into R, G, and B lights. The R, G, and B lights enter respective color-signal LCLVs 515R, 515G, 515B and are modulated. Each LCLV 515R, 515G, 515B rotates the polarization orientation of each primary-color light by 90 degrees. Thus, the modulated R, G, and B lights are caused to vibrate in the ±Z directions relative to the surfaces of the dichroic films 516R, 516B. The R, G, and B lights are recombined by the crossed dichroic prism 516 and exit in the +Z direction toward the second PBS 518.

The P-polarized light component transmitted in the −Y direction through the first PBS 504 to the luminance-signal LCLV 514 undergoes a 90-degree rotation of polarization orientation upon passing through the luminance-signal LCLV 514. Thus, after passing through the luminance-signal LCLV 514, the light is linearly polarized, vibrating in the ±X directions.

The recombined R, G. B light fluxes are combined as S-polarized light by the second PBS 518 with the P-polarized light that has passed in the −Y direction through the luminance-signal LCLV 514. Polarization conversion is not needed before either light flux enters the second PBS 518.

This ninth embodiment permits the use of a large high-resolution LCLV for the luminance-signal and smaller low-resolution LCLVs for the color signals. Thus, this embodiment permits the generation and projection of a color image with high resolution and high luminance, but at reduced cost. Also, performance is not degraded because light loss is eliminated at the color-combining optical system. Therefore, the projected image has excellent color balance as well.

Tenth Embodiment

Figure 21:
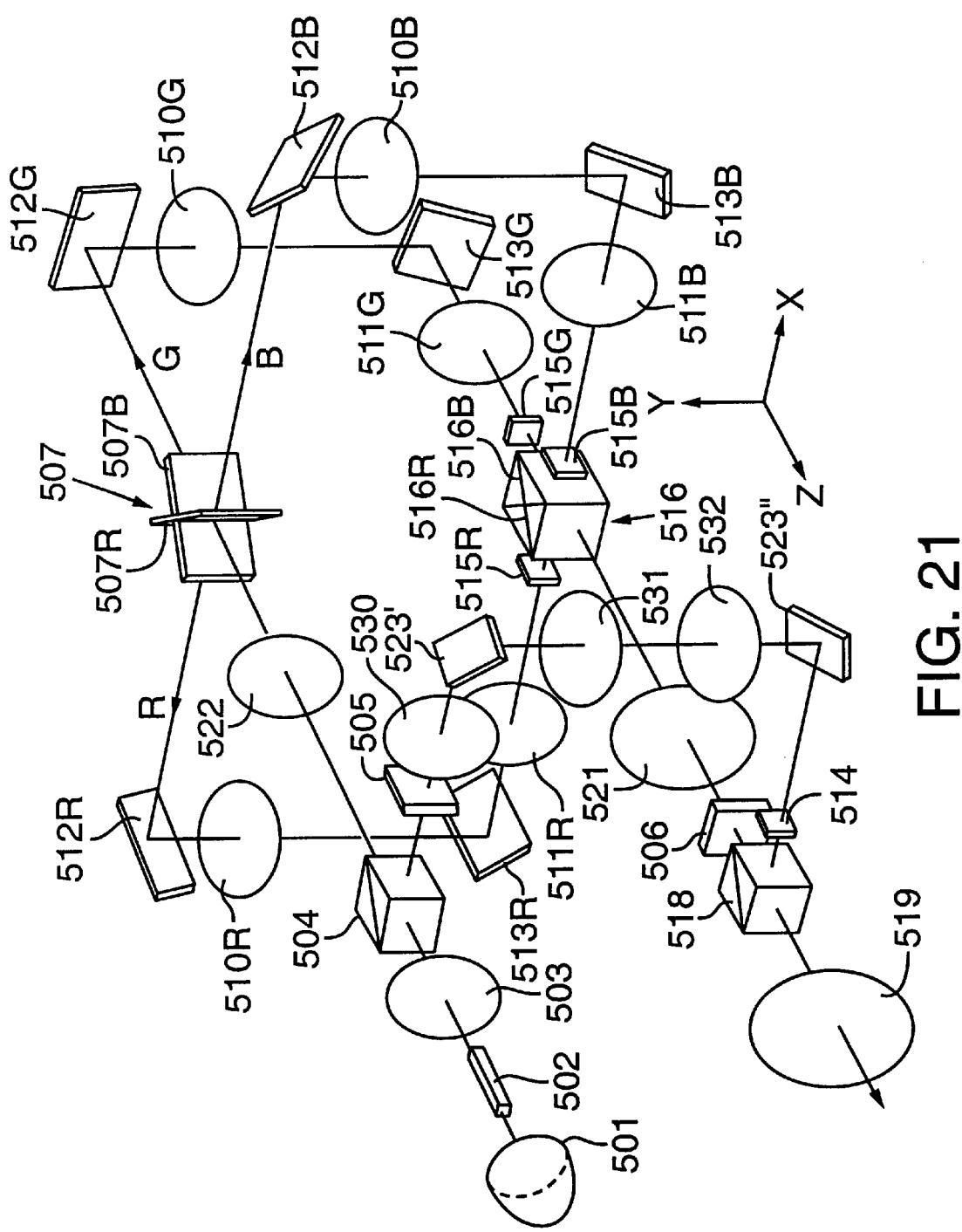
FIG. 21 is a perspective view of a projection display apparatus according to a tenth representative embodiment of the invention.

The tenth representative embodiment is illustrated in FIG. 21 in which components that are the same as in FIG. 13 have the same reference designators and are not described further. In the tenth embodiment, light from the light source 501 is polarized and split by the first PBS 504, which is oriented with its polarizing and splitting surface rotated 90 degrees with respect to the center of the Z axis, into two polarized light fluxes.

The first polarized light flux, having P polarity (vibrating in the ±X direction) relative to the first PBS 504, propagates in the −Z direction in the diagram to the color-separation optical system (comprising the crossed dichroic mirror 507). Lights of the three primary colors R, G, and B are separated from each other and propagate in different respective directions from the color-separation optical system. The R, G, and B lights are modulated at the respective color-signal LCLVs 515R, 515G, 515B and enter the color-combining optical system (comprising the crossed dichroic prism 516). As they enter the crossed dichroic prism 516, the modulated R, G, and B lights are vibrating in the ±Y directions in the diagram. After recombination, the light exits in the +Z direction from the crossed dichroic prism 516, passes through the recombined-light optical relay 521, passes through the second half-wave plate 506 which rotates the polarization orientation of the light by 90 degrees, and enters the second PBS 518 as a P-polarized light component (vibrating in the ±X direction) relative to the second PBS 518.

The second polarized light flux, propagating in the +X direction, undergoes a rotation of polarization orientation by the first half-wave plate 505 (the light flux now vibrating in the ±Z direction). The light flux passes through an illumination lens 530 (comprising part of the illumination-relay optical system), is bent by mirrors 523', 523", and enters the luminance-signal LCLV 514 from the −X direction in the diagram. The light is modulated by the luminance-signal LCLV 514 which also rotates its polarization orientation by 90 degrees. The light then enters, vibrating in the ±Y direction in the diagram, the second PBS 516 where the light is combined with the P-polarized light component described above. The combined light propagates in the +Z direction through the projection-lens system 519.

The tenth embodiment permits the use of a large high-resolution LCLV for the luminance-signal and smaller low-resolution LCLVs for the color signals. Thus, this embodiment permits the generation and projection of a color image with high resolution and high luminance, but at reduced cost. Also, performance is not degraded because light loss is eliminated at the color-combining optical system. Therefore, the projected image has excellent color balance as well.

Eleventh Embodiment

Figure 22:
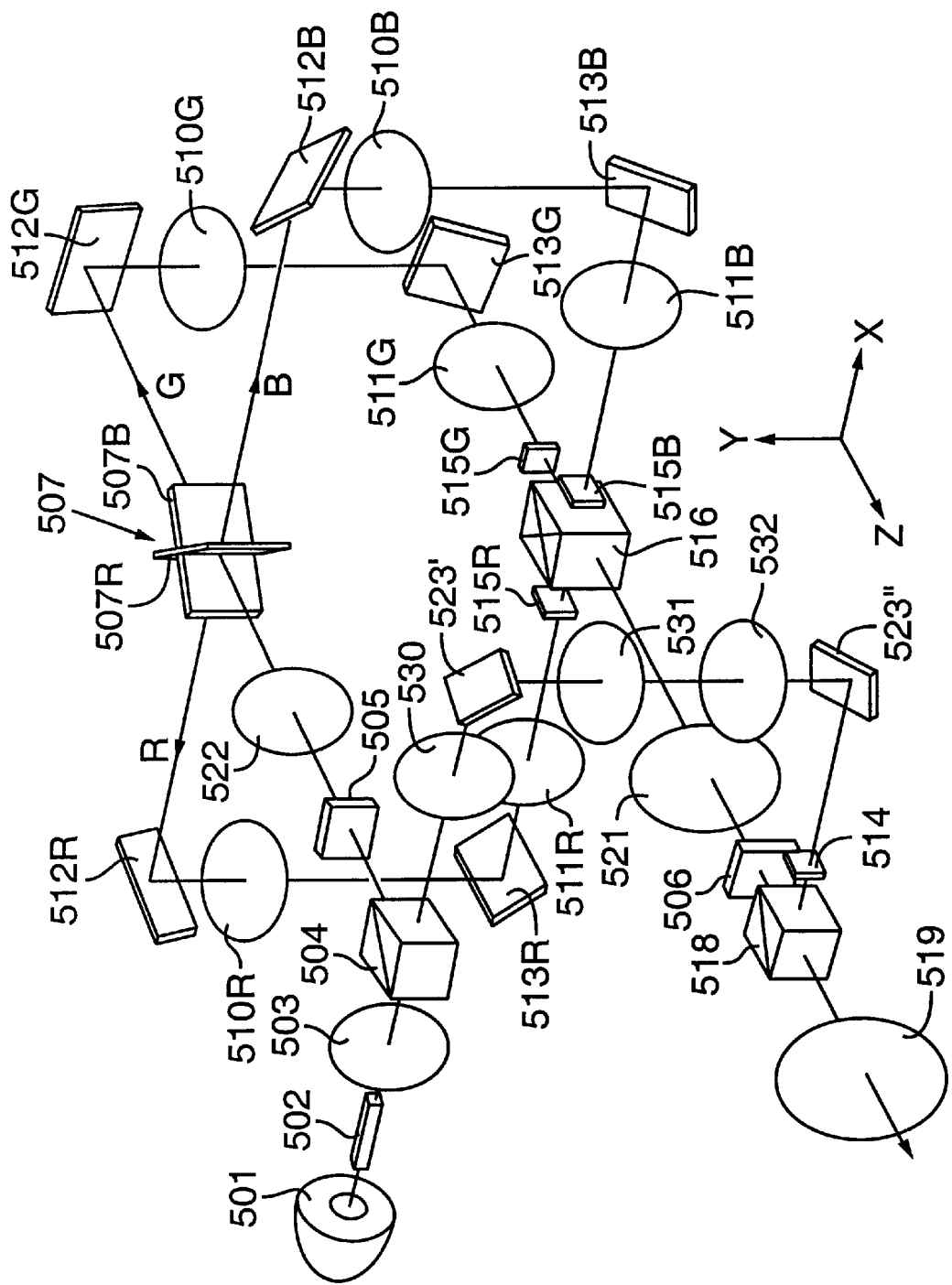
FIG. 22 is a perspective view of a projection-display apparatus according to an eleventh representative embodiment of the invention.

The eleventh representative embodiment is illustrated in FIG. 22 in which components that are the same as in FIGS. 13 and 21 have the same reference designators and are not described further.

In FIG. 22, light from the light source 501 propagates in the −X direction. This light is split by the first PBS 504, which is oriented with its polarizing and splitting surface rotated 90 degrees with respect to the center of the Z axis, into two polarized light fluxes.

The first polarized light flux is S-polarized (vibrating in the ±Z directions) relative to the first PBS 504 and passes through the first PBS 504. This light flux undergoes a 90-degree rotation of polarization orientation (now vibrating in the ±X direction) by the first half-wave plate 505. The light flux then passes through the second illumination lens 522 (comprising part of the illumination-relay optical system) to the crossed dichroic mirror 507 (comprising part of the color-separation optical system). The crossed dichroic mirror 507 splits the light into component primary colors: R, G, and B light each propagating in a different direction. The R, G, and B lights are modulated by the respective color-signal LCLVs 515R, 515G, 515B and then enter the crossed dichroic prism 516 (comprising part of the color-combining optical system). At this time, each of the modulated R, G, B lights is vibrating in the ±Y directions in the diagram. The modulated lights are recombined by the crossed dichroic prism 516; the recombined flux propagates in the +Z direction through the recombined-light optical relay 521. The polarization orientation of the recombined flux is rotated 90 degrees by the second half-wave plate 506, and enters the second PES 518 as P-polarized light (vibrating in the ±X direction).

The second polarized light flux propagates in the +X direction through the illumination lens 530 and is bent by the mirrors 523' and 523" (while passing through illumination lenses 531, 532). The flux enters the luminance-signal LCLV 514 in the −X direction in the diagram. The luminance-signal LCLV 514 modulates the light flux and rotates its polarization orientation by 90 degrees (now vibrating in the ±Y direction). The flux then enters the second PBS 518 where the flux is combined with the recombined light flux described above. The combined fluxes propagate in the +Z direction through the projection-lens system 519.

It is noted that light exiting the second PBS 518 is not limited to propagation in the +Z direction.

This embodiment permits the use of a large high-resolution LCLV for the luminance-signal and smaller low-resolution LCLVs for the color signals. Thus, this embodiment permits the generation and projection of a color image with high resolution and high luminance, but at lower cost. Also, performance is not degraded because light loss is eliminated at the color-combining optical system. Therefore, the projected image has excellent color balance as well.

Twelfth Embodiment

Figure 23:
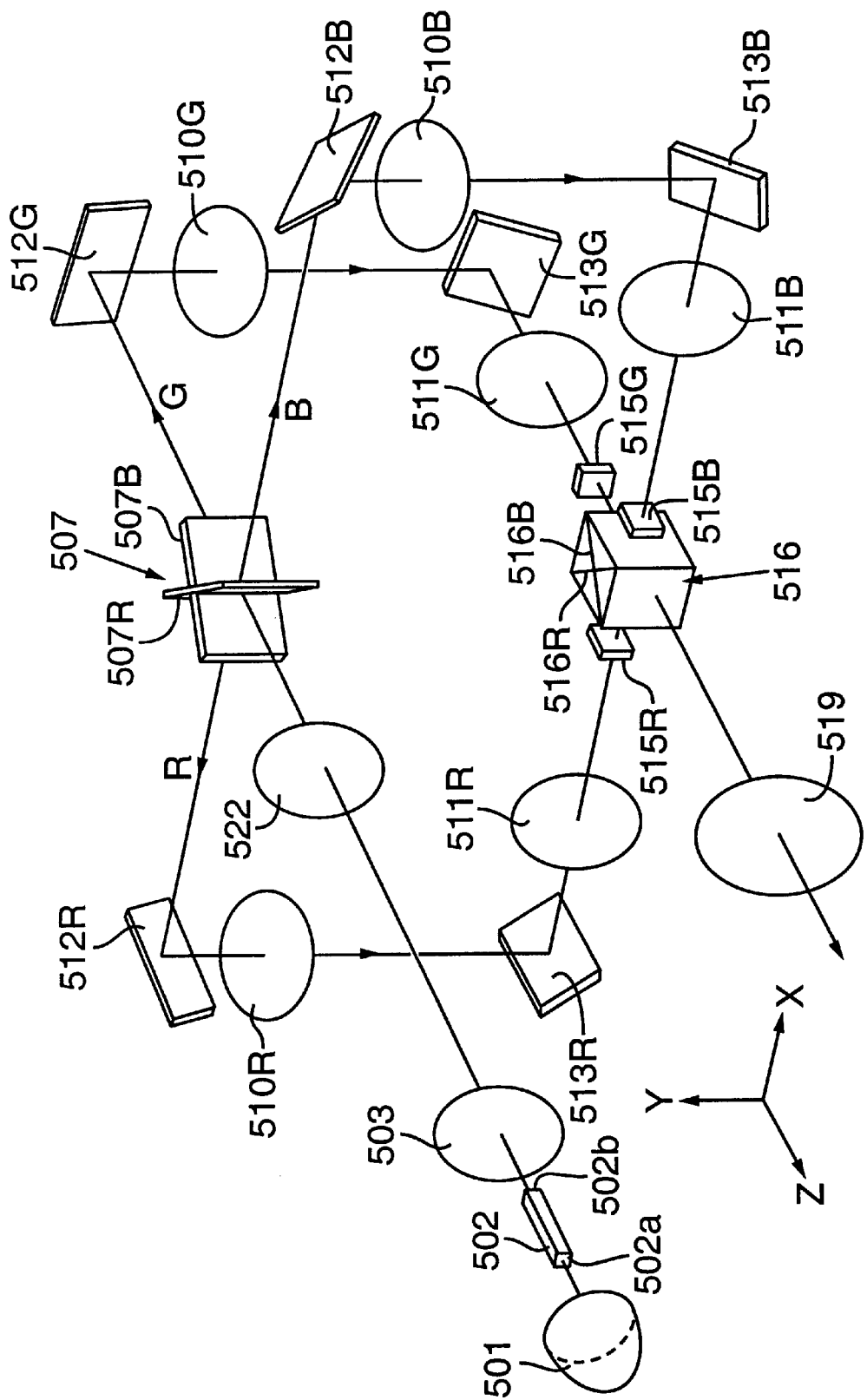
FIG. 23 is a perspective view of a projection-display apparatus according to a twelfth representative embodiment of the invention.
Figure 24:
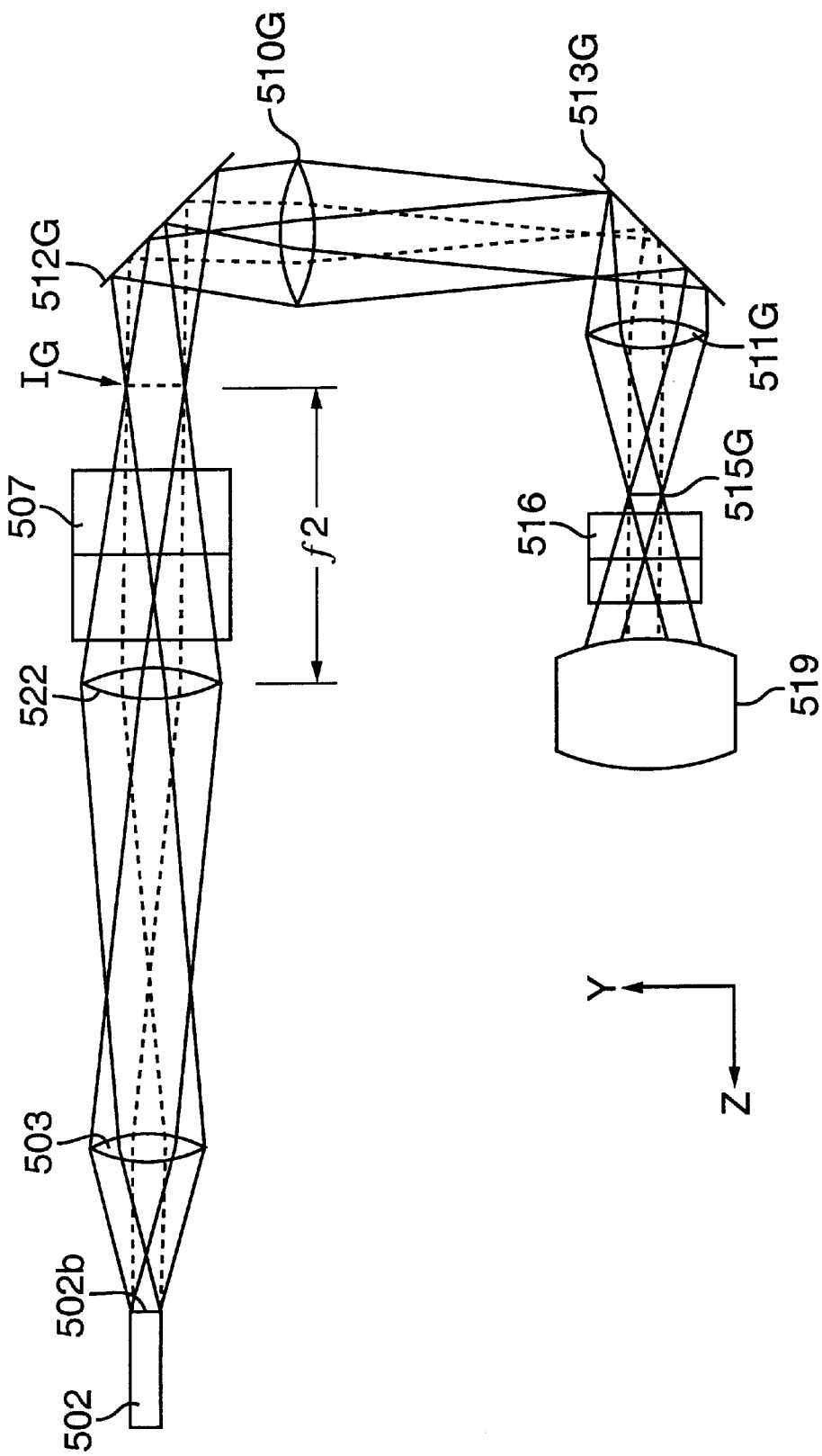
FIG. 24 is an optical diagram of the FIG. 23 embodiment in the Y–Z plane, and including ray traces.

The overall configuration of the twelfth representative embodiment is shown in FIG. 23. FIG. 24 presents an optical diagram of this embodiment on the Y−Z plane of FIG. 23. In FIG. 24, solid lines indicate off-axis outer peripheral rays of the light flux, and broken lines indicate off-axis principal rays of the light flux. The coordinate system in FIG. 24 corresponds to that used in FIG. 23. Also, components in FIG. 23 that are the same as in FIG. 13 have the same reference designators.

In FIG. 23, white light is generated by the light source 501 and preferably passes through infrared and ultraviolet filters (not shown). The light is then collected on the proximal end face 502a of the rod integrator 502. At the distal end face 502b of the rod integrator 502, a planar light flux is formed having uniform light intensity.

Light from the distal end face 502b propagates in the −Z direction and enters an illumination-relay optical system comprising first and second illumination lenses 503, 522, respectively. The first illumination lens 503 has a focal length $f_1$, and the second illumination lens 522 has a focal length $f_2$. The lenses 503, 522 are separated from each other by the axial distance (f. +$f_2$); i.e., the rear focal point of the first illumination lens 503 and the front focal point of the second illumination lens 522 are preferably coincident.

The light then enters the crossed dichroic mirror 507 comprising the R-light-reflecting dichroic mirror 507R and the B-light-reflecting dichroic mirror 507B arranged relative to each other in an X-pattern. R light is reflected in the −X direction by the R-light-reflecting dichroic mirror 507R, and B light is reflected in the +X direction by the B-light-reflecting dichroic mirror 507B. G light is transmitted in the −Z direction through R-light-reflecting dichroic mirror 507R and the B-light-reflecting dichroic mirror 507B.

The second illumination lens 522 essentially has three rear focal points, one for each of the R light, G light, and B light; an image of the exit distal end face 502b of the rod integrator 502 is formed at each of the rear focal points.

FIG. 24 shows rays pertaining to G light; however, it will be understood that the R and B lights undergo similar treatment (but in different planes). The G light which passed through the crossed dichroic mirror 507 forms an image $I_G$ of the distal end face 502b at a location situated the distance $f_2$ from the second illumination lens 522. The G light from this image $I_G$ is reflected by first mirror 512G, and propagates along the −Y direction through the first lens 510G. The G light is reflected by the second mirror 513G to propagate in the +Z direction, and passes through the second lens 511G. (The lenses 510G, 511G comprise a G-light-relay optical system.) The first lens 510G has the focal length $f_2$ and the second lens 511G has the focal length $f_1$; the lenses 510G, 511G are separated by the distance ($f_1+f_2$); i.e., the rear focal point of the first lens 510G coincides with the front focal point of the second lens 511G.

The G light is incident on the G-light LCLV 515G. The G-light LCLV 515G is situated a distance $f_1$ from the G-light-relay optical system, and an image of the distal end face 502b of the rod integrator 502 is formed on the G-light LCLV 515G using G light.

In FIG. 23, the R light reflected in the −X direction by the crossed dichroic mirror 507 forms an image $I_R$ of the distal end face 502b at a location situated the distance $f_2$ from the second illumination lens 522, in the same manner as with the G light. The R light from this image $I_R$ is reflected by the first mirror 512R to propagate in the −Y direction. The R light passes through the first lens 510R, is reflected by the second mirror 513R to propagate in the +Z direction, and passes through the second lens 511R. (The lenses 510R, 511R comprise an R-light-relay optical system.) The first lens 510R has the focal length $f_2$, the second lens 511R has the focal length $f_1$, and the lenses 510R, 511R are separated from each other by the distance $(f_1+f_2)$; i.e., the rear focal point of the lens 510R coincides with the front focal point of the lens 511R.

R light then propagates in the +X direction to the R-light LCLV 515R separated the distance $f_1$ from the R-light-relay optical system. An image of the distal end face 502b of the rod integrator 502 forms on the R-light LCLV 515R using R light.

B light is reflected in the +X direction by the crossed dichroic mirror 507 and forms an image $I_B$ of the distal end face 502b of the rod integrator 502 at a location located the distance $f_2$ from the second illumination lens 522, in the same manner as G light. The B light from the image I, is reflected by the first mirror 512B, and propagates in the −Y direction through the first lens 510B. The B light is reflected by the second mirror 513B to propagate in the −X direction, and then passes through the second lens 511B. (The lenses 510B, 511B comprise the B-light-relay optical system.) The first lens 510B has the focal length $f_2$, the second lens 511B has the focal length f., and the lenses 510B, 511B are separated from each other by the distance $(f_1+f_2)$. I.e., the rear focal point of the first lens 510B coincides with the front focal point of the second lens 511B.

B light from the B-light-relay optical system propagates in the −X direction to the B-light LCLV 515B which is situated a distance $f_1$ from the B-light-relay optical system. An image of the distal end face 502b of the rod integrator 502 is formed on the B-light LCLV 515B using B light.

Thus, an image of the distal end face 502b of the rod integrator 502 having a uniform light-intensity distribution is formed at each color-signal LCLV 515G, 515R, 515B, and each LCLV 515G, 515R, 515B is critically illuminated by a uniform planar light source. In addition, the distal end face 502b of the rod integrator 502 is situated in a conjugate position with respect to each color-signal LCLV 515G, 515R, 515B. This sets the aspect ratio so that the distal end face 502b is similar in size to the surface of each color-signal LCLV 515G, 515R, 515B.

The first lenses 510G, 510R, 510B are preferably identical, and the second lenses 511G, 511R, 511B are preferably identical. Likewise, the various optical path lengths from the crossed dichroic mirror 507 to each color-signal LCLV 515R, 515B, 515G are preferably identical.

The color-signal LCLVs 515G, 515R, 515B are preferably as described above in the sixth embodiment.

Modulated light from the color-signal LCLVs 515G, 515R, 515B enter the crossed dichroic prism 516 preferably configured as described above in the sixth embodiment. G light modulated by the G-light LCLV 515G propagates in the +Z direction and passes through the R-light-reflecting dichroic film 516R and the B-light-reflecting dichroic film 516B. R light modulated by the R-light LCLV 515R propagates in the +X direction and is reflected in the +Z direction by the R-light-reflecting dichroic film 516R. B light modulated by the B-light LCLV 515B propagates in the −X direction and is reflected in the +Z direction by the B-light-reflecting dichroic film 516B. Other characteristics of the crossed dichroic prism 516 are as described above in the sixth embodiment.

Adjacent the exit side (+Z direction side) of the crossed dichroic prism 516 is situated a projection-lens system 519. The projection-lens system 519 preferably comprises an aperture stop (not shown) as described above in the sixth embodiment. The principal rays of the entire projection apparatus of this embodiment are established by the aperture stop in the projection-lens system 519; the principal rays being parallel to the optical axis between the crossed dichroic prism 516 and the projection-lens system 519. The projection-lens system 519 is preferably telecentric at the dichroic-prism side.

As shown in FIG. 24, the principal ray determined by the aperture stop of the projection-lens system 519 is parallel to the optical axis in the optical path between the distal end face 502b of the rod integrator 502 and the first illumination lens 503, between the second illumination lens 522 and the first lens 510G, and between the second lens 511G and the projection-lens system 519. In other words, the illumination-relay optical system, the R-light-relay optical system, the B-light-relay optical system, and the G-light-relay optical system each represent two-sided telecentric optical systems.

In this representative embodiment, the crossed dichroic mirror 507 (serving as the "color-separation optical system") and the crossed dichroic prism 516 (serving as the "color-combining optical system") are situated such that principal rays entering and exiting these components are parallel to the optical axis; hence, telecentricity is maintained at these components. Such telecentricity advantageously avoids the generation of image shading. Moreover, the color-signal LCLVs 515R, 515B, 515G are also situated such that principal rays incident on and exiting these LCLVs are parallel to the optical axis, thereby maintaining telecentricity. Such telecentricity advantageously avoids the generation of uneven contrast of the projected image. Consequently, this embodiment can produce a full-color projected image with superior image quality.

The images of the color-signal LCLVs 515R, 515G, 515B are combined on a projection screen (not shown) located downstream of the projection-lens system 519. Each color-signal LCLV 515R, 515G, 515B is electronically activated to produce a "correct" image orientation on the screen.

Whereas the invention has been described in connection with multiple representative embodiments, it will be understood that the invention is not limited to those embodiments. On the contrary, the invention is intended to encompass all alternatives, modifications, and equivalents as may be included within the spirit and scope of the invention as defined by the appended claims.

What is claimed is:

1. A projection-display apparatus, comprising on an optical axis:
   (a) a color-separation optical system situated so as to receive an illumination light flux comprising multiple colors, the color-separation optical system splitting the illumination light flux into multiple color-light fluxes;
   (b) for each color-light flux, a respective color-light light valve situated so as to receive and modulate the respective color-light flux in an image-forming way based on image-encoding electrical signals received by the respective color-light light valve;

(c) a color-combining optical system for receiving and combining the modulated color-light fluxes to form a recombined light flux; and (d) a projection optical system for projecting the recombined light flux onto a viewing surface, the projection optical system comprising an aperture stop that defines principal rays, the color-combining optical system being situated where the principal rays are parallel to the optical axis.

2. The projection-display apparatus of claim 1, wherein the color-separation optical system is situated near a position where the principal rays cross the optical axis.

3. The projection-display apparatus of claim 1, further comprising an illumination relay optical system situated so as to direct the illumination light flux from a light source to the color-separation optical system.

4. The projection-display apparatus of claim 3, herein the illumination relay optical system comprises a front lens group situated upstream of the color-separation optical system, and a rear lens group situated downstream of the color-separation optical system.

5. The projection-display apparatus of claim 4, further comprising a rod integrator situated between the light source and the color-separation optical system, the rod integrator directing the illumination light flux from the light source to the front lens group of the illumination relay optical system.

6. The projection-display apparatus of claim 5, wherein:
   the rod integrator defines a surface light source through which the illumination-light flux passes; and
   the illumination relay optical system forms a separate respective image, of the surface light source, formed by each color-light flux and separated from one another by the color-separation optical system.

7. The projection-display apparatus of claim 6, wherein the illumination relay optical system is telecentric on its object side, the front lens group of the illumination relay optical system being situated so as to receive principal rays, from the surface light source and as defined by the aperture stop of the projection optical system, that are parallel to the optical axis.

8. The projection-display apparatus of claim 1, wherein:
   the color-separation optical system splits the illumination-light flux into an R-light flux, a G-light flux, and a B-light flux; and
   the color-light light valves comprise a separate light valve for the R-light flux, a separate light valve for the G-light flux, and a separate light valve for the B-light flux.

9. The projection-display apparatus of claim 8, further comprising a relay optical system for each of the R-light, G-light, and B-light fluxes, the relay optical system for the R-light flux being situated between the image of the surface light source formed by the R-light flux and the R-light light valve, the relay optical system for the G-light flux being situated between the image of the surface light source formed by the G-light flux and the G-light light valve, and the relay optical system for the B-light flux being situated between the image of the surface light source formed by the B-light flux and the B-light light valve, the relay optical systems serving to direct the separated R light, G light, and B light, respectively, to the respective light valve.

10. The projection-display apparatus of claim 9, wherein each of the relay optical systems for R light, G light, and B light forms a secondary image, using the respective light color, of the surface light source on the respective light valve.

11. The projection-display apparatus of claim 10, wherein each of the relay optical systems for R light, G light, and B light is telecentric on its secondary-image side.

12. A projection-display apparatus, comprising on an optical axis:

(a) a polarizing-and-splitting optical system that separates an illumination light flux, from a light source and comprising multiple color components, into a first polarized light flux and a second polarized light flux;

(b) a color-separation optical system situated so as to receive the first polarized light flux and split the first polarized light flux into separate color-light fluxes of each of the respective color components;

(c) for each color-light flux, a respective color-light light valve situated so as to receive and modulate the respective color-light flux in an image-forming way based on image-encoding electrical signals received by the respective color-light light valve;

(d) a color-combining optical system for receiving and combining the modulated color-light fluxes to form a recombined color-light flux;

(e) a luminance-signal light valve that, based on a luminance electrical signal, receives and modulates the second polarized light flux to form a modulated second light flux;

(f) a polarizing-and-combining optical system for receiving the recombined color-light flux and the modulated second polarized light flux and forming therefrom a recombined modulated light flux;

(g) a projection optical system situated downstream of the polarizing-and-combining optical system for projecting the recombined modulated light flux to a viewing surface, the projection optical system comprising an aperture stop; and (h) the polarizing-and-splitting optical system, color-separation optical system, the color-combining optical system and the polarizing-and-combining optical system being arranged where principal rays, determined by the aperture stop of the projection optical system, are parallel to the optical axis.

13. The projection-display apparatus of claim 12, wherein the color components of the illumination light flux comprise R light, G light, and B light, and the color-light light valves comprise respective R-light, G-light, and B-light light valves.

14. The projection-display apparatus of claim 13, wherein the R-light, G-light, and B-light light valves and the luminance-signal light valve are situated where the principal rays, as defined by the aperture stop of the projection optical system, are parallel to the optical axis so as to provide telecentric illumination of each of the light valves.

15. A projection-display apparatus, comprising:

(a) a polarizing-and-splitting optical system that separates an illumination light flux, from a light source and comprising first, second, and third color components, into a first polarized light flux and a second polarized light flux;

(b) a color-separation optical system situated so as to receive the first polarized light flux and split the first polarized light flux into separate color-light fluxes of each of the respective first, second, and third color components;

(c) for each of the first, second, and third color-light fluxes, a respective color-light light valve situated so as to receive and modulate the respective color-light flux in an image-forming way based on image-encoding electrical signals received by the respective color-light light valve;

(d) a color-combining optical system for receiving and combining the modulated first, second, and third color-light fluxes to form a recombined color-light flux;

(e) a luminance-signal light valve situated so as to receive and modulate the second polarized light flux based on a fixed luminance signal received by the luminance-signal light valve;

(f) a polarizing-and-combining optical system for receiving the recombined color-light flux and the modulated second polarized light flux and forming therefrom a recombined modulated light flux;

(g) a projection optical system situated downstream of the polarizing-and-combining optical system for projecting the recombined modulated light flux to a viewing surface;

(h) an integrator having a distal end face;

(i) a first relay optical system, wherein the integrator is situated so as to direct the illumination light flux from the light source through the distal end face to the first relay optical system, and the first relay optical system being situated so as to direct the illumination light flux from the first relay optical system to the polarizing-and-splitting optical system, the luminance-signal light valve being situated where a real image of the distal end face is formed by the first relay optical system from the second polarized light flux propagating from the polarizing-and-splitting optical system; and (j) second, third, and fourth relay optical systems situated between the luminance-signal light valve and the first, second and third color-signal light valves, respectively, the second, third, and fourth relay optical systems producing a real image of the distal end face on each of the first, second, and third color-signal light valves, respectively, using the first, second, and third light colors, respectively.

16. The projection-display apparatus of claim 15, wherein the integrator is a rod integrator.

17. The projection-display apparatus of claim 15, wherein each of the polarizing-and-splitting optical system and the polarizing-and-combining optical system comprises a respective polarized-light beamsplitter.

18. The projection-display apparatus of claim 17, wherein each of the color-separation optical system and the color-combining optical system comprises a cross-dichroic prism or a cross-dichroic mirror.

19. The projection-display apparatus of claim 15, further comprising an optical-distance correction member situated between the luminance-signal light valve and the polarizing-and-combining optical system, the optical-distance correction member serving to substantially equalize an optical distance from the luminance-signal light valve to the projection optical system with an optical distance from any of the first, second, and third color-signal light valves to the projection optical system.

20. The projection-display apparatus of claim 15, wherein the projection-optical system comprises an aperture stop.

21. A projection-display apparatus, comprising on an optical axis:

(a) a polarizing-and-splitting optical system that separates an illumination light flux, from a light source and comprising first, second, and third color components, into a first polarized light flux and a second polarized light flux;

(b) a color-separation optical system situated so as to receive the first polarized light flux and split the first polarized light flux into separate first, second, and third color-light fluxes corresponding to the first, second, and third color components, respectively;

(c) for each of the first, second, and third color-light fluxes, a respective color-light light valve situated so as to receive and modulate the respective color-light flux in an image-forming way based on image-encoding electrical signals received by the respective color-light light valve;

(d) a color-combining optical system for receiving and combining the modulated first, second, and third color-light fluxes to form a recombined color-light flux;

(e) a luminance-signal light valve situated so as to receive and modulate the second polarized light flux based on a fixed luminance signal received by the luminance-signal light valve, each of the color-signal and luminance-signal light valves having a respective image-forming portion having identical size and shape, and each of the color-signal and luminance-signal light valves having a respective numerical aperture wherein the numerical aperture of the luminance-signal light valve is smaller than the numerical aperture of any of the first, second, and third color-signal light valves;

(f) a polarizing-and-combining optical system for receiving the recombined color-light flux and the modulated second polarized light flux and forming therefrom a recombined modulated light flux; and (g) a projection optical system situated downstream of the polarizing-and-combining optical system for projecting the recombined modulated light flux to a viewing surface, the projection optical system comprising an aperture stop.

22. The projection-display apparatus of claim 21, wherein each of the first, second, and third color-signal light valves and the luminance-signal light valve comprises a respective number of pixels, wherein the luminance-signal light valve comprises a number of pixels that is greater than the number of pixels of any of the first, second, and third color-signal light valves.

23. The projection-display apparatus of claim 21, wherein the first, second, and third color-signal light valves and the luminance-signal light valve are situated where principal rays, defined by the aperture stop of the projection optical system, are parallel to the optical axis so as to provide telecentric illumination of the first, second, and third color-signal light valves and the luminance-signal light valve.

24. The projection-display apparatus of claim 23, wherein the polarizing-and-splitting optical system, the color-separation optical system, the color-combining optical system, and the polarizing-and-combining optical system are situated where principal rays, defined by the aperture stop of the projection optical system, are parallel to the optical axis.

25. A projection-display apparatus, comprising:

(a) a polarizing-and-splitting optical system that separates an illumination light flux, from a light source and comprising multiple color components, into a first polarized light flux and a second polarized light flux;

(b) a color-separation optical system situated so as to receive the first polarized light flux and split the first polarized light flux into separate color-light fluxes each corresponding to a color component;

(c) for each of the separated color-light fluxes, a respective color-light light valve situated so as to receive and modulate the respective color-light flux in an image-forming way based on image-encoding electrical signals received by the respective color-light light valve;

(d) a color-combining optical system for receiving and combining the modulated color-light fluxes to form a recombined color-light flux;

(e) a luminance-signal light valve situated so as to receive and modulate the second polarized light flux based on a fixed luminance signal received by the luminance-signal light valve;

(f) a polarizing-and-combining optical system for receiving the recombined color-light flux and the modulated second polarized light flux and forming therefrom a recombined modulated light flux; and (g) a projection optical system situated downstream of the polarizing-and-combining optical system for projecting the recombined modulated light flux to a viewing surface, the projection optical system comprising an aperture stop; and (h) an illumination relay optical system situated so as to direct illumination light from the light source to the color-signal light valves, the illumination relay optical system comprising a front lens group and a rear lens group, the polarizing-and-splitting optical system and the color-separation optical system being situated between the front lens group and the rear lens, the illumination relay optical system having an upstream side and a downstream side and being telecentric on both the upstream side and the downstream side.

26. The projection-display apparatus of claim 25, wherein the color-separation optical system is situated where principal rays, defined by the aperture stop, are parallel to the optical axis.

27. The projection-display apparatus of claim 25, wherein the polarizing-and-combining optical system is situated where principal rays, defined by the aperture stop, are parallel to the optical axis.

28. The projection-display apparatus of claim 25, further comprising an integrator situated between the light source and the polarizing-and-splitting optical system, the front lens group of the illumination relay optical system being situated so as to direct light from the integrator to the polarizing-and-splitting optical system.

29. The projection-display apparatus of claim 28, wherein the rear lens group of the illumination relay optical system is situated so as to conduct each separated color-light flux from the color-separation optical system.

30. The projection-display apparatus of claim 29, wherein:

the integrator defines a surface light source; and the illumination relay optical system forms an image of the surface light source formed by each color-light flux separated by the color-separation optical system.

31. The projection-display apparatus of claim 30, further comprising a color-signal relay optical system for each color-light flux, each color-signal relay optical system being situated so as to direct the respective color-light flux to the respective color-signal light valve, each color-signal relay optical system being situated between the image of the surface light source formed by the respective color-light flux and the respective color-signal light valve.

32. The projection-display apparatus of claim 31, further comprising a luminance relay optical system comprising a front lens group and a rear lens group, the luminance relay optical system being for directing light from the light source toward the luminance-signal light valve, the rear lens group of the luminance relay optical system being situated between the polarizing-and-splitting optical system and the luminance-signal light valve.

33. The projection-display apparatus of claim 32, wherein the front lens group of the luminance relay optical system and the front lens group of the illumination relay optical system are the same.

34. The projection-display apparatus of claim 33, wherein:

the illumination relay optical system is telecentric on an image side of the light source;

the color-signal relay optical systems form a secondary image of the surface light source by each color-light flux onto the respective color-signal light valves, the color-signal relay optical systems being telecentric on the secondary-image side thereof; and the luminance relay optical system forms an image of the surface light source on the luminance-signal light valve, the luminance relay optical system being telecentric on the image side of the surface light source.

35. The projection-display apparatus of claim 34, wherein:

the plurality of color-signal light valves comprise a light valve for R light, a light valve for G light and a light valve for B light; and the color-signal relay optical system comprises a relay optical system for R light that directs R light from a primary image, of the surface light source, formed by the R light to the light valve for R light, a relay optical system for G light that directs G light from a primary image, of the surface light source, formed by the G light to the light valve for G light, and a relay optical system for B light that directs B-light from a primary image, of the surface light source, formed by the B light to the light valve for B light.

* * * * *

UNITED STATES PATENT AND TRADEMARK OFFICE
CERTIFICATE OF CORRECTION

PATENT NO. : 6,141,151
DATED : October 31, 2000
INVENTOR(S) : Shimomura et al.

It is certified that error appears in the above-identified patent and that said Letters Patent is hereby corrected as shown below:

Title Page,
Item [75], Inventors, "Hideaki Shimonura" should be -- Hideaki Shimomura --.
Item [56], References Cited, U.S. PATENT DOCUMENTS, after U.S. Patent No. 5,959,778, please insert the following:
-- 4,995,702    2/1991      Aruga
   5,105,265    4/1992      Sato et al.
   5,042,912    8/1991      Sato et al.
   5,185,712    2/1993      Sato et al.
   5,463,497    10/1995     Muraki et al.
   4,943,154    7/1990      Miyatake et al.
   5,374,968    12/1994     Haven et al.
   5,626,409    5/1997      Nakayama et al.
   5,481,320    1/1996      Konuma et al.
   5,371,559    12/1994     San-Nohe et al. --.
FOREIGN PATENT DOCUMENTS
-- 3-201695     91.09.03    Japan
   3-296030     91.12.26    Japan --.

Column 2,
Line 48, "beam-splitter A(PBS)" should be -- beam splitter (PBS) --.

Column 4,
Line 36, "for form a" should be -- for forming a --.

Column 9,
Lines 16-17, "prior projection-display" should be -- prior-art projection-display --.
Line 18, "prior-aft" should be -- prior art --.

Column 11,
Line 42, "11R" should be -- 111R --.

Column 12,
Line 6, "115G" should be -- 115B --.

Column 13,
Line 11, "system"." should be -- system." --.
Line 58, "liquid-crystal 35 panel" should be -- liquid-crystal panel --.

Column 15,
Line 15, "have-wave" should be -- half-wave --.

UNITED STATES PATENT AND TRADEMARK OFFICE
CERTIFICATE OF CORRECTION

PATENT NO. : 6,141,151
DATED : October 31, 2000
INVENTOR(S) : Shimomura et al.

It is certified that error appears in the above-identified patent and that said Letters Patent is hereby corrected as shown below:

Column 16,
Line 13, "have-wave" should be -- half-wave --.

Column 19,
Lines 31-32, "illumination relay-optical" should be -- illumination-relay optical --.
Line 65, "in first" should be -- in the first --.

Column 21,
Lines 10-11, "location the first" should be -- location with respect to the first --.
Line 21 "comprising a with" should be -- comprising an --.
Line 54, "located a projection" should be -- location in a projection --.

Column 23,
Lines 11-12, "$f_1+f_2$." should be -- $f_1+f_2$). --.

Column 24,
Line 14, "the=distal end face" should be -- the distal end face --.
Line 29, "each color-signal LCLV" should be -- each of the color-signal LCLVs --.
Line 35, "each color-signal LCLV" should be -- each of the color-signal LCLVs --.
Lines 45-46, "B light LCLV" should be -- B-light LCLV --.

Column 25,
Line 2, "each color-signal LCLV" should be -- each of the color-signal LCLVs --.

Column 29,
Line 65, "each LCLV" should be -- each of the LCLVs --.

Column 33,
Line 51, "is directed. to" should be -- is directed to --.

Column 34,
Lines 39-40, "and the enters" should be -- and then enters --.

Column 35,
Line 9, "position that where the" should be -- position where the --.

Column 37,
Line 46, "$f$,." should be -- $f_1$. --.
Line 57, "and" should be -- an --.

UNITED STATES PATENT AND TRADEMARK OFFICE
CERTIFICATE OF CORRECTION

PATENT NO. : 6,141,151
DATED : October 31, 2000
INVENTOR(S) : Shimomura et al.

It is certified that error appears in the above-identified patent and that said Letters Patent is hereby corrected as shown below:

Column 38,
Line 60, "$(f_3+f_4)$" should be -- $(f_3+f_4)$. --.

Column 39,
Line 42, "right" should be -- light --.

Column 40,
Line 18, "510G and 511G," should be -- 510R and 511R, --.

Column 41,
Line 49, "LCLV us 515G." should be -- LCLV 515G. --.

Column 42,
Line 26, "50S," should be -- 505, --.

Column 44,
Line 34, "BY" should be -- ±Y --.

Column 49,
Line 60, "PES 518" should be -- PBS 518 --.
Line 32, "image I," should be -- image $I_B$ --.
Line 39, "f.," should be -- $f_1$, --.

Signed and Sealed this

First Day of June, 2004

JON W. DUDAS
*Acting Director of the United States Patent and Trademark Office*